(12) United States Patent
MacPherson

(10) Patent No.: US 8,543,573 B2
(45) Date of Patent: Sep. 24, 2013

(54) CONTEXT DRIVEN TOPOLOGIES

(75) Inventor: Deborah L. MacPherson, Vienna, VA (US)

(73) Assignee: Accuracy & Aesthetics, Vienna, VA (US)

(*) Notice: Subject to any disclaimer, the term of this patent is extended or adjusted under 35 U.S.C. 154(b) by 529 days.

(21) Appl. No.: 12/146,821

(22) Filed: Jun. 26, 2008

(65) Prior Publication Data

US 2009/0063557 A1     Mar. 5, 2009

Related U.S. Application Data

(63) Continuation of application No. 10/803,040, filed on Mar. 18, 2004, now abandoned.

(51) Int. Cl.
*G06F 7/00* (2006.01)
*G06F 17/30* (2006.01)

(52) U.S. Cl.
USPC .......................... 707/736; 707/758; 707/793

(58) Field of Classification Search
USPC ........................................ 707/758, 789–793
See application file for complete search history.

(56) References Cited

U.S. PATENT DOCUMENTS

| | | | |
|---|---|---|---|
| 5,878,406 A | 3/1999 | Noyes | |
| 6,272,507 B1 | 8/2001 | Pirolli et al. | |
| 6,728,728 B2* | 4/2004 | Spiegler et al. | 707/603 |
| 7,146,380 B2 | 12/2006 | Schaepe et al. | |
| 7,483,919 B2* | 1/2009 | Galperin | 1/1 |
| 8,027,953 B2* | 9/2011 | LaRue et al. | 707/612 |
| 2002/0091680 A1 | 7/2002 | Hatzis et al. | |
| 2003/0195897 A1 | 10/2003 | Agrafiotis et al. | |
| 2004/0117358 A1 | 6/2004 | von Kaenel et al. | |
| 2007/0112823 A1 | 5/2007 | Baatz et al. | |

OTHER PUBLICATIONS

MacPherson, Deborah, "ITR: Visualization of Contextual Topologies", Proposal to the U. S. National Science Foundation, submitted around Dec. 11, 2002. (Social Security Number redacted from text).
MacPherson, Deborah, Letter to Dr. Taieb Znati of the U. S. National Science Foundation, Dec. 20, 2002 (Social Security Number redacted from text).
MacPherson, Deborah, "Visualization of Improved Mesh Topologies", Proposal submitted to the U. S. Federal Bureau of Investigation, Nov. 12, 2002.

(Continued)

*Primary Examiner* — Robert Beausoliel, Jr.
*Assistant Examiner* — Susan F Rayyan
(74) *Attorney, Agent, or Firm* — Finnegan, Henderson, Farabow, & Garrett & Dunner, LLP

(57) ABSTRACT

Information is analyzed and developed by creating consolidated representations of groups of data, which are associated with context information, comprising information about relationships between the groups of data, to create representations of the groups of data. The context information is embedded as symbols in descriptions of at least some of the groups of data. The symbols are used in mapping hierarchical relationships between the groups of data. Representations having commonalities are consolidated. A data network structure having network components comprising groups of data, representations and/or consolidated representations is stored. A data network structure display is created with sounds, light, forms, textures and/or colors, and is analyzed using signal processing or mathematical techniques to review context information associated with the network components without reference to groups of data in the network components. The display analysis creates new information, which is stored for retrieval by a plurality of users.

22 Claims, 17 Drawing Sheets

(56) References Cited

OTHER PUBLICATIONS

MacPherson, Deborah, Proposal to the U. S. Department of Energy for the Small Business Innovation Research/Small Business Technology Transfer Program (DOE SBIR/STTR proposal), submitted Jan. 6, 2003 (Social Security Number redacted from text).

MacPherson, Deborah, Letter to J. Van Rosendale, et al., of U. S. Department of Energy, MICS Division, dated Jan. 15, 2003 (Social Security Number redacted from text).

MacPherson, Deborah, Proposal to Lux Capital, New York, NY, undated, submitted Feb. 19, 2003.

MacPherson, Deborah, Letter to Dan Cameron, Curator, New Museum, New York, NY, Mar. 7, 2003.

* cited by examiner

CONTEXT DRIVEN TOPOLOGIES

CROSS REFERENCE TO RELATED APPLICATIONS

This is a continuation of application Ser. No. 10/803,040, filed Mar. 18, 2004 now abandoned.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING OR MATERIAL ON COMPACT DISC

Not Applicable

BACKGROUND OF THE INVENTION

1. Field of the Invention

Definition

The word "Machine" as it is used throughout these specifications is intended to mean a computer with a life expectancy of five to ten years—including an operating system or platform (ex. Mac or PC) that may be incompatible with other systems or platforms, various shared and specialized software with a life expectancy of one to three years, and an internet connection equal to current DSL or Broadband. The word "Machines" as it is used in this specification is intended to mean advanced networks of machines that change and improve over one person, research group, or entire field of study's lifetime.

The invention specifically relates to search, time dependent data compilation and user controlled display methods. The systems and methods described herein will clarify the roles of human conceptual and creative abilities versus the computational skills of machines and corresponds to the fields of Artificial Intelligence (AI); Knowledge Management (KM); Human Computer Interaction (HCI); Coded Data Generation, Processing and Conversion; Horology; Acoustic and Image Analysis; Measuring and Testing; and Dynamic Information Storage and Retrieval. The systems and methods described herein will lead to the ultimate compression and feature extraction algorithm.

The systems and methods described herein are a human computer interaction process using individual and collaborative human cognitive abilities, memories, aesthetics, preferences, knowledge, and conceptual integration skills to arrange, index and record data relationships using advanced networks of machines. Relationships among data and data arrangements are measured by machines and perceived by people as: evolving configurations of data in groups over time; scalable character-like symbols that refer and place each component within each configuration; and multidimensional hierarchical waveforms composed of light, sound and other machine derived data display techniques to distribute and compare overall data arrangements and characteristics before the data itself is retrieved from the original collection.

Context Driven Topologies (CDTs) are continually invented and reinvented through use. Precisely matching versions may not be observed in real life or in real machines, however, overall relationships captured by the topologies are commonly understood without special training or programming.

The systems and methods described herein create a level of abstraction and simplification for the search, comparison and analysis of complex, evolving data collections. The changing records are virtual, time dependent and measured for comparison, presence, location, traces and signs using non-linear dynamics, knot theory topology, algebra, Fourier analysis and other mathematical techniques. The most appropriate mathematical measurements vary by purpose and may include frequency, proportion, density, distance, relative degree of rotation, similarities and variations in alignment or intensity and other specific techniques contained in the "knowledge patterns".

Supplemental technical specifications for the future technologies claimed herein, partially disclosed throughout these specifications, and prototyped through an upcoming project [FIGS. 6A-6C] include, but are not limited to:

Mathematical templates/patterns for masking and redundancy elimination; special focusing, fine tuning, resolution, intensity, color, texture, phase and polarization techniques; controls (e.g. switching, gating or modulating) to modify and adjust the direction and orientation of light, sound and other derived data waveforms arriving from independent and concurrent sources. The sources vary in number, physical location and era of time, therefore, are always fixed relatively to the origins of each query and transmission. Variations due to this relativity are corrected, streamlined or otherwise made consistent for particular uses through the use of the mathematical patterns themselves. Each pattern is constructed for a different reason, uses its own measures, has its own similarities and will therefore encounter and reconcile each variation its own way.

Context Driven Topologies are constructed to show data and data relationships as they are periodically recorded, as they change over time, as they are interpreted with different knowledge, and as they are interpreted from different points of view. Each topology can be demodulated to reflect these views and changes through a process using techniques similar to harmony and discord, or blending and contrast, to break information into smaller groups and components. Likewise, new groups are created to simplify, remove, consolidate, blend or merge components, smaller groups and topologies to be perceived as one new component, group or Context Driven Topology.

New pattern constructions and modulation techniques may be initiated by an individual, a society or research group, one computational machine or network of machines (9.13)\.

The mathematical patterns and/or their modulations may be transferred locally or globally using the methods disclosed to expand or compress the space the patterns and forms are perceived to be in by changing the frequency of light, sound and other encoded logic elements as they are processed and displayed by devices and systems specially controlled by individual or networked users to investigate and interpret data and data relationships for specific reasons.

The systems and methods described herein are used to obtain and interpret records using waves that in some cases are other than optical waves. The systems and methods described herein comprise a dynamic, shared memory (Section 8) using image and other specific data arrangements as records.

Context Driven Topologies are broadcast to be distributed in the waveform state, similar to existing radio or cell phone technology and initially 'powered' simply by being propagated through use, similar to language, songs, stories and information on the internet. Special compilers, broadcasting, retrieval and presentation equipment will be developed in the future. See paragraph (1.24) regarding electrical pulses.

The inventor is an independent curator who organizes museum content and collections by selecting, categorizing, numbering, indexing, describing and presenting objects in meaningful hierarchies to tell cultural, scientific and historical stories through physically designed spaces, objects, voices, projection geometries and immersive environments that simulate a feeling of 'being there'.

The invention was prompted in 2001 during research on thermodynamics for Shanghai Scienceland in China. Influences include a series of readings in physics, mathematics, new physics, quantum mechanics, chemistry, biology, light and optics, acoustics, philosophy; and a continuous dialogue discussing the merits of various learning interactives listed in Chinese and legible only by their numbers, then the design of these same interactives using as little natural language as possible to avoid the intricacies of multiple translations. This was followed by the International Spy Museum which included concepts of encryption, encoding, revealing/concealing, and piecing together a puzzle from the "partially seen" and "partially true". This project lacked one clear direction or voice, the content included constantly updating artifacts, stories, architectures, spaces, environments, programs and scopes of work documented through matrices, specifications, photographs and CAD drawings. Each of these influences were added together to lead to the systems and methods described herein.

2. Description of the Prior Art

Mathematics: the systems and methods described herein are a new application of Graph Theory; Knot Theory Topology; Algebra, Group Theory, Combinatorics, Fourier Analysis, and various interrelationships between these fields and other pure or applied prior art that is most clearly expressed and understood through mathematics.

Artificial Intelligence (AI), Knowledge Management (KM), Human Computer Interaction (HCI): CDTs particularly address subject matters related to mapping; complex indexing of events, objects and agents; parallel processing; data mining and privacy; user directed interface; hierarchical structures; sequence and flow in comparison processes; new forms of node representation and topologies; visualization and simulation; a new system and theory of computational linguistics and process grammars; mechanisms for shared memory; machine learning and training; design; scalable data and networks; automatic updating; compression and decompression; techniques for data curation, interpretation and preservation; pattern, shape, motif and object generation, identification and recognition; text, visual, audio and other machine derived representations of encoded information; unsupervised clustering; techniques for the interpretation of partially described data and data relationships; illustrative embodiments; containers, wrappers and boundaries; parsing; traces; new abilities for machines to generalize, associate and categorize; selection methods; rules; heuristics; priority registry and addressing; periodicities; thresholds; infinite variables; redundancy and masking; custom consistency and similarity measures; error and irregularity detection; new types of I/O devices, methodologies and purposes; an improved process for metadata, determining order, partial order and concepts of matching; machine implementation and simulation of human intelligence, decision making, and conceptual integration; the directed use of language, memory, imagery, sounds and encoding for specific purposes. The systems and methods described herein give machines "something to measure" that is closer to our imagination, cultures, changing interpretations, and historical comprehension. Context Driven Topologies are used to compile, generate and present results a new way. They are a better form of metadata that easily scales and a marked departure from tree structures, or other standard data arrangements, because the topologies provide a new way for information to characterize, organize and identify itself in context over time.

Physics, Quantum Mechanics, Astronomy, Chemistry, Biology and other Sciences: the need to measure; our quest to discover, diagnose, explore, and evaluate; logic; problem solving and accuracy; fundamental relationships; simplicity and complexity; elegance; the desire for robust, rigorous, precise investigations based on solid foundations with the intention of leading to significant, new proofs and conclusions; and, our basic human relationship with time, nature and understanding of forms and processes.

Cognitive Science, Ontological Engineering and Semiotics: symbols; language; translation; word meaning; history; schemas, foundations and rationale; metaphor and representation; our need to communicate across cultures and generations; our need to share information, record and discuss.

Art and Music: aesthetics; composition; clarity; simplification; abstraction; layering; similarities and patterns, returning to the same; unique variations and interpretations; reflections of cultures; questions about conventions and our societies; perception; awareness; preference; and the need to express.

Architecture and Design: drawing methods, perspective and rendering for discussion versus schedules, plans, elevations, details, sections and overalls for building; careful attention to proportion, and relationships between adjacent spaces; lighting and acoustics; material properties including durability, compatibility, texture and color.

Statement on Prior Art versus the Invention: Similar patented subject matters identify or create information object types, properties, subsets of properties, data characteristics and arrange information units into ordered sequences or relationships, however outside of Classes 706 and 707, very few subjects even nominally address what the information itself means, why it was generated, the reality that some information is more important or lasting than other information, and how this influences peoples interpretation of these graphs, patterns, objects, properties and characteristics. Nor does most prior art allow for these properties and characteristics to evolve, be influenced, and recorded over time. Generally, prior art is based on a delicate balance between the ways data relationships are described and derived but does not allow data descriptions or derivations to vary by preference or specific quality assurances, and how these preferences and assurances affect the value of data. Very generally, objects and experiences, such as artworks and scientific studies, reflect or attempt to capture what is genuine and the process of curation, interpretation, and preservation of data generated to represent these objects and experiences needs to aim for a virtual connection that is as direct as possible between maker and viewer, nature and observer. The systems and methods described herein are intended for information that has had, at least at one time, a profound attachment to the original user(s). The systems and methods described herein are a tool to let these attachments become more obvious and are based on the belief that a more thorough understanding of context will not only ensure more meaningful and direct connections in the future, but that use of the systems and methods described herein will dramatically increase our abilities to consolidate and manage shared long term data resources of higher quality and value, which is also barely, if ever, addressed in similar patents and subject matters reviewed in prior art.

A project has been organized in collaboration with individual theorists, mathematicians, artists, engineers, and other inventors to: look carefully at the reasons and purposes for the methods and systems described herein from a variety of view points; to generate a representative dataset [FIGS. 6A-6C]; to develop an enhanced prototype that is a mathematical, visual and audio model, and new conceptual framework; to create and define the first set of knowledge patterns, display patterns, memory forms, measurable arcs and to further demonstrate and clarify the techniques described herein using a sampler set of ideas that reference these individual's methods of constructing ideas, and the ways these ideas are manifest through art, science, engineering and language. See the detailed description of [FIGS. 6A-6C] for an explanation of this process.

This particular project, which may or may not be in collaboration with an established US research partner such as a public or private university, museum, research institute, or information technology company, will be called "Digitizing the Non Digital", "Visualization of Context Driven Topologies" "Inside/Outside" or other name. This collaborative project will be proposed to US Federal, private and international agencies along with research partners identified as legitimate collaborators in these proposals. Future research partners may be from the United States or foreign countries.

The systems and methods described herein will be introduced and partially implemented with a variety of US and international individuals and institutions to assess the invention's compatibility with specifically varying resources. It will be proposed that the work of this project be presented and discussed at US and international art museums, research institutes, conferences, universities and other places and events in an effort to disseminate the ideas and methodology of the systems and methods described herein; gather feedback from a variety of cultures; form lasting partnerships with these individuals and institutions to use the systems and methods described herein on larger, broader and more specific collections of complex and abstract information. The more widely the systems and methods described herein are used, the more useful they will be. The purpose of the project is to establish quality controls and a firm foundation for future technologies so use of the systems and methods described herein is not confusing, geared to one domain or culture over another, related too strongly to natural language, or current machine processing, indexing, computation and display methods.

SUMMARY OF THE INVENTION

A simple, evolving interactive method of mathematical abstraction and conceptual illustration for complex data curation, interpretation and preservation. The systems and methods described herein comprise a measurement system independent of electricity, media, natural and machine languages for networks of people and computational machines to capture the infinite ways ideas are constructed, and to record relationships between ideas for further contemplation. Virtual representations of concurrent and conflicting data relationships, called Context Driven Topologies, scale in resolution and compactness to be perceived in three states: fluid configurations of information components connected using the multidimensional topologies [FIGS. 10A-10D]; compressed symbols, similar to music annotations or character writing but limitless, to fit inside each components mathematical description [FIG. 10E] indicating each component location within each hierarchy a special, self-referring way [FIG. 9]; and multidimensional waveforms [FIGS. 10C-10E] continuously being simplified, streamlined and consolidated such as consolidated data group 220 in an abstract, boundless, stateless cloud [FIG. 1] [FIG. 2]. Retrieved waveforms are broadcast as object-like periodicities to be interpreted. Even though the topologies are perceived differently in each state, they remain mathematically the same regardless of their use. Over time, relationships between configuration, symbol and waveform uses will generate patterns used to identify and create new data relationships. These relationships may be initiated by either people or machines. Input and output easily map between text, mathematics, imagery, sounds and other means because each means of communication is described and derived using the same mathematical system. Context Driven Topologies are passed like stories from one generation to the next, transformed as interpreted then returned slightly modified. These cycles leave indelible marks, data without these marks or significant connections does not persist. Redundant data and data relationships have precisely matching topologies that automatically align to mask and cancel each other, defining similarity measures is a decision process between users and machines. "Better" topologies are ideal forms, compactly identified, and automatically preserved over time through evaluation and use.

DESCRIPTION OF THE EMBODIMENT(S)

Figure 1:
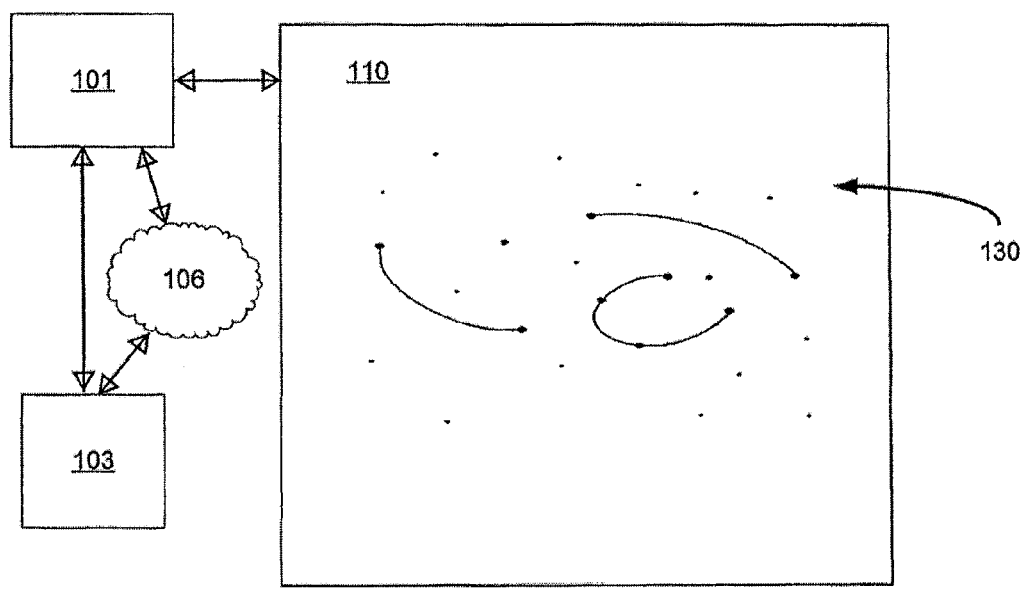
FIG. 1 is a diagrammatic view of a system for implementing an embodiment of this invention, including a boundless abstract data cloud in a stateless space.

FIG. 1 is a diagrammatic view of a system for implementing an embodiment of this invention, including a machine such as a computer 101, a shared memory 103 having computer data stores, and a network 106 (which may comprise the Internet), for manipulating, storing, and transporting a boundless abstract data cloud 110 in a stateless space 130. People and machines such as computer 101 confront a boundless disorganized abstract cloud 110 which cannot be drawn because any drawing of any view is inseparable from an interpretation of this content.

Figure 2:
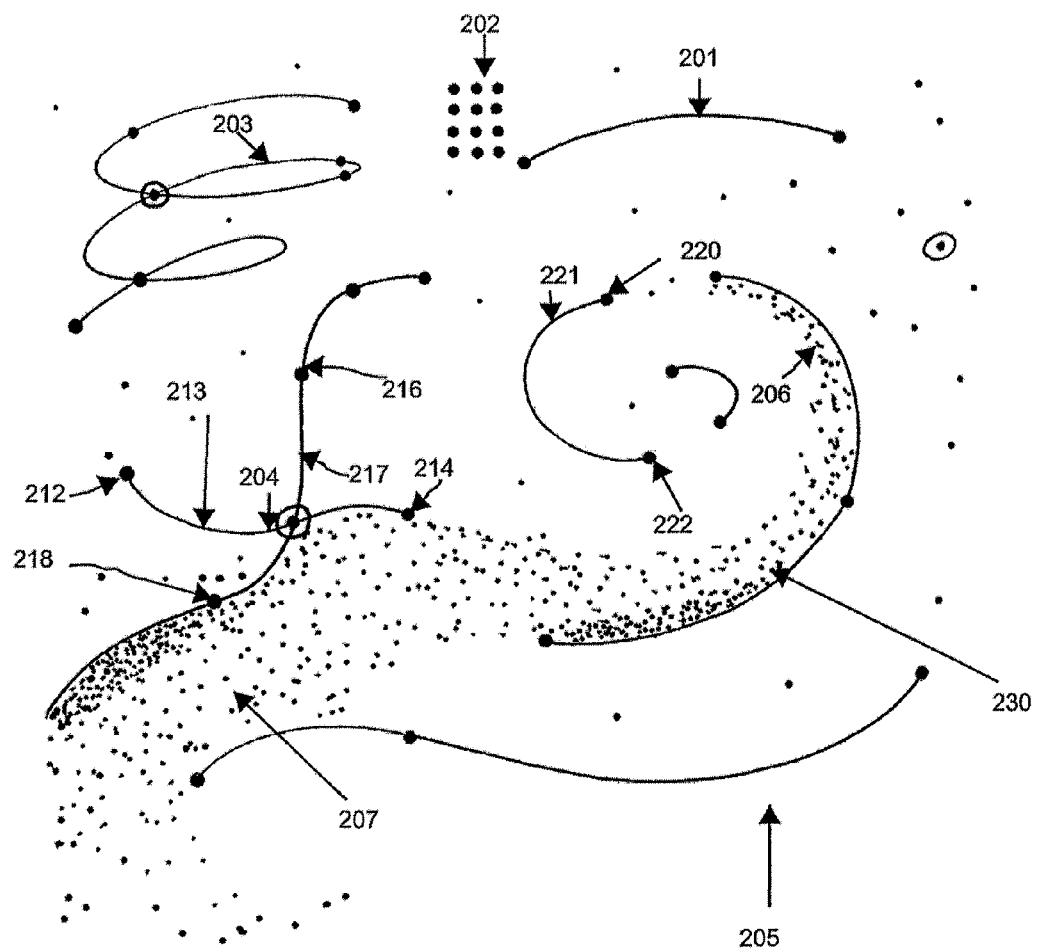
FIG. 2 is another diagrammatic view of the data cloud of FIG. 1, showing users providing machines with related examples, patterns and measurements beginning to emerge.

FIG. 2 is another diagrammatic view of the data cloud of FIG. 1, showing users providing machines with related examples, patterns and measurements beginning to emerge. People begin to specify or create data components and organize data relationships (virtual connection reference arc or link 201) by providing advanced networks of machines with related examples using words (data 202), images, sounds, drawings, dimensions, flow sequences (data 203), hierarchical structures (data 204) and any other relevant description. Immediately, well over 99% of the abstract cloud goes 'dark' or cannot be perceived (data 205). Knowledge patterns and measurements begin to emerge (data 206). Information that has been related in the past is "drawn" together to become initially arranged, or placed (3.18) (7.2) (8.3) (9.4 to 9.6), and temporarily "locked" into a relative proportion or automatic sequence (data 207).

Figure 3:
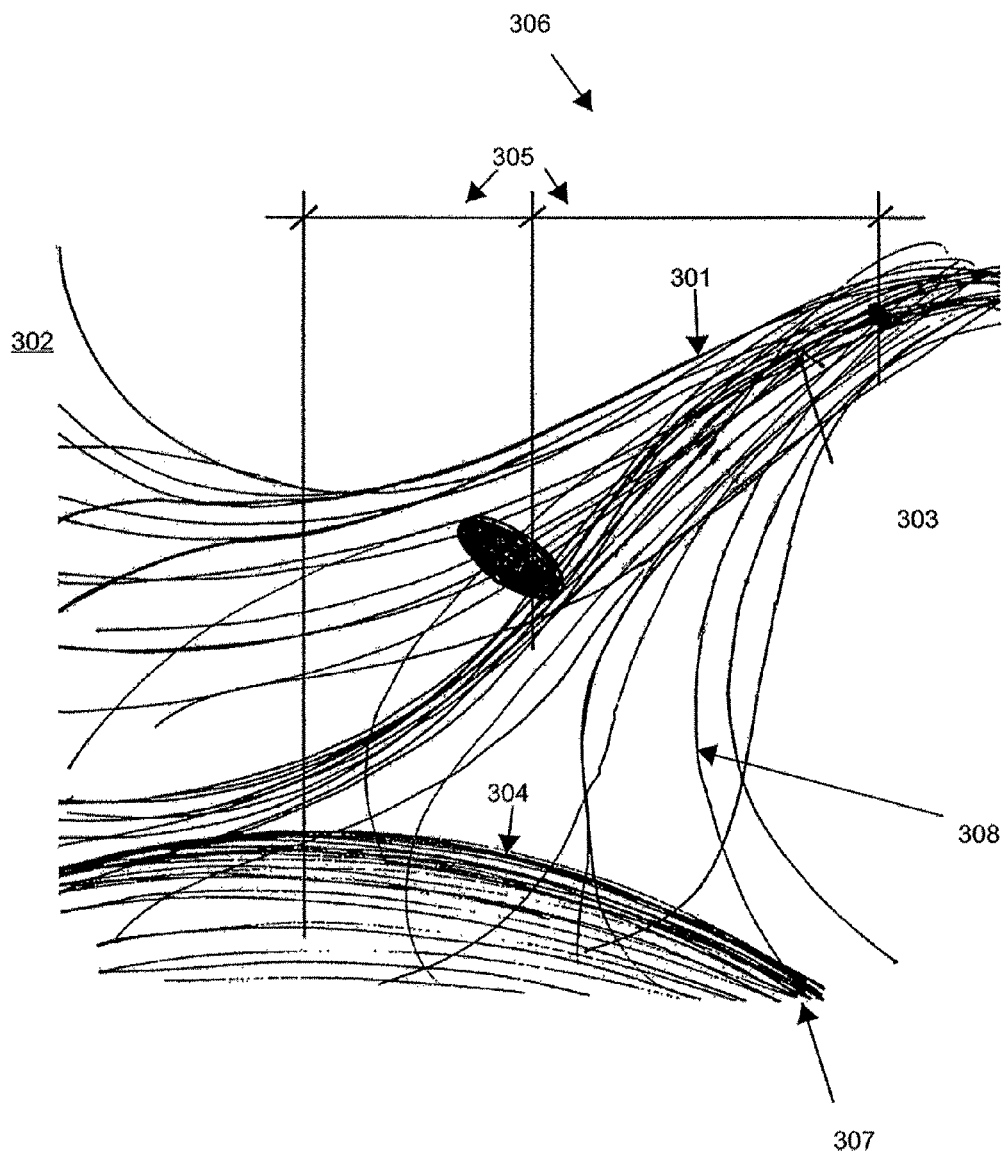
FIG. 3 is a diagrammatic view of a data cloud, showing the beginnings of constructing a hierarchy, creating new information, and decision making.

FIG. 3 is a diagrammatic view of a data cloud, showing the beginnings of constructing a hierarchy, creating new information, and decision making. People use this initial "group" and begin to add new ideas (data 301), take away what is not important (data 302), rearrange, re-prioritize and construct a new data relationship. The view that is perceived is naturally the users, even if it is a research group sharing the same view. The lines in this drawing represent a stream 303 of ideas over time, the ellipses and bounded areas 304 represent an idea coming together on its own. Machine measurements are continuously updating (data 305). Machines never see "views" such as foreground and background; they continuously process and reprocess the changing groups of mathematical descriptions (data components, data groups, data relationships, hierarchy) as if it was one whole group 306. Mathematical descriptions and relationships come and go as the user arranges his or her information, begins to make decisions and prepares to draw conclusions (data 307). Machine generated suggestions of simpler arrangements (data 308) may be used to refine the new data and data arrangement at the discretion of the user. The examples below, and FIG. 4 and FIGS. 5A-5D, illustrate an example of three users: curator; scientist; and detective; an assumed point of view for machines is also given.

the curator decides to focus on an era, style or media and begins to define a group of art and artists.

the scientist specifies a hidden Markov model will be used, a certain range will be measured.

the detective begins to look around and talk to people to gather rumors and facts about the crime.

machines display the ideas and information people are working through and begins to calculate and streamline (1.7) the mathematical data descriptions and algorithms into smaller groups and begins to establish an internal order. Immeasurably vast quantities of unrelated data and data relationships from both deep in the background and practically adjacent are not recognized and therefore eliminated from the current dynamic calculation and group.

Figure 4:
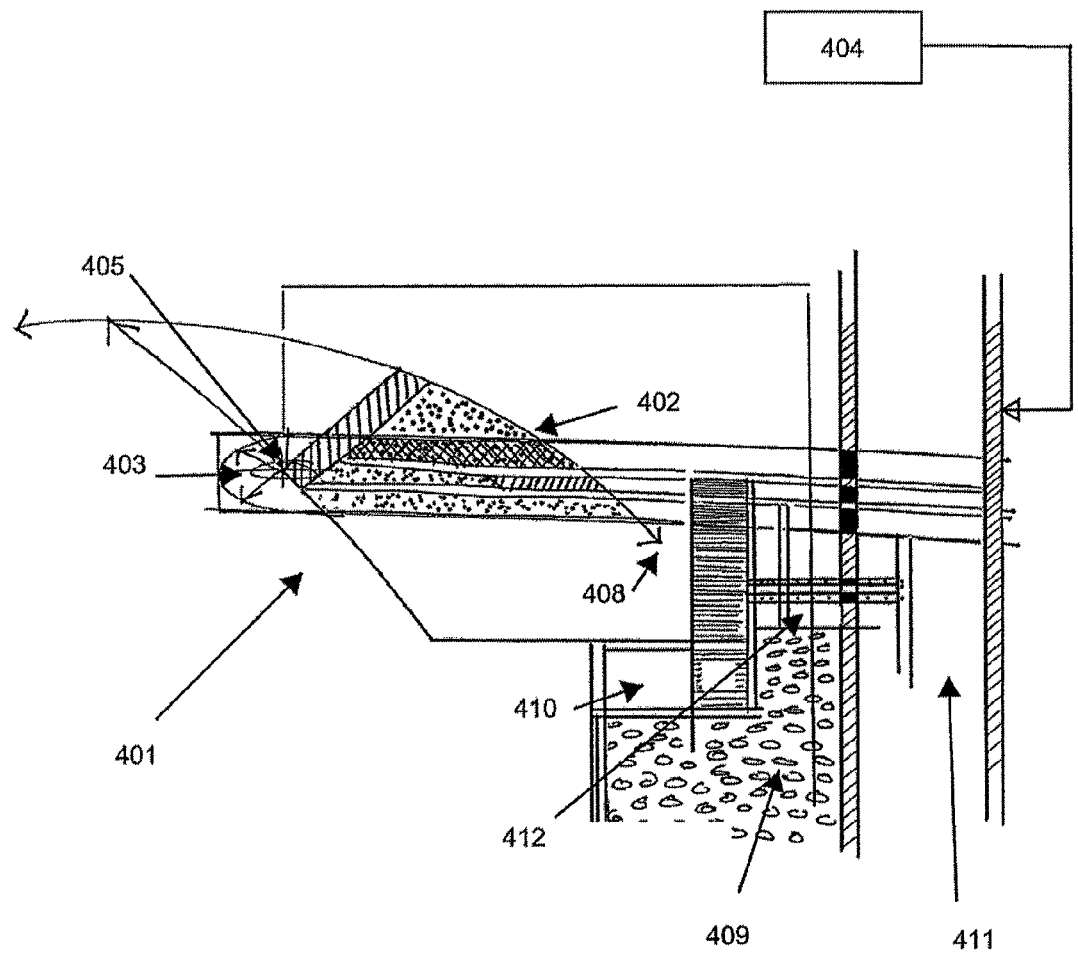
FIG. 4 is a diagrammatic view of a data cloud, in which conclusions are drawn and a Context Driven Topology becomes fixed into its own pattern.

FIG. 4 is a diagrammatic view of a data cloud, in which conclusions are drawn and a Context Driven Topology becomes fixed into its own pattern. This drawing shows a close up view of a Context Driven Topology that is almost complete. Each evolving arrangement is a unique, high dimensional, measurable structure and form (data 401) constructed of various information components placed into a hierarchy with varying emphasis (data 402), proportions (data 403) and adjacencies (6.1 to 6.10). Histories are simplified and aligned more precisely using machines such as computer 404. Clues about the content are simplified and indicated abstractly using colors, textures and other features of the automatic language (7.1 to 7.50). When the user determines this arrangement is complete (data 405), the next step is to fix the topology into a permanent pattern that includes the patterned space around it; then send it into the shared memory area (Section 8) of the stateless space for discussion. These outside interpretations are able to change the histories and clues about this content which therefore influences the "appearance" of these objects, spaces and patterns in the future (data 408). The "original idea" is left untouched in placeholder position (2.6) [FIGS. 6A-6C] beyond the reach or influence of outside interpretations. Each virtual object gradually begins to add new layers of interpretation and meaning (data 409) that surround each original arrangement as it was detailed and put together by the author (data 410).

the curator oversees the installation of the exhibition, publishes written conclusions and reads criticisms.

the scientist publishes a paper, justifies their conclusions and faces challenges from their peers.

the detective arrests the perpetrator, it is the right person, the facts are presented in court and documented.

machines map the final arrangement and final context, or placement, of the data components. All of the techniques are separated and consolidated as required (9.4) (9.11). What is not there (data 411) is just as important, if not more important, that what is there (data 412).

FIGS. 5A-5D are diagrammatic views of a data cloud, showing ideas traveling in different directions and overlapping in time, with three separate background histories. A closer inspection of the process to establish any one point of connection in any one topology reveals a more detailed decision process and history of background arrangements for each user.

Figure 5A:
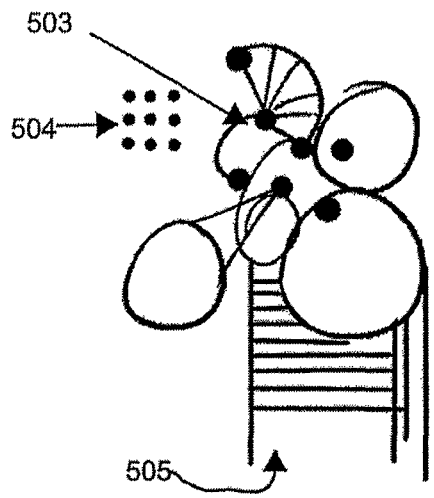
FIGS. 5A-5D are diagrammatic views of a data cloud, showing ideas traveling in different directions and overlapping in time, with three separate background histories.

In FIG. 5A, the curator reviewed hundreds of potential pieces in person, on the internet, and in photographs. Initial research, early conclusions and writings began to push the exhibition in new directions (data 503). Certain preferred pieces are found to be unavailable during the time they are needed (data 504). Characteristics of these pieces may be referred to in the conclusions (data 505), but these pieces cannot be presented with the exhibition.

Figure 5B:
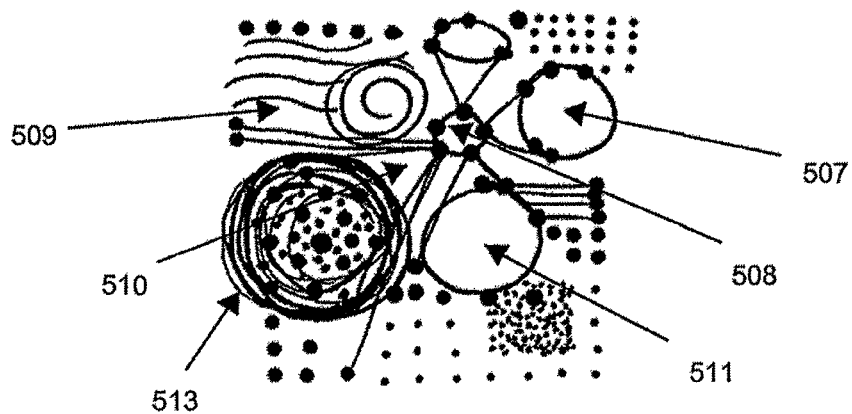

In FIG. 5B, the scientist discovers a bothersome variable (data 507). A decision needs to be made about what to focus on (data 508). Different aspects of the dataset are compared (data 509). Different comparisons are compared (data 510). Variations of the same techniques are tested (data 511) until the simplest, most reliable techniques are selected (data 512) and run (data 513).

Figure 5C:
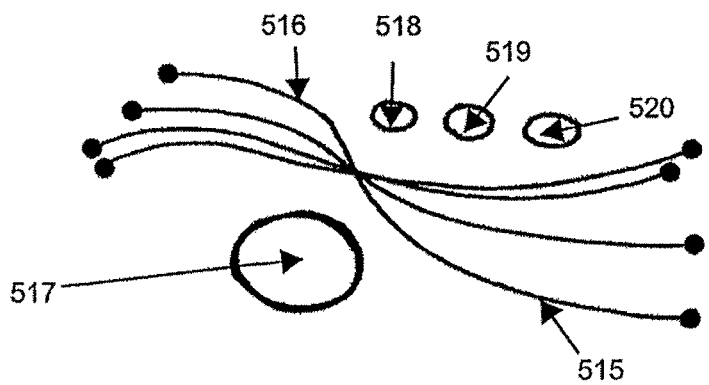

In FIG. 5C, the detective intellectually sorts through and compares the rumors and facts that have been gathered, they compare details of this case with similar cases they remember from the past, and information they and their associates gather from their own databases/analysis systems, and the databases/analysis systems their agency shares with other crime fighting agencies at city, state, federal and international levels.

the machine is continually updating the current priorities, value and placement, scanning the shared memory space and other remote sources to update as required. As the person's conclusions and decisions begin to be more defined, the machine is continuously consolidating these sets and subsets of encoded elements, algorithms, techniques and functions into a more mathematically compact whole. Various options for components, previous arrangements and abandoned techniques that are not part of the final set are completely eliminated from this record.

Figure 5D:
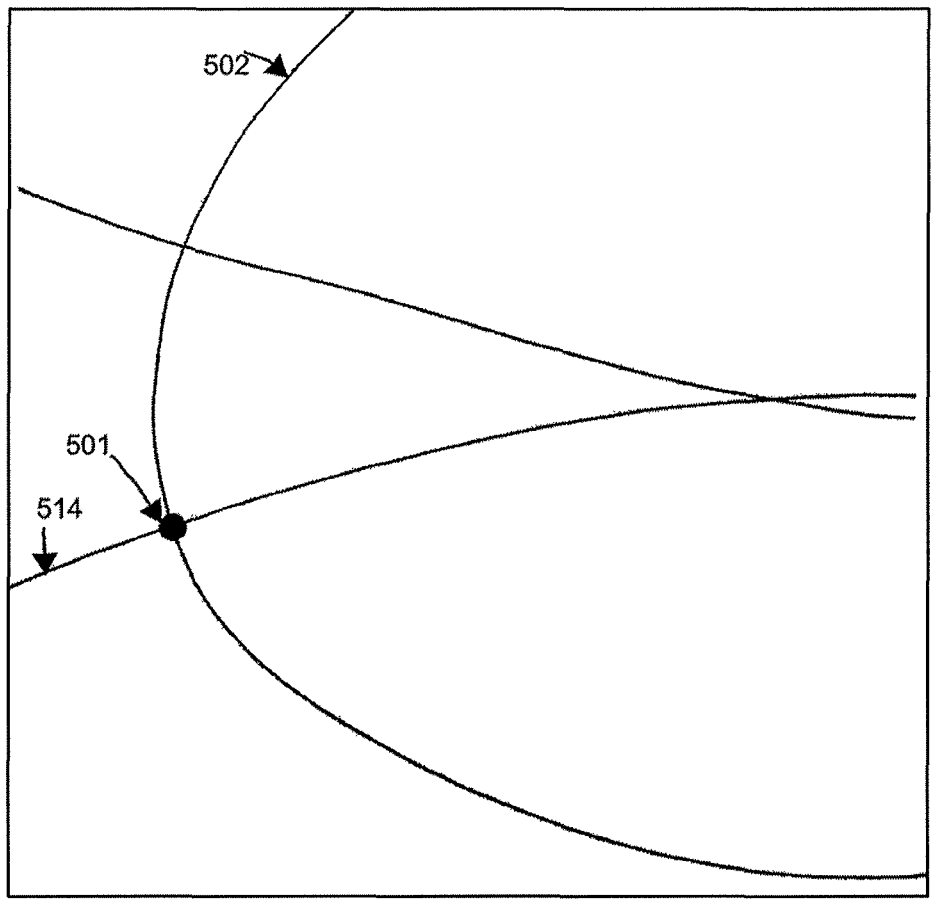

FIG. 5D shows a point 501 of intersection of arcs 502, 514.

Figure 6A:
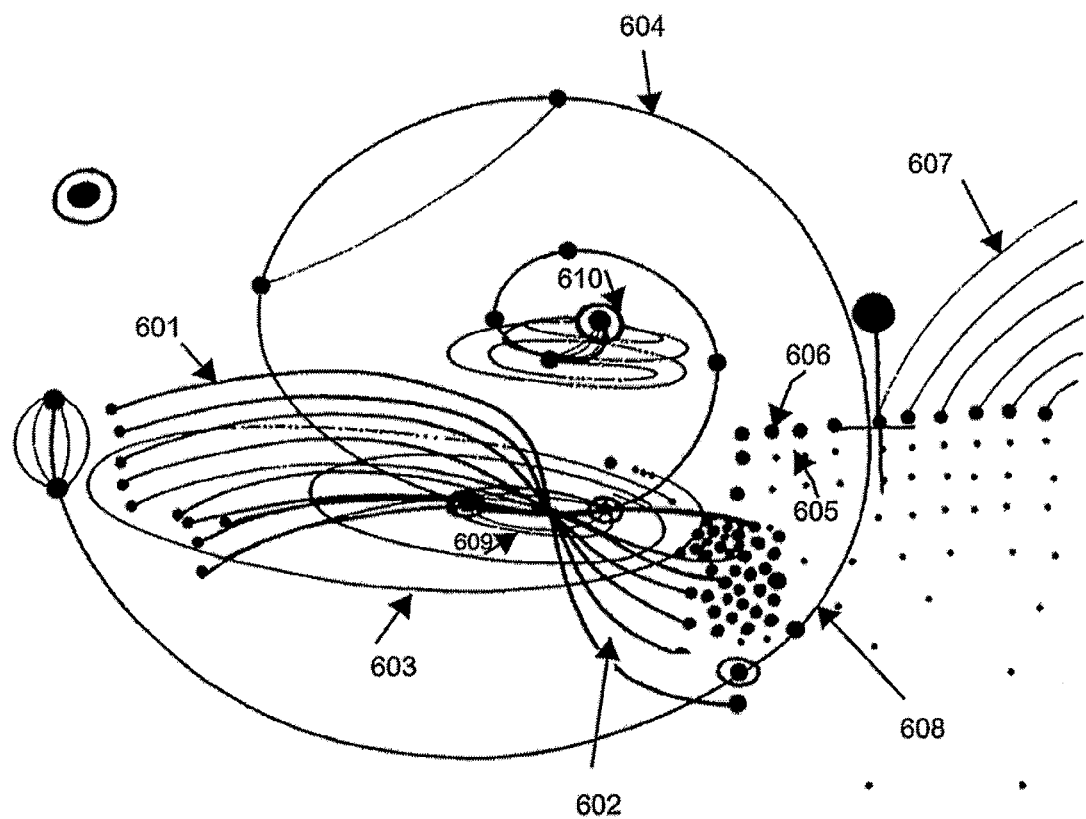
FIGS. 6A-6C are diagrammatic views of a data cloud, showing a example of the operation of the methods and systems disclosed herein and to be implemented in an upcoming project.
Figure 6B:
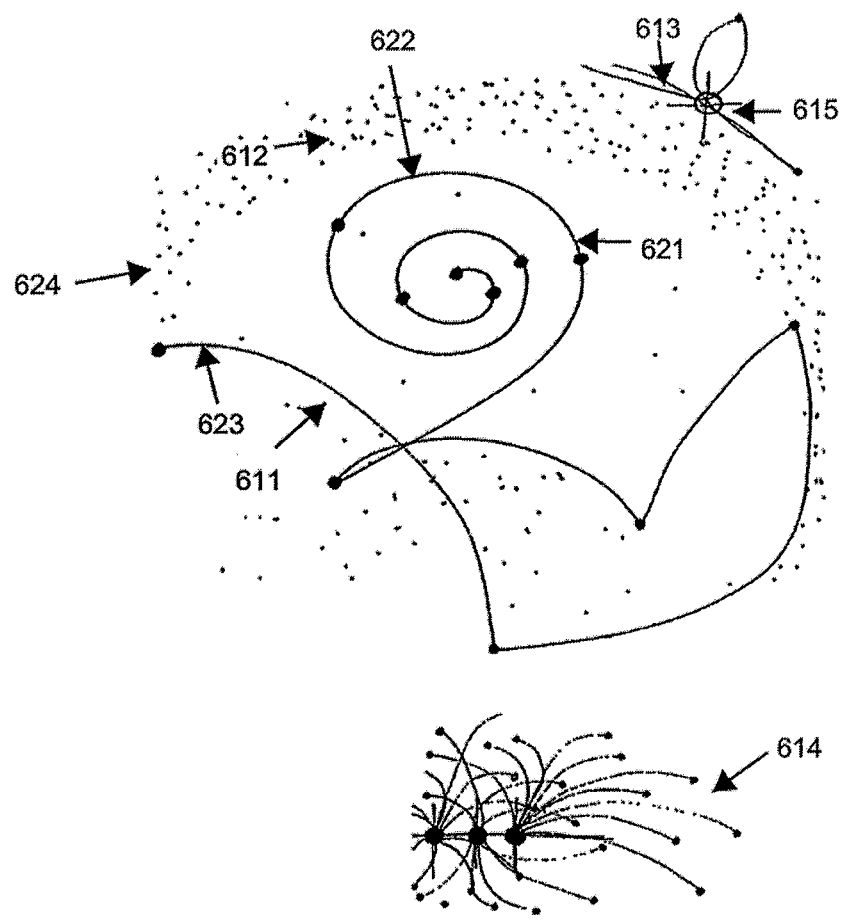
Figure 6C:
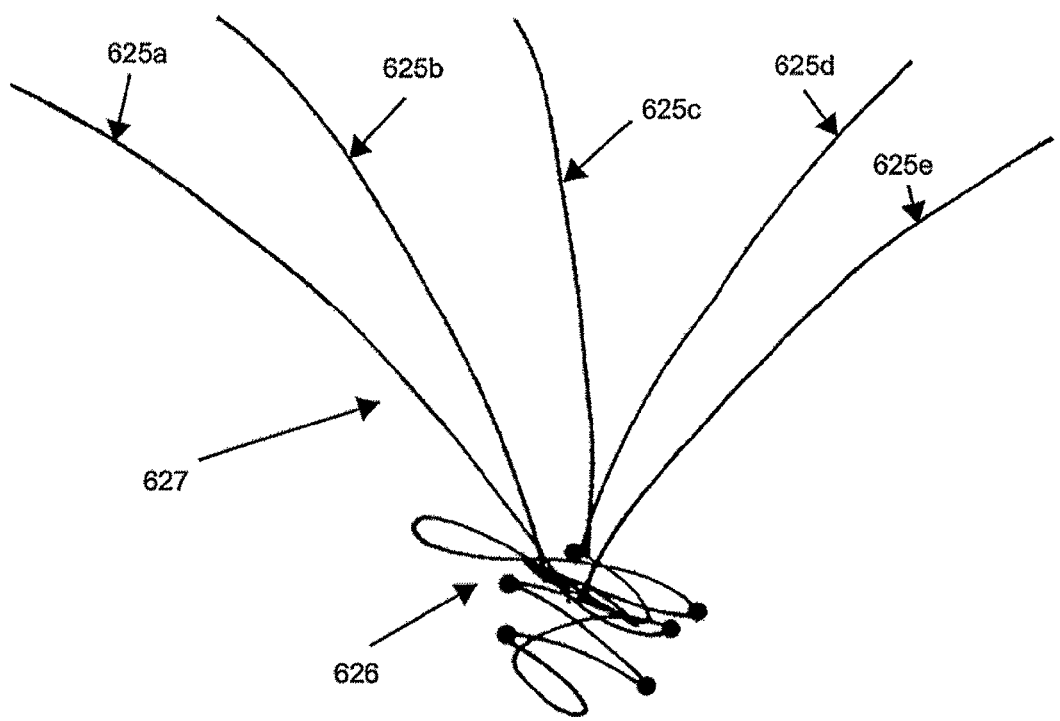

FIGS. 6A-6C are diagrammatic views of a data cloud, showing a example of the operation of the methods and systems disclosed herein, in which the process of generating and interpreting a representative dataset through an upcoming project will be undertaken.

In FIG. 6A, a group of theorist/mathematicians individually present a visual and mathematical talk to a group of artists describing their work, the mathematics they use, and images they create (for example visualizations, graphs and diagrams). Aesthetics and relationships between the theorists' talks are interpreted differently by each artist (data 601). Their unique interpretations are manifest through an art object, performance, media or layered, digital system (data 602). The collaboration overall will generate a series of technical papers and other writings across several domains (data 603), one complete publication or book (data 604), a changing internet presence (data 605), two art exhibitions (data 606), and sets/series of discussions (data 607)—a limitless series of panel discussions, a structured series of lectures, and simple questions from kids. All of these words will be translated into an 'occurrence' model (data 608) of ten natural languages to supplement the mathematical and aesthetic connections. Each participant will produce at least one paper (data 609) describing and illustrating the connections they see among this group of ideas. Both of the exhibitions and all of the discussion topics will be modeled as a set of ideas that have originated at the same time through the same series of theorist talks (data 610).

In FIG. 6B, the two exhibits and discussion forums are divided and progress at their own pace in their own locations. "Constructions" (data 621) is an exhibition of painting, sculpture and performance in one place at one time (data 622), the scale of each piece is known to be correct in relation to the viewer (data 623), the proportions, materials, lighting and appearance are known to be as intended by the artist (data 624). This exhibition is methodically relocated to ten different cultures that speak the ten different natural languages used in the model. The artworks and performances displayed in person through the Constructions exhibit are digitally documented and recorded to represent the object or event 'placeholder' concept disclosed in paragraphs (2.6) (2.10) (3.14) (3.26) (7.21) (10.8). During the time Constructions is predictably moving in time from one location to another, each artwork within this exhibition 'unfolds' 'expands' or has 'variations of the same' as the tour progresses (data 611). All of these objects, actions, events and sequences are digitally mapped and recorded.

A second exhibit, which is unnamed at this writing, is simultaneously and spontaneously shown in a number of locations around the globe (data 612). Many of the reference points tied deep into the Constructions exhibit are lost, the scale varies according to presentation mode, device and environment. Individual viewers or venues may have controls, but the original creator of the material does not. Over time each of the original artworks and systems in the second exhibit are able to expand to be presented according to the artist, engineer or inventor's original intent through non-constrained, non-remote finely adjusted presentation means. An interactive shared system will be designed to present a series of screens in a circle. The viewer can walk into a mini-theater in the center of this circle where high resolution images of the artwork in both exhibitions and the theorist's examples are projected all around the viewer field of vision. Subtle sounds, language variations and audio translations of the other materials are gradually introduced to coincide with the imagery. Eventually, the mini-theaters in the centers of these interactive screens become a 'placeholder' for high quality, remote, simultaneous presentation. Periodically, the interactive screens and mini-theater in the second exhibit coordinate to show one set of work created by one participant. Scale will be indicated for paintings and sculptures using an icon image of the artist themselves in a corner of the screen, this will be adjusted to 1:1 scale in the theater but cannot be controlled on various screens, therefore the proportions of the artist to the art will be fixed. See (Section 10) for useful examples of fixed proportions. Since the performers are people and so are the viewers, scale is not corrected regardless of the presentation mode.

The theorists' visualizations, graphs and other examples are generally not able to be shown in a scale with direct relationship to the viewer using an icon that can work across ALL of the theorist's examples. Documenting, and getting the shared system to understand or automatically associate scale relationships with information depending on the way it is presented is an important focus for the prototype (data 613).

The structure of the model is based on connections between the participant's ideas, observations and conclusions. In effect, each project participant is assigned "a dimension". When it is too confusing to draw, the three roles (theorist/mathematician, artist, and "integrator") will always be able to be narrowed to three dimensions, even if the relationship that attempting to be drawn has an unequal number of participants in any one role or one role is missing (data 614). A series of connections between the participants using these dimensions—whether arbitrarily observed, clearly stated from the participants own view, or partially shown through the participants work—will be modeled using Context Driven Topologies to visualize and mathematically capture these connections using a configuration of arcs, mathematical patterns, audio and/or visual forms that change over time as disclosed (Sections 7 to 10).

Regardless of the genuine proximity or distance of simultaneous exhibitions, the Constructions exhibit location on the round sphere of the earth during the time it is displayed in this one known place on a predictable path (data 627), is always recorded to be the center of each unique arrangement (data 615). The second exhibition typically has one version in the same city as Constructions, may have one version stay in the same place and evolve over the course of the project, but generally, the second exhibitions path is unpredictable because it may be prompted and displayed in any number of locations for any length of time. These paths gives another set of "things to draw and measure" using the new system. Because the schedules, duration and locations of the two exhibitions rarely coincide, these paths and the arcs that may be drawn to show where each exhibition is in relation to the other one at any point in time will begin to form an evolving history that can be measured, over time, using these arcs. These movements will also help to "place" each of the participants "dimensions" against a structured background. The participants, the artwork, the theorists examples and the museum architectures can all be compared to the "objects and spaces over time" in these specifications.

In FIG. 6C, at the end of this process, all of the artwork, theorists' examples, digital systems and other representations are brought together with all of the project participants in one large space at the same time. Each of these people, their individual points of view and ideas, an example of how they work both in 'real life' and as 'digitally represented'—becomes one unit, at one time, in one place that is captured into one Context Driven Topology. Each previous exhibition, discussion, paper, artwork, visualization, mathematical relationship and other references are indicated as smaller, self referring, expandable topologies leading to the final arrangement that is arbitrarily declared to be complete at the last exhibition (data 626). The histories and paths (data 625a, 625b, 625c, 625d, and 625e) of each participant, object, event, and point of view are traceable through the histories in the last Context Driven Topology, which will have evolved and been fine tuned over the course of the project, and "made to work" with ten different natural languages, mathematics, individual aesthetics, and ten different cultural understandings. Therefore, the upcoming project generates a representative dataset to test the systems and methods described herein in real life, using real ideas, real art, real science, real mathematics, real cultures and real systems.

The purpose for the systems and methods described herein is initially realized through this project. One use is a better way to present scientific visualization and art museum content online. In the last exhibition, the art in Constructions and the art that can vary in scale and reference in the second exhibit will—switch places—to be shown both in person and on a screen. The relationship between these modes is captured mathematically and manipulated through an automatic audio and visual language that IS the systems and methods described herein. Figuring out this switch between presentation modes, looking at this question of scale, getting the placeholder position to persist in the digital mode, and mapping between this one defined set of ideas, examples and a "sampler set" of work is an enhanced prototype using a representative dataset. This working model, initially introduced THROUGH this project, will be formally presented to US and international museums, libraries, and scientific research communities. The systems and methods described herein and documented framework will be presented as a better way to capture ideas, map between ideas, and correspond with the way ideas are manifest through art, science and other systems.

Figure 7:
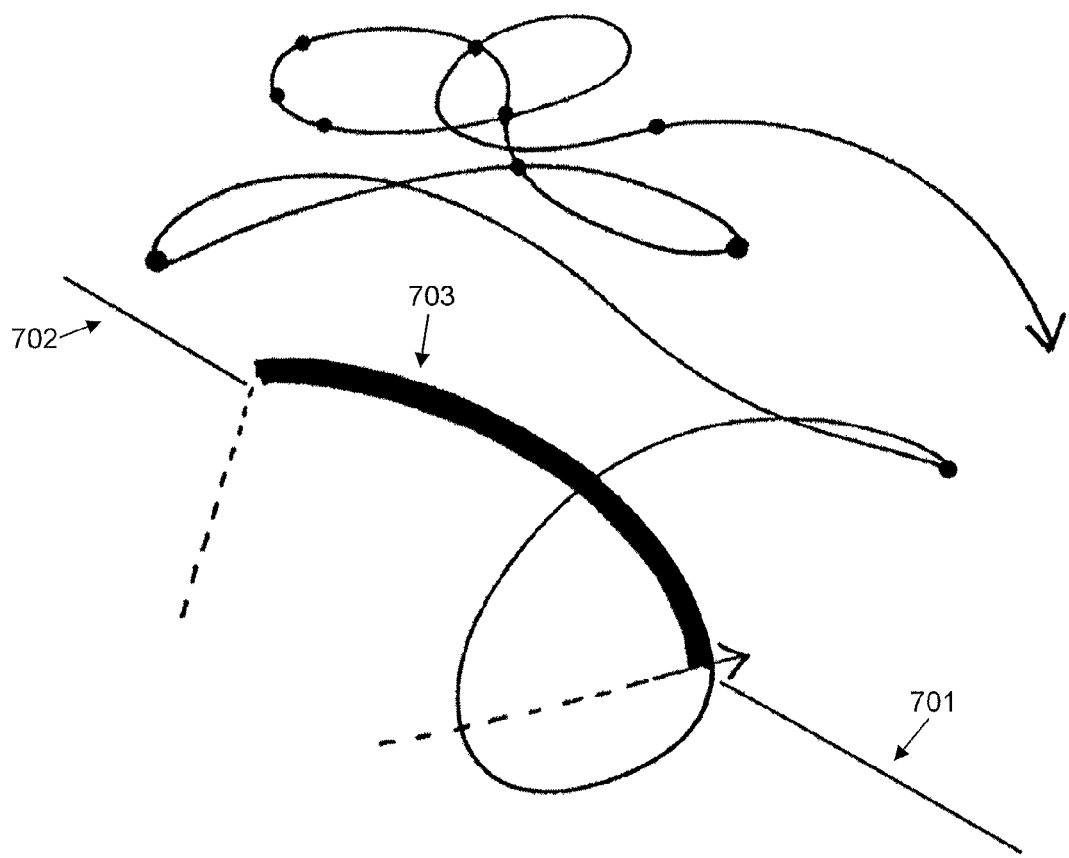
FIG. 7 is a diagrammatic view of a data cloud, showing components appearing to change scale to new levels by modifying their description boundary.

FIG. 7 is a diagrammatic view of a data cloud, showing components appearing to change scale to new levels by modifying their description boundary. When previously disassociated data components, relationships and topologies scale to be compared, the following occurs:

The previously disassociated data components, relationships and topologies scale only appear to 'change size' (3.16) (3.18) (4.1) (7.31) (9.11) to be recognizable in a field with what the user is defining as the "same" or similar components and relationships. When data and data relationships are known to have a relative scale, this proportion becomes locked until the units being compared are dissolved from this topology or otherwise set free from the group. Data components, groups and topologies change between hierarchical levels by compressing and expanding their mathematical descriptions. The state of compactness or expansion of the descriptions affects the texture [FIG. 4] of visual components (1.23) (3.18) (3.33) (7.29) (7.36) (7.38) (7.42) (7.47) (8.7) (8.11).

FIG. 7 shows that the systems and methods described herein allow data components 701 and 702, arrangements and other relationships that are not typically able to be associated, to become virtually associated (10.6) by rotating, aligning and scaling data components and groups until they fit 703 into the new arrangement (3.31) (7.3) (7.9) (7.42) (7.47).

Figure 8A:
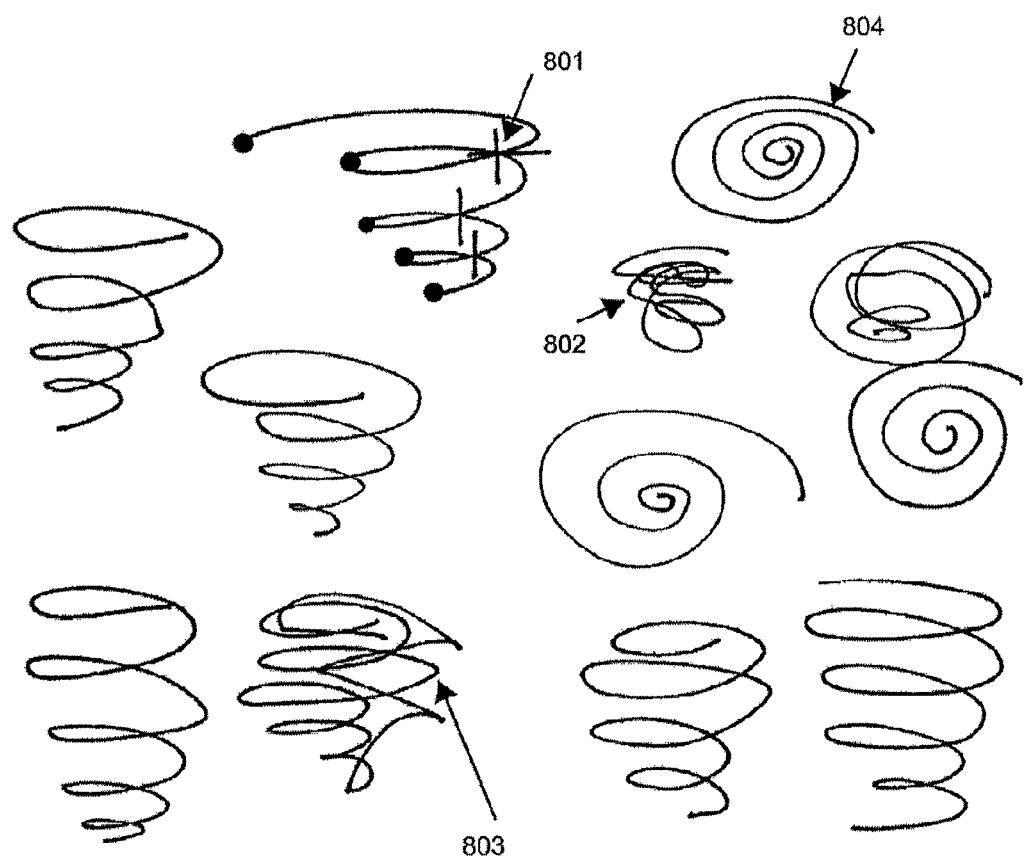
FIGS. 8A, 8B are diagrammatic views of a data cloud, showing the rotating, aligning and scaling of data components and groups until they fit into a new arrangement.
Figure 8B:
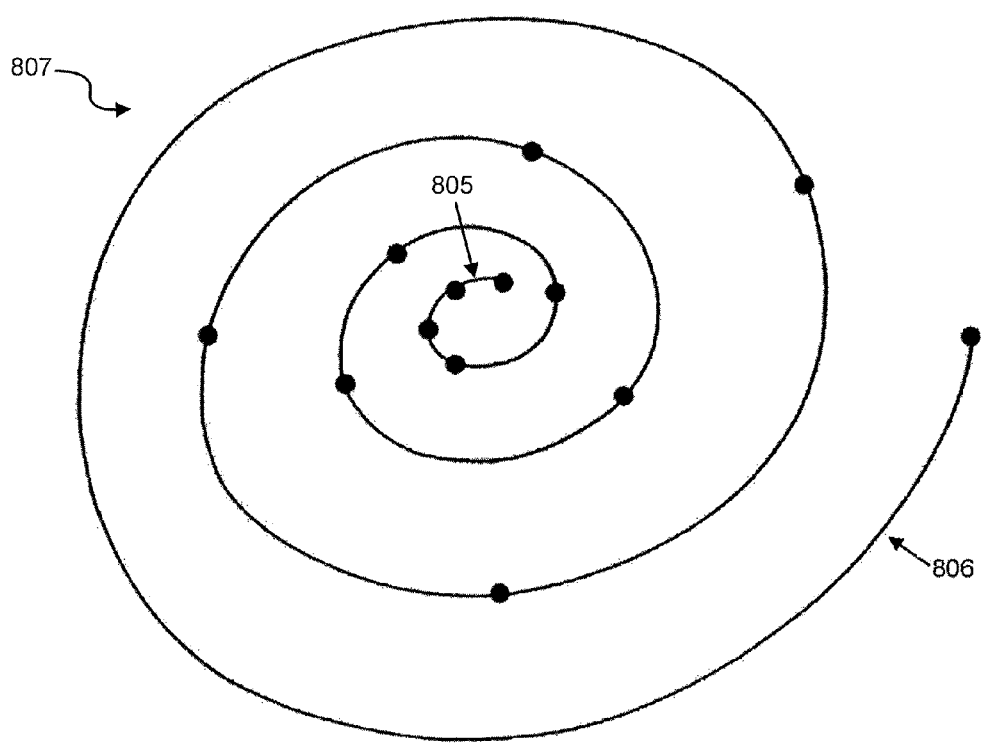

FIGS. 8A, 8B are diagrammatic views of a data cloud, showing the rotating, aligning and scaling of data components and groups until they fit into a new arrangement. When components that originate at any scale, era, level or configuration are assembled into a new group, these arrangements and priorities are tracked using the Context Driven Topologies system.

FIG. 8A shows that, if a person or research group chooses to compare only one certain kind of temporal or mathematically assigned connection reflected by a certain type of arc (data 801), radius and rotation; the topology overall twists, transforms, scales, and moves as necessary (data 802) until the radius are aligned, compressed, expanded and virtually organized in high dimensions that do not change the overall mathematical identity. After the alignment and scaling procedure, usually working back and forth between the details and the overall (data 803) (3.11) (3.21) (7.13) (7.22) (7.26) (7.30) (8.3) (8.22) (9.15) (10.6) eventually the user knows exactly which particular data components and pre-existing groups (6.8) need to be extracted and analyzed (data 804).

FIG. 8B shows that Context Driven Topologies are mathematical patterns composed of a series of vector arcs, without straight lines, corners, or pixels at any time. When there is a "tight connection" between two or more ideas, it is assigned a short arc 805, "looser connections" have longer arcs 806, the radius and rotation also varies according to connection type (Section 4) (Section 7) (Section 9). The arcs 805 & 806, their current scale or compactness, radius and orientation in each individual arrangement are what is measured. By default, the arcs 805 & 806 become arranged into a seashell pattern 807 with the tighter arcs 805 and therefore more connected objects and ideas toward the top and the looser connections 806 automatically falling into the background. The viewer can always control how much information they see at any time (Section 7) (Section 9). In some cases, the tight connections are too obvious and a user prefers to go deeper to make new connections. When this happens even if the components are not changed, the systems and methods described herein are used to reprioritize and structure or otherwise "flip the shape" to make a new topology showing a new set of tight to loose connections.

Figure 9:
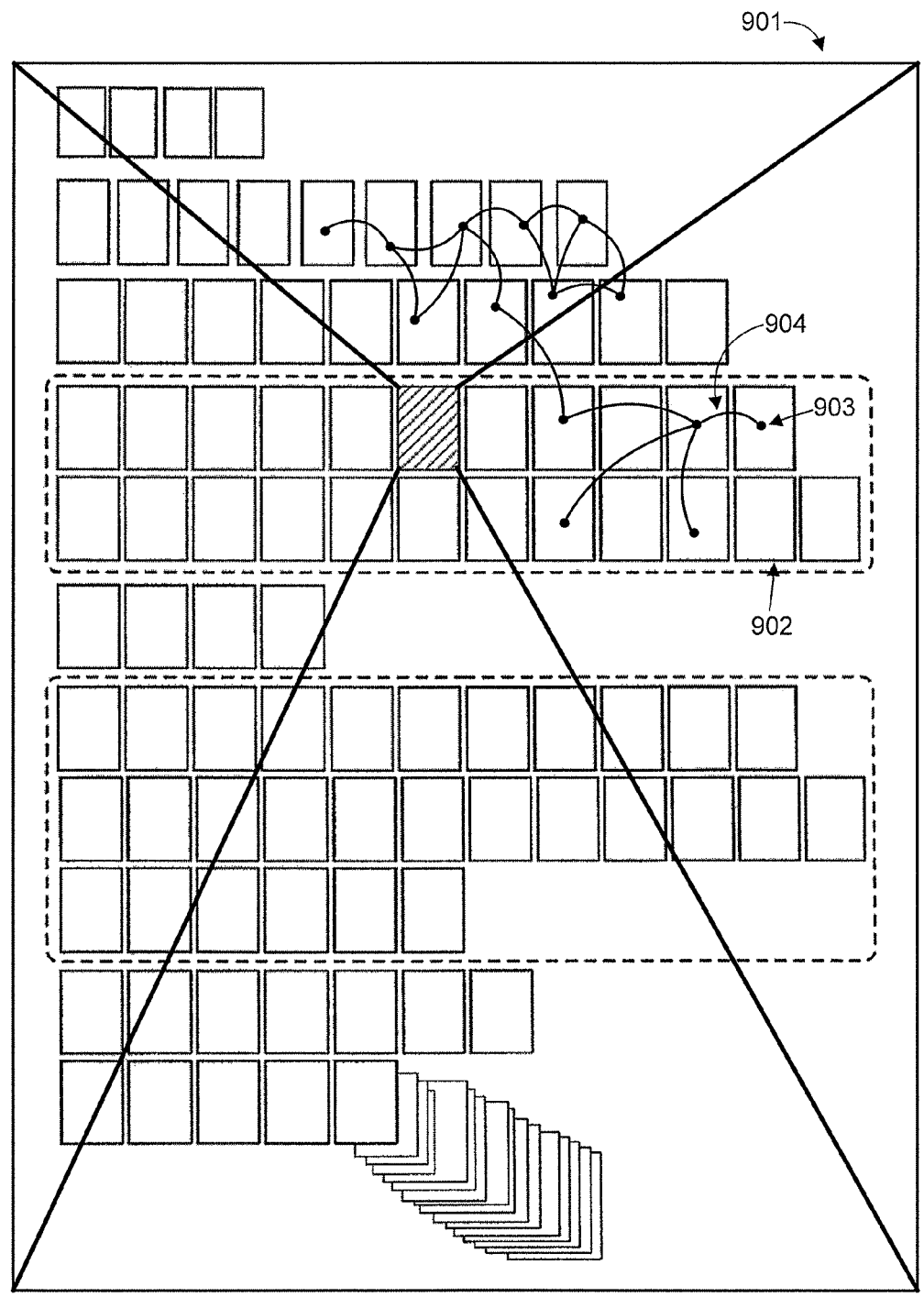
FIG. 9 is a diagrammatic view of a data cloud, showing the self-referring relationship between a Context Driven Topology and a component location.

FIG. 9 is a diagrammatic view of a data cloud, showing the self-referring relationship between a Context Driven Topology and a component location 903, using a sketch of the content of these specifications and selected reference arcs 904 between the paragraphs and claims 902, the self-referring relationship between a Context Driven Topology and a component location 903 is shown on three levels 901.

FIGS. 10A-10E are diagrammatic views of a data cloud, showing a Context Driven Topology in three states: configuration, symbol, and waveform. Context Driven Topologies are high-dimensional and dynamic, they cannot be drawn as fixed two dimensional lines, nevertheless, the topologies in their three states of use are illustrated in FIGS. 10A-10E.

FIGS. 10A-10D are diagrammatic views of a data cloud, showing a Context Driven Topology in the configuration state as an underlying structure connecting a group of arranged data.

Figure 10A:
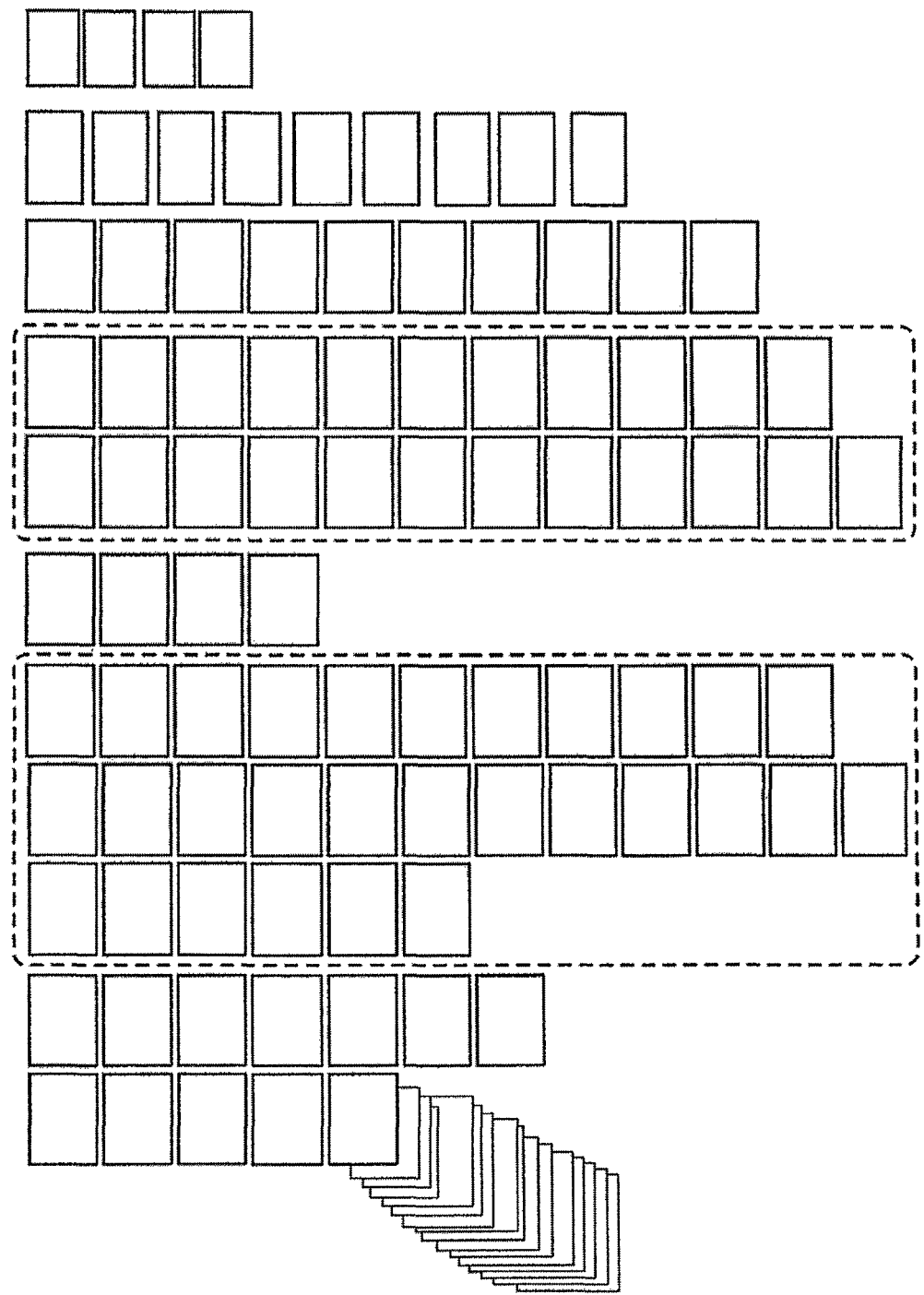
FIGS. 10A-10D are diagrammatic views of a data cloud, showing a Context Driven Topology in the configuration state and waveform state, and the system for implementing an embodiment of this invention.
Figure 10B:
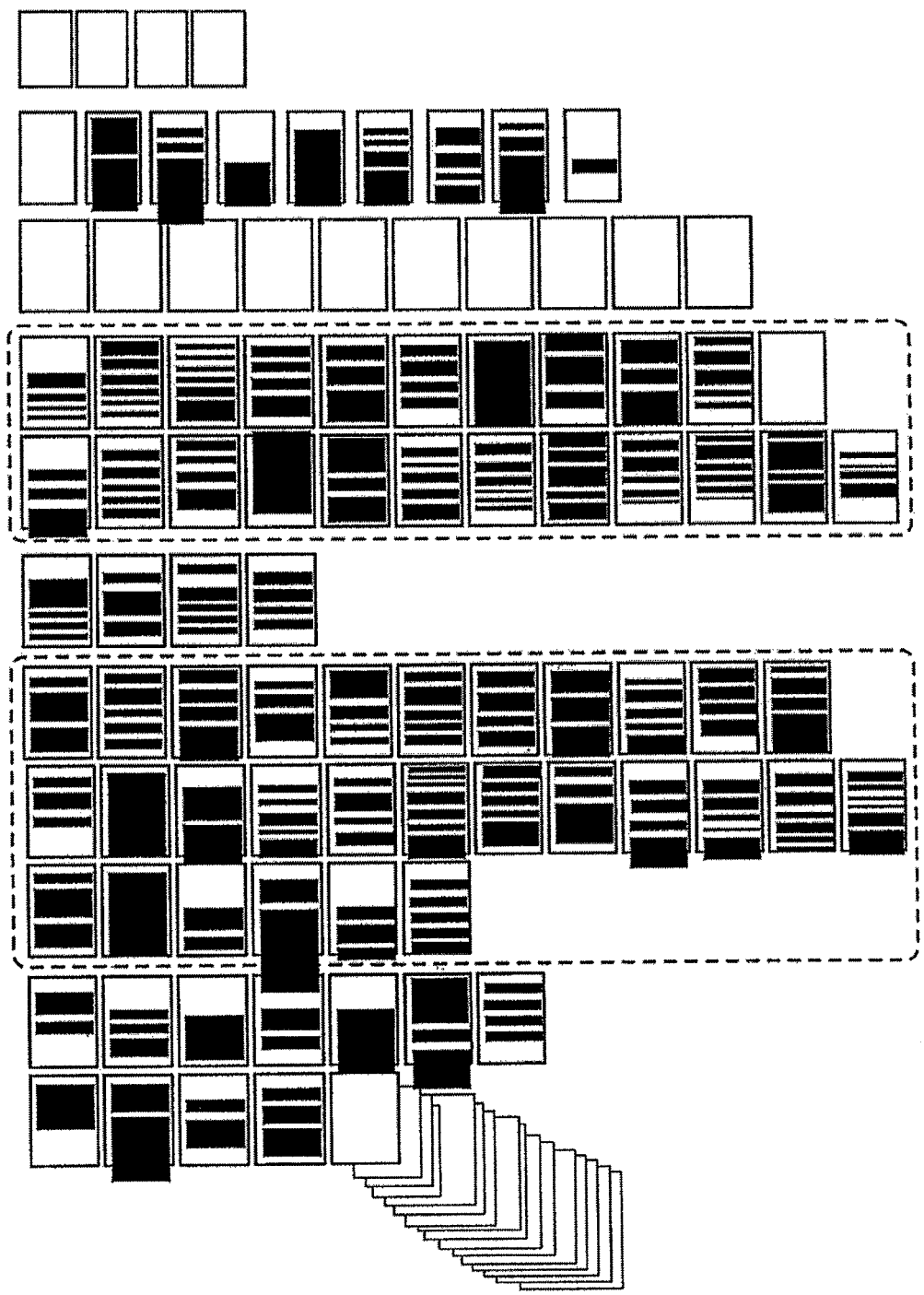

FIG. 10A shows Step 1, in which the content of these specifications are used; again the pages, sections, and paragraphs are shown. FIG. 10B shows Step 2, in which page breaks are removed. Because page breaks are not relevant, this unintended grouping is removed and simplified. In Step 3, context and references between paragraphs are indicated by (incorrect) arcs. In Step 4, typically the arcs are arranged to correspond to the temporal or mathematically assigned degree of connection [FIGS. 8A, 8B]. However, this particular topology (made by assigning arcs to the references within this document) show a set of linear connections (the pages and paragraphs in this order). In the future, this topology can be use to show this set of content arranged in this same order pages 1 to 117, or by priority from tighter to looser connections, or the density of the most connections (in this case the Claims and 8.3).

Figure 10C:
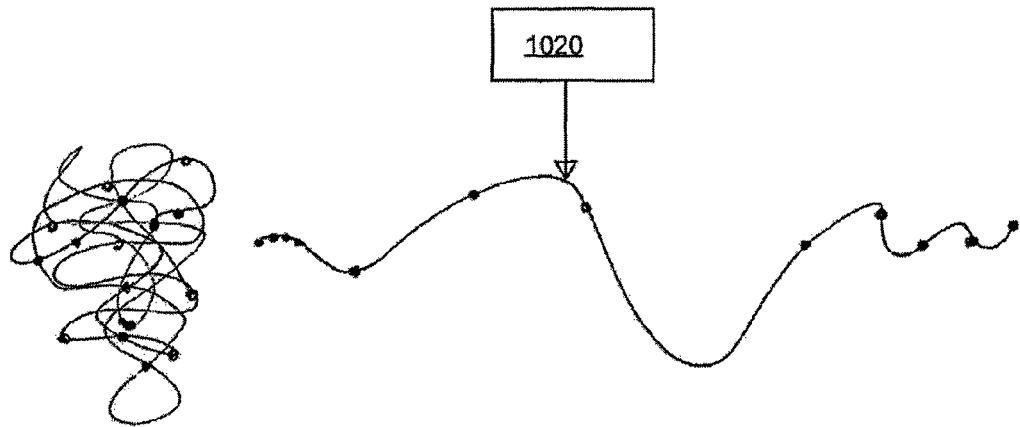
Figure 10D:
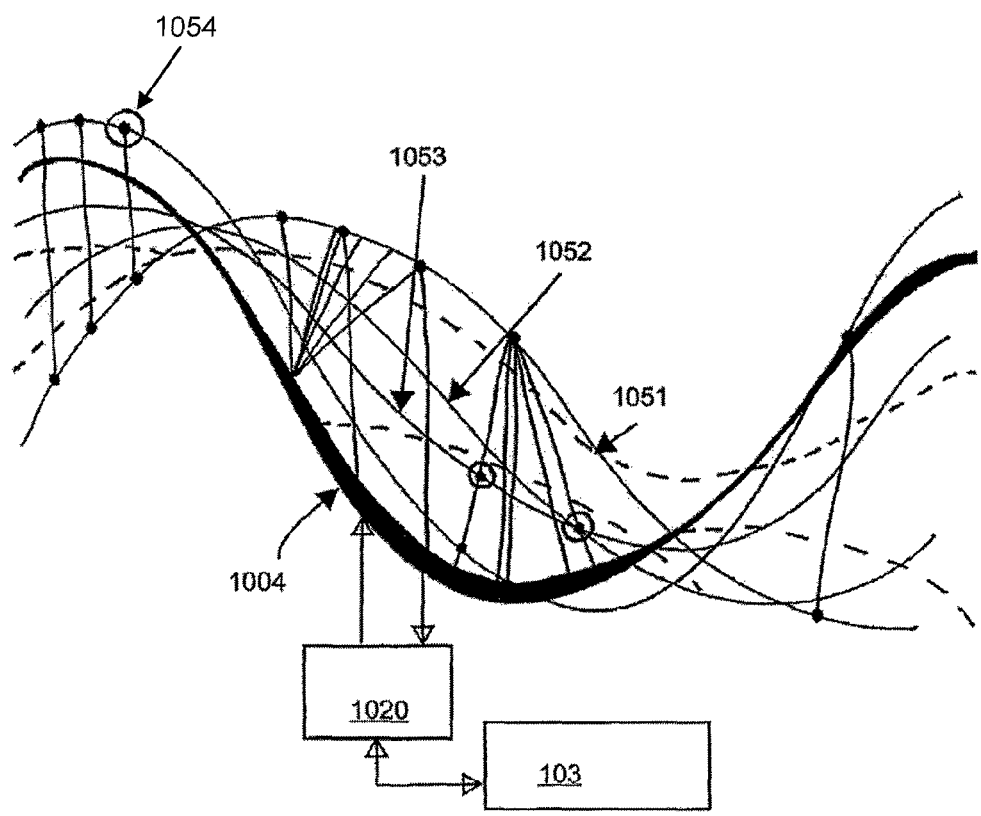
Figure 10E:
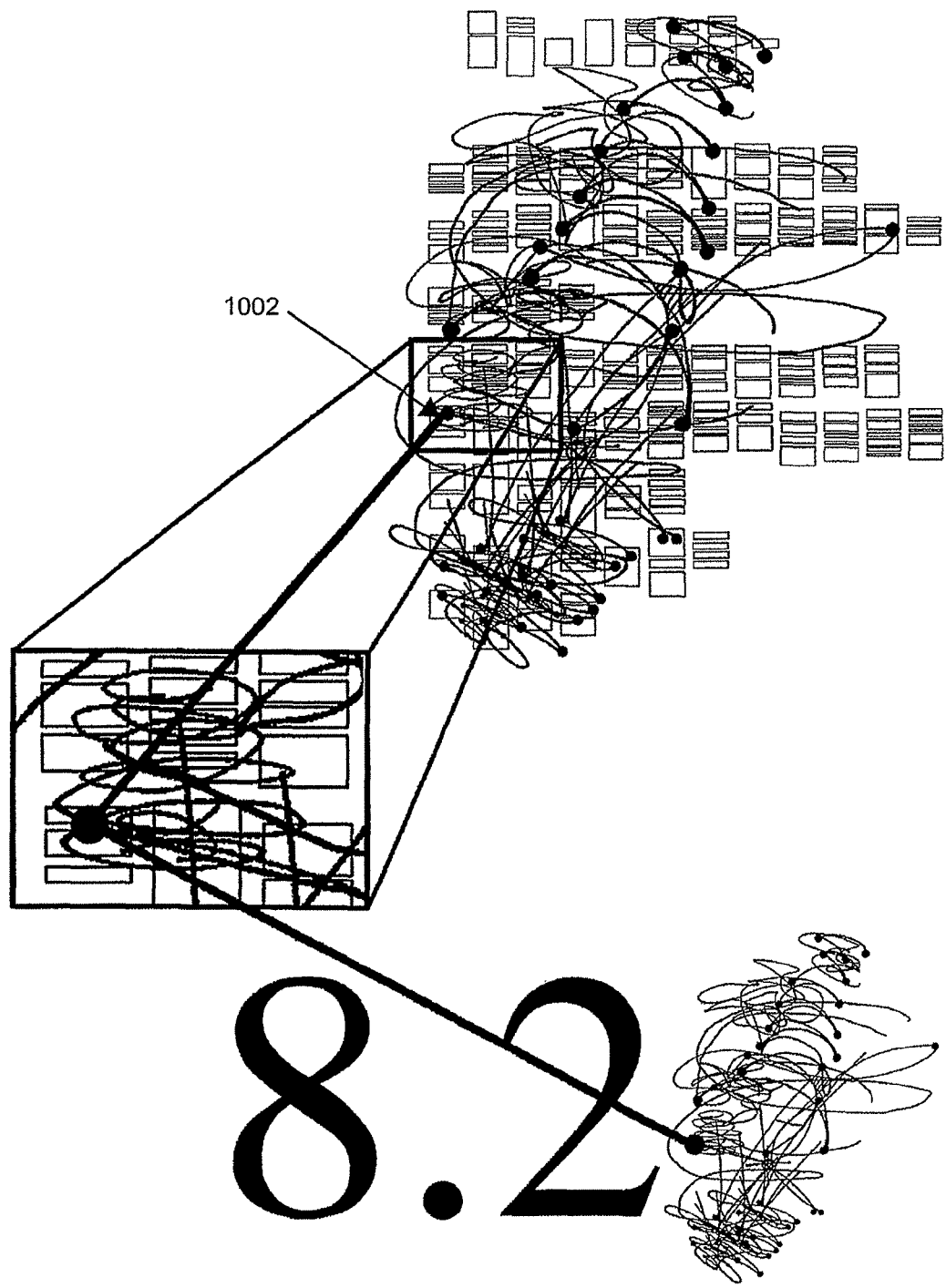
FIG. 10E is a diagrammatic view of a data cloud, showing a Context Driven Topology in the symbol state.

FIG. 10E is a diagrammatic view of a data cloud, showing a Context Driven Topology in the symbol state. In FIG. 10E, a Context Driven Topology is 'compressed' into a symbol such as dot 1002 inside descriptions, used as a map. In Step 1, an area of concentration, in this case paragraph 8.2, is identified and isolated. In Step 2, placement within the hierarchy is indicated by a dot symbol 1002. In Step 3, the topology itself, including a self-referring [FIG. 9] emphasis on this placement is embedded into the mathematical (in this case just the paragraph number 8.2) as part of this component's description. In the future, this history of this component will always show how it has been placed in the context of this overall document. If this exact component, all of the words in 8.2 described by the number 8.2 are used in a different document or assigned a different context in this document, this will create another, linked, topology. Streamlining these links over time, and providing machines with "something to measure" that is able to reflect and compare histories of temporal connections is one purpose for the systems and methods described herein.

FIGS. 10C-10D are diagrammatic views of a data cloud, showing a Context Driven Topology in the waveform state, and the system for implementing an embodiment of this invention. In FIG. 10C, a machine such as computer 1020 expands a Context Driven Topology into a multidimensional waveform. In FIG. 10D, the computer 1020 displays the waveform comprising data points 1054, putting it into the stream for being simplified overall and compared with other topologies.

In each case, the Context Driven Topology is mathematically the same in any state to machines at all times regardless of how it is being used. For example, topologies used in a library will typically stay in the symbol phase. A theorist will typically rearrange the structures; an analyst will compare waveforms and see where pathways contained within the history of symbols and configurations leads. Patterns generated by comparing these topology behaviors and uses are recognized by either people or machines for different reasons; people may be interested in how often information has been used; machines may be able to compile and consolidate as in consolidated waveform 1004 the topologies in groups we may not have put together or broken apart yet. People will not know what machines are consolidating until we look for it this particular way; otherwise it is a structure, a symbol, or a waveform we are using for our own knowledge, investigations and expressions.

Sections
1. Context Driven Topology
2. Concept Boundaries and the Annotation Process
3. Symbolic Characters and Their Function
4. Evolving Mathematical Knowledge Patterns Converted into Multidimensional Wave Forms
5. Metaphors
6. Monitoring, Controlling, and Influencing Information Placement and Proximity Over Time
7. Use of the Automatic Evolving Audio and Visual Language and Display Patterns
8. Shared Memory
9. Data Curation and Digital Preservation
10. Specific Embodiments and Applications
11. Location Index 1. Context Driven Topology 1.1 When mathematical topologists consider knots and entanglements, they usually imagine a knot by also imagining the space around it. If neither changes, then the knot will persist. The systems and methods described herein apply mathematical topology, algebra and new pattern generation and recognition techniques to digital information context by putting knowledge and ideas into a stream to see how they become entangled, can be separated from their background, recognized from different points of view, interrelated, and influenced over time.

1.2 Context Driven Topologies are evolving records of data interpretations between people and machines. They are configurations, or knots, of information that people understand together, the space around them is everything else which we have no capacity to interpret or understand without computational machines. If the patterned space around a knot of information changes, so will the interpretation of the information.

1.3 Context Driven Topologies are information 'wholes' constructed of any number of components.

1.4 Comparing or consolidating groups of Context Driven Topologies that share components automatically overlaps, masks and deletes duplicative components to eliminate redundancy (3.12) (3.31) (4.15) (10.1). Measurements to specify what makes components "the same" is adjusted by each user through the use of mathematical description patterns (Section 2) and a history of previous associations (2.12) (3.7) (3.10) (7.2) (7.16).

1.5 The process of consolidating and comparing Context Driven Topologies through the use of mathematical knowledge patterns and their shared histories will cause components, and topologies that share components, to be drawn towards each other from common histories deep in the background. This 'movement' or 'relocation' towards adjacency is prompted by machines processing the mathematical description patterns (Section 2) into simplified sets that are easier to calculate. There is usually a reason why information has been associated before. Associations made visible using the systems and methods described herein may exist over longer time scales than an individual or research group exists, which could lead to new insights and interesting discoveries.

1.6 The systems and methods described herein comprise a process and methodology to begin looking through large scale museum and library digitization projects, automated scientific experiments, specialized databases, internet accessible publishing and other complex shared information. It is also an automatic system to improve the quality of data in dynamic shared data stores (1.11). It will train the shared information and memory space to prefer threads of knowledge that have been thoroughly reviewed and discussed to give these data arrangements a greater chance of persisting because they might be true, regardless of the fact neither people nor our current machines may be capable of fully understanding these arrangements yet.

1.7 People accept so many ideas as true today and false tomorrow. Along the way, we have always retained too many misleading misconceptions, too many copies of ideas that were not proven to be useful. Simple truths can become lost in a labyrinth of inaccessible, disorganized record keeping styles and priorities. The systems and methods described herein make direct use of concurrent and conflicting priorities and varying interpretations of complex shared information to gradually streamline [FIG. 3] (3.11) (3.25) (4.6) (4.18) (6.9) (7.8) (7.18) (7.23) (7.37) (8.1) (8.6) (8.7) (8.18) (8.22) (9.17) and delete specifically incorrect shared information a very precise way determined by the people who use and understand this information.

1.8 Most ideas and processes change in small increments or through events that are never recorded; the systems and methods described herein are needed to help fill in these gaps.

1.9 The pace which ideas and processes change within the same complex evolving data arrangements and data collections directly corresponds with the pace each idea or process changes. This is necessary because different domains and cultures accept and reject ideas and processes at different rates, therefore, any dynamic data collection that crosses domains and cultures must have mechanisms to allow the pace of each individual change to be reflected at the rate which each domain or culture is satisfied with the change.

1.10 The systems and methods described herein enable people to see ideas, processes and changes more clearly because each one can be evaluated apart from their background at any point in time. This will provide new ways for people to understand overall patterns, trends, interrelationships, failures and successes that led to each incremental change. Measuring these changes, which people do evaluate and understand both incrementally and overall, will lead to future understandings people were unable to evaluate or understand in the past.

1.11 The systems and methods described herein will help weed out low quality or incorrect shared data, and provides tools to fill in the blanks, gaps and consolidate new overall pictures that people did not have reasons, or the means, to interpret before (2.7).

1.12 Both people and current shared data stores preserve far too much information, such as bank transactions, that by its very nature is either temporary or continually changing and could be eliminated from long term data stores by assigning these kinds of data and data relationships an automatic lifespan. It is also true that some ideas simply have their time and need to gradually fade away (9.8).

1.13 Unexpected commonalities are beginning to emerge between unrelated fields at all levels. Context Driven Topologies are a mechanism to build virtual bridges of understanding between cultures and domains at deep levels to pose and investigate unexpected questions that may not be developed between knowledge systems and machines at the time when they make sense in a person or research group's imagination.

1.14 The systems and methods described herein are intended to be used for published, open source information, such as scientific journals and art criticism that is meant to be shared and challenged. Using the systems and methods described herein with information that is not as open to interpretation or may require only certain components and relationships to be shared, is specified in (Sections 7, 8, and 9).

1.15 Irrelevant, outdated, misleading or incorrect information not only distracts all searches and research efforts; but coinciding with the exact time most people are overwhelmed by unreal quantities of readily available and closely related data, all people are rapidly losing valuable information generated by expensive studies and told through unique voices we will not hear in the future if this information resides on unstable media created through systems and devices that no longer function and will never be repaired or reinstated. Currently, there is no unified language free forum to discuss information's relevance, "up-to-dateness", or correctness. There is no shared storage space to maintain together, no reason to cling to obsolete programs, devices or media; therefore, most current information is permanently lost.

1.16 At 200 years, books have a longer life than current digital information. At 100 years Daguerreotype type photographs survive yet early photographs that were claimed to be permanent because they were printed on paper, are degrading faster than people can scan them. What will we do with all the images that are scanned? What resolution are these scanned images? Will people be able to read them on systems and media in ten years? Who is choosing which ones to scan while the others degrade? There is a hope of promise that shared information, such as images, is being captured in an encoded digital form that, theoretically, should be able to transfer across generations independent of a media. The first step to implementing the systems and methods described herein is already underway, the question is, what use is this code representing these images that represent our experience if there are far more images than can be understood by one person or even a large scale study involving hundreds of people over a decade? Machines do not "need" this knowledge like people do.

1.17 The mathematical patterns in Context Driven Topologies encapsulate, consolidate and automatically update specific program functions required to read the specific group of data components and data arrangements captured in each topology (9.4) (9.12) [FIG. 4]. Long term digital preservation requires both the data itself, and the means to interpret it, be united. The forced separation between hardware and software to enable the rapid, staged development of information technology is a great disservice to long and short term digital preservation.

1.18 The purpose of the systems and methods described herein is to establish a consistent, reliable way to organize, identify and retrieve information that is relevant or interesting for specific purposes without the user, research group or data itself becoming lost in an unmapped sea. It will never be possible to accurately identify specific purposes or uses that current information may have in the future. People simply need to digitize, organize, and store as much high quality information as possible in a very precise, measurable manner so that the more specific a future query is, the more relevant, interesting and accurate the retrieved information will be. A preservation effort of this type is partially to understand the past, but more to participate in the future.

1.19 The relationship between 'things' and 'information about things' has gradually slipped out of control over the past 150 years. For example, what do the specifications for the first, original patent of a gasoline powered engine look like compared to the new 2004 engines? Who would wish to compare these? If real life worked as neatly as one single patent that had a tight and immediate connection to every 2004 model as it is coming off the belt at the factory, it would be easy to compare the original idea with a series of current variations. In reality, life and progress are much messier and disconnected. It is staggering how many classifications of inventions are patented in the United States alone. Internal combustion engines are assigned their own class; there may actually be fewer 2004 engines. The systems and methods described herein answer a need for the relationship between 'things' and 'information about things' to become more realistic and efficient.

1.20 Currently, the dialogue between people and machines is either encoding that has little meaning to people, or descriptions based on natural language, or key words, that have too many associations and cultural interpretations to be a precise system of measurement for machines (7.22). One current problem the systems and methods described herein specifically address, and our new connected age needs to address from many directions, is the fact that people need to be able to describe what they are looking for to machines in more meaningful, measurable ways. The automatic language (Section 7) and system of mathematical patterns of the systems and methods described herein evolve specifically to accommodate changing natural and machine languages a measurable way.

1.21 The systems and methods described herein are a new form of measurement that allows for new measurements and more precise descriptions over time. Currently, people cannot search images, visualizations, high dimensional graphs and other mathematical, visual or audio materials except through key words or meaningless measurements, such as 78% cyan. People today do not have a way to describe the data they seek in machine based language that corresponds to human based reasons for the query. To navigate and interpret the vast seas of data that are currently unmapped, a user needs to be able to get to the essence of why each particular data arrangement is unique. The processes of the systems and methods described herein (3.27) allow users to search and access complex histories, thoughts, images, studies, visualizations, drawings, flow, transformations, cultural objects, stories, expressions and purely mathematical relationships using the actual measurements, related images, graphs etc, themselves as a search and recognition technique.

1.22 The systems and methods described herein are intended for information that has been generated for a reason. This data may be measured for one reason when it is originated and different reasons in the future. For example, if an astronomer captures a 999 dimension data array originating from a particular point at a particular time to detect a particular relationship, in fact, this astronomer may have captured something else that even the most brilliant observer is unable to recognize yet or know how to describe using current knowledge and machines. The important and new measurements potentially hidden in this data array will naturally be described and derived differently by scientists in the future because they may be measuring the array for different reasons. However, the reasons the future scientist is even aware of new relationships in the existing array are often directly related to the reasoning and questions posed by the original scientist. A teenager downloading pop music is not likely to stumble across this information because they do not know how to describe the measurements precisely enough, and float through the shared information space at a different level.

1.23 An important purpose of the systems and methods described herein is to give machines something to measure that reflects human reasoning (3.6). The way people think, describe, partially describe, remember, recognize, identify and derive associations between information so machines can help us to identify and create new associations we may not be capable of recognizing on our own. The systems and methods described herein are a new way to show machines related examples and similar versions that explain why certain groups of information, contexts, time periods, and relationships are more important than others. Currently, most data components 'feel' interchangeable and equal, there is no depth or texture. A machine or network can capture which information is used more often but has no means to measure, compare or understand why except pure statistics. The systems and methods described herein illustrate these reasons through alignment (9.8), density (3.17) (4.2) (4.11) (5.3) (7.26) (7.28) (7.36) (8.3), texture (1.23) (3.18) (3.33) (7.29) (7.36) (7.38) (7.42) (7.47) (8.7) (8.11), color (7.28) (7.29) (7.42) (7.47), intensity (7.7) (7.28) (7.47) and other disclosed techniques that machines are already capable of measuring.

1.24 Current data relationships, network topologies and data stores (even dynamic data stores) are typically in even arrangements with equal, practically interchangeable components geared for machine processing rather than the fluid, variable human imagination and investigation process. This is caused by an overdependence on electrical pulses. The mathematical memory patterns of the systems and methods described herein are more suited to continuous patterned waveforms, similar to existing radio or cell phone technology, rather than electrical pulses, which are more suited to current machine languages and equal information packets or components. These waveforms (Section 4) are intended be independent of electricity and electrical pulses.

1.25 The form of the long-term dialogue between people and machines needs to change soon or our reasons for generating this deluge of data that keeps growing exponentially, every minute, in both complexity and quantity, will not be as useful as it could be. Current machines have no sense of deadlines which have an enormous affect on most users. The systems and methods described herein will change this dialogue by clarifying the roles of human imagination, conceptual leaps, decision making skills and real world concerns versus the role of machine computation and advanced network communication across domains, cultures, platforms and languages using software, programs and systems spelled out in the claims, using techniques partially disclosed herein and developed further through an upcoming project [FIG. 6].

2. Concept Boundaries and the Annotation Process 2.1 People are able to communicate with each other, and machines, concisely and clearly using symbols. Symbols become associated with ideas very easily. Mathematics and symbols do not speak one natural language over another, their arrangements and sequences can be precisely recreated, and both people and machines can learn to understand them. Creating symbolic mathematical forms and patterns to illustrate data characteristics; map data relationships, understanding and knowledge over time; and 'automatically' preserving these symbols as pathways for future interpretation is the heart of the systems and methods described herein.

2.2 Information at any level is easiest to identify, work with, and derive meaning from when it is concisely and accurately described. Even with all of the current and confusing protocols, data descriptions still vary tremendously in different fields, especially for new ideas. The annotation system of the systems and methods described herein is mathematically based and enhanced by a series of character-like symbol generation and recognition processes that will eventually streamline (1.7) and authenticate interrelated data descriptions over time. As these data descriptions become more intertwined, streamlined and authentic so will information dynamically retrieved and stored knowledge.

2.3 The relationship between the overall process of the systems and methods described herein and the annotation system is more similar to music than any natural or machine language and involves the following steps:

2.3a To assign an identity to a group of data, it is first described through an intellectually assigned alphanumeric code. For example, the USPTO uses patent numbers that are further contextualized into classes and subclasses. Many existing numbering systems, such as patent classifications, evolved from systems that were established before computers. Over time, these existing systems have needed to expand and separate in certain areas to keep each field narrow and precise. For example 345/440 Graph Generating versus 345/440.1 Real Time Wave Form Display versus 345/440.2 Bar Graph. It may seem convoluted to people that do not regularly use the system, but the majority of numbering systems that have evolved gradually over time generally do reflect a certain logic or have meaning to people that use them. Therefore, the first number for any group of information at any level is assigned by the person or institution responsible for this information's interpretation, maintenance and organization. Other examples in addition to patent classifications include: museum object numbers, scientific reports, Dewey decimal system, etc. Generally, even today, if a user can identify the person or organization who either created or is responsible for the information they seek, provide a specific number within their particular classification or numbering system, the information is easily found in its entirety, and usually also linked to related information.

2.3b If an established numbering system does not exist for a newly created data group, it is assigned a code based on numerals to avoid the potential confusion of accidentally producing words.

2.3c As information begins to be associated with other information, new layers of encoded descriptions begin to supplement the original number. The example below is a museum object number for a painting. This, partly fictitious, description is for a painting by Franz Klein entitled "Delaware Gap". This numerical code, which eventually becomes part of the mathematical description, could begin as:

123 4567 89 the Smithsonian Institution 42 the Hirshhorn Museum and Sculpture Garden 66.2751 the original object number, in a unique system established by the museum themselves.

Of course, none of these numbers describe anything about the painting itself.

There may be a URL address to see an image on the web, which in this case is: http://hirshhorn.si.edu/collection/Artist=Franz+Kline&Title=Delaware+Gap There is more information specific to this painting:

American, born Wilkes-Barre, Pa. 1910-1962

Oil on canvas

78¼×106⅛ in. 198.6×269.5 cm.

Gift of the Joseph H. Hirshhorn Foundation, 1966

Any user can infer from this description that this painting is taller than most people and very wide even if they are not able to be in a space next to it. An internet user can see it is black and white. A reader can understand the artist is American, remember something about the country's mood at that time, or do the math and learn that the painting was accessioned after the artists death. The group of facts in the description begins to tell the story behind this object, however, each description searched individually is too broad to ever lead to this particular object quickly as an individual query out of context.

Assigned codes for the painting described above could read as: American, 5789034; born 1910, B1910; died 1962, D1962; Wilkes-Barre Pa., 18701 which happens to be a zip code; oil on canvas, 1524.5693; 78.25×106.125 in., 198.6×269.5 cm.; Gift of the Joseph H. Hirshhorn Foundation, 99508; accessioned 1966, A1966. There are some areas where the alphanumeric codes actually correspond to the information they abbreviate, but more often they do not, especially when viewed together in a string:

123 4567 89/42/66.2751/http://Hirshhorn.si.edu/collection/Artist=Franz+Kline&Title=Delaware+Gap/5789034/B1910/D1962/18701/1524.5693/78.25×106.125 in/99508/A1966

People understand long descriptions that are not words, much easier if the components stack:

123 4567 89
42
66.2751
http://Hirshhorn.si.edu/collection/Artist=Franz+Kline&Title=Delaware+Gap
5789034
B1910
D1962
18701
1524.5693
78.25 × 106.125 in
99508
A1966

But there is no room for these kinds of stacks in records people prefer to have condensed. There may be a break between pages or strings which leads to partial descriptions and potential confusion. A priority is implied by information being on top or in the beginning of the description (Section 6). If the user does not know the order of the categories, they may infer the wrong ideas or background—did the artist live in Anchorage Ak. 99508? No, he lived in Wilkes-Barre Pa. 18701, the painting was a Gift of the Joseph H. Hirshhorn Foundation 99508. Therefore, context driven descriptions cannot be in any specific order (8.3) any more than they can use one mandated numbering system.

2.3d Codes to describe groups of information in more detail are also initially assigned user by user, institution by institution, numbering system by numbering system. Today new systems are being implemented, such as the Dublin Core Metadata Initiative, http://dublincore.org/, to establish standards across institutions and their individual description or numbering systems. As introduced in (2.11), the systems and methods described herein take the descriptions of digital information a step further (7.17) (7.27) (10.2). As shared groups of information are associated [FIG. 7] [FIGS. 8A-8B] (1.5) (2.1) (2.3c)

(2.5) (3.12) (3.14) (7.10) (7.11) (7.14) (7.15) and evolve together, common descriptions will eventually consolidate [FIG. 4] [FIGS. 10A-10E] (1.11) (1.17) (3.11) (3.25) (7.21) (7.34) (7.34) (7.43) (8.18) (9.12) (10.6) as machines compile endless variations of similar descriptions together at the same times while they are being grouped (8.3), identified (3.15) (3.20) (3.27) (6.3) (7.9) (7.24) (8.3) (9.6) (9.12) and processed in parallel all together at the same time in user queries and data arrangements. By using the systems and methods described herein, people will eventually begin to describe shared information using shared codes and gradually forget the old numbers and codes the same way word usage changes in language (10.2). Until that point, because a machine is compiling all of the possible descriptions simultaneously [FIG. 3] (3.31) (7.31) (7.34) 8.11) (9.11) before people see the information described by these codes, numbering systems that are in tight concordance are able to be displayed in any language, format or matrix preferred by the user through the use of filtering and rotation techniques as illustrated in [FIGS. 8A-8B] and (Section 7, 8 and 9).

2.4 The example above in paragraph (2.3) describes immutable facts about an object. The name of the artist is Franz Kline. This particular object and portions of its history can be accurately conveyed through a mere 12 descriptions. Another data group may require 249 descriptions, only 3 of them immutable facts. There is no standard, 1 is the minimum, and there can be no maximum. There can be partial descriptions because partial descriptions are necessary to interpret certain kinds of data and data groups. However, when descriptions are precise, obvious or true, fewer are needed which instantly tells the user something about the information. The systems and methods described herein make variations between descriptions more observable.

2.5 There is also the real situation that some people mislead or outright lie in descriptions. What if the painting above was a forgery (8.3)? Descriptions, factual or not, are selected by people for any number of reasons. For example, it is an established international convention since we began keeping records to describe art by indicating the artists' heritage because culture is an essential feature of artworks. But there are other reasons the description American 5789034, could be used to describe other groups of information unnecessarily, or in ways that may not be true. All of these associations and information together begin to illustrate a picture of what is "American". It is up to Americans, or any other culture that is diverse and constantly disagrees, to be able to establish our own consensus of what this picture should look like. For example, it is not fair if the description American 5789034 is applied to a silly movie just because our popular culture gets a lot of attention and this movie is silly, when in fact, this particular silly movie was made in India 84760128. Perhaps what really matters about this movie is that it makes people laugh, and that is the fact that will continue to be associated and used as a description for the encoded audio and moving image sequences that comprise this movie in a media-less digital record form in the future. The systems and methods described herein and their processes provide reliable, consistent mechanisms, described in (Section 8) to expose and combat false or misleading descriptions by specifically and realistically accommodating concurrent and conflicting interpretations by getting these descriptions to overlap, cancel and influence each other over time.

2.6 Each description is actually only an interpretation no matter how appropriate, concise or accurate it appears to be. There are certain kinds of descriptions people may never be completely sure are true. This applies equally to a 999 dimension data array where the even the most brilliant astronomer who had the unique foresight to even think of capturing this raw data does not have the knowledge or machines to recognize an important relationship hidden inside the data; or a colorless painting created during a time of prolific color that may never be fully understood, not even by the artist. Therefore, this type of original information has a much greater long term value when it is kept apart from interpretation. The "placeholder" system of the systems and methods described herein and explained in paragraphs [FIG. 4] (2.10) (3.14) (3.26) (7.21) (10.8) leaves originals unmarked to accommodate this unique knowledge and interpretation based situation.

2.7 All knowledge has been handed down word of mouth, equation by equation, theory by theory, image by image, sound by sound etc. even before people started keeping records. It is only now that people have the opportunity to analyze larger, more detailed groups of data and data relationships together. When original ideas and knowledge are captured using the systems and methods described herein, this is converted in a pure patterned, encoded manner that is able to transfer to subsequent generations of people and machines. Therefore, the ability of the systems and methods described herein to reflect historical comprehension along with improved machines, is nearly guaranteed to enable new ways for people to understand, infer, and ask more direct questions of data and data relationships in the future by comparing new and old knowledge on new generations of machines (1.16) (2.7).

2.8 Machines will never be able to tell people when data descriptions are "best" because they have no attachment to or innate understanding of the information being described, or the relationships people wish for them to derive. The systems and methods described herein make these attachments and understandings more obvious by letting people, throughout time, argue about and decide which data descriptions and associations are best.

2.9 As introduced in (2.3), it is only from a person or research group's point of view that data can be seen in more sensible groups if they are described separately; or more cohesive when similar groups merge into one instead of a choppy series of semi-related pieces. This is the largest problem with existing metadata methods—rigid sets of descriptions that often require leaving fields blank or making up unnecessary descriptions for pre-defined categories are not important or even applicable to particular works, thus gearing current metadata systems to machines—who do not 'really' understand information, instead of people—who do. Therefore, the systems and methods described herein comprise a better form of metadata.

2.10 The systems and methods described herein, like many inventions, simply pretend all information is an object or group of objects. Various interpretations and objects appear to scale by implying adjustable boundaries (3.11) (3.12) (3.16) (3.18) (5.3) (7.3) (7.17) (7.24) (7.30) (7.31) (7.32) (7.32) (7.36) (7.38) (7.39) (7.48) (8.24) (9.11) to permit associations that may not have been possible either in real life or machines that exist when the association is discovered in a person or research group's imagination. The systems and methods described herein provide an easier, better way for these objects to virtually merge or be broken into individual components because these objects are not required to function in real life or real machines. As introduced in (2.6), they are only virtual copies of original objects contained within the placeholder position which DO work in real life and at least at one time functioned in a real machine. The methods described herein for scaling data as objects and relationships also lead to better ways for the topologies between advanced networks of machines to scale.

2.11 The descriptions of the systems and methods described herein act as boundaries around flexible information groups rather than rigid bodies, fixed lists, or long meaningless strings. The example above is a painting. In another case the group inside the adjustable boundary is the entire Computer and Information Science and Engineering Research Directorate at the National Science Foundation, or a homemade web page with two songs and four pictures of the grandkids.

2.12 The descriptions and boundaries of the systems and methods described herein form 'wrappers' that appear (Section 8) to bind groups of information together. The information 'inside' paragraph (2.3) is one specific painting in a specific location:

---

123 4567 89 42 66.2751
http://Hirshhorn.si.edu/collection/Artist=Franz+Kline&Title=Delaware+Gap
5789034 B1910 D1962 18701
1524.5693 78.25 × 106.125 99508
A1966

---

A group that compares media and sizes may contain hundreds of paintings 'inside' and is described as:

---

1524.5693
78.25 × 106.125

---

(Section 3) explains how the systems and methods described herein link these groups together through previous associations and descriptions, and why these groups appear to be the same 'size' to a machine.

2.13 Machines decode, encode, virtually scale and convert mathematically based descriptions and adjustable boundaries using techniques, software, programs and systems disclosed in the claims, partially explained herein and developed through an upcoming project [FIG. 6].

3. Symbolic Characters and Their Function 3.1 As introduced in [FIG. 3] [FIGS. 6A-6C] [FIG. 7] [FIGS. 8A, 8B], when a user, or group of users, decides a meaningful group of described and partially described information is arranged in a sensible hierarchy (3.6) (3.7) (3.10) (3.11) (3.12) (3.24) (6.9) (7.10) (7.12) (7.14) (7.16) (7.28) (7.31) (7.36) (7.46) (9.11), the relationships are ready to be captured in a Context Driven Topology. Machines can suggest when the arrangement may be complete but will never truly know when an arrangement is the most sensible or clear.

3.2 During the time people are creating, associating, reviewing, selecting and describing groups of information presented by machines—for example looking at images, reading text, constructing complex drawings and visualizations, downloading music etc. —virtual connections or reference arcs or links are being generated and continuously updated "underneath" these groups of information in both individual and networked machines to map these connections. For example, as shown in FIG. 2, link 213 forms between groups of data 212, 214; link 217 forms between groups of data 216, 218; and link 221 forms between groups of data 220, 222. These virtual connections are used to build temporary bridges between data of any type in any number of dimensions. The time and sequence in which these bridges are built show how ideas have been built. These connections form a conceptual map and mathematical pattern that can range from very simple, to intricately detailed and incredibly complex. The form and dimensions of these connections are able to vary tremendously because they are not tied to current concepts of machine topologies, nodes and hierarchies. For example, a statistician may be analyzing data in 492 dimensions, graphs in 2 dimensions, and explaining these together with text and equations in a paper, this will generate one kind of topology; an artist generates a series of pencil drawings, they are scanned carefully, each piece is only 2 physical dimensions but the digital information is high resolution and very dense so this generates another kind of topology. Generally, the viewer only sees their information in a collage and does not see the underlying structure.

3.3 The skeleton structure of the invented topologies is based on arcs rather than straight lines. Some the arcs may have such a large radius that they appear to be a straight line, but however slight, there is always a curve. An arc's radius varies according to the 'looseness' or 'tightness' of the connection between data components. As introduced in [FIGS. 8A, 8B], there are no corners between arcs, what may appear as a corner is actually a precise rotation in the way the arcs meet. Aligning and measuring these radii and rotations is one of the fastest ways for machines to compare data and data relationships very generally. These same arcs can scale when the same components are used in another context in another structure.

3.4 Like numbering systems, some of these topological forms may correspond to the data relationships they serve as an abbreviation for, but in most cases they do not. Unless a particular form is needed or regularly used for a reason, the default is a spiral or seashell. This forces information with tight connective arcs to be on top and looser connections to fall to the background (Section 6). It will also allow shortcuts across similar kinds of connections in zones, yet information will still be captured together in one continuous form.

3.5 Viewing the underlying topologies on their own creates a new level of abstraction and simplification to see and compile data arrangements as if they were one hierarchical whole. Modifying the underlying topologies directly is like making a sculpture to take data away, or put it into an arrangement that is more balanced.

3.6 These multidimensional structural topologies, like the implied description boundaries (Section 2), could only exist in a virtual world. They have no scale of their own and are only formed through the human decision process of establishing information hierarchy and context. As introduced in (1.23), Context Driven Topologies give machines something to measure—these arcs and their relationships—that reflects human reasoning and will allow for comparisons over time and across different modes of reasoning.

3.7 When users have drawn conclusions, Context Driven Topologies, become "set" into unchanging mathematical symbols. As shown in [FIG. 9], each symbol appears to be 'simplified' or 'compressed' into a map showing each information component in the context of the new hierarchy. Context Driven Topologies as they are used in the symbolic character, or mapping state, never change. The mathematical machine comparison of these symbolic characters is used to trace the historical context of each data component and its placement within data arrangements as people have understood them over time. Streamlining similar boundaries, descriptions, placements, contexts and topologies on different levels by aligning these symbols in high dimensions will help people to draw new conclusions from complex data collections we could not understand without machines.

3.8 The most important and useful aspect of Context Driven Topologies is the ability for both people and machines to recognize, and be able to compare, both very general and very detailed knowledge relationships by identifying proportions and densities at the more simple, abstract level of the topologies before 'reading' the entire descriptions of each individual component, or viewing the information itself in its entirety.

3.9 When conclusions are more obvious and data relationships more cohesive, the Context Driven Topology responds by becoming tighter and more balanced. The edges (3.18) (3.33) (7.2) (7.35) (7.36) (7.37) (8.6) (8.10) (9.6) change to reflect the 'status' of changing data relationships. Each topology takes on its own machine derived description to reflect the essential properties of this particular topology. It is unlikely people will understand the machine derived descriptions without the underlying forms and the evolving automatic audio and visual language disclosed in (Section 7).

3.10 Context Driven Topologies in the symbol, or mapping, state are subsequently simplified and mathematically compacted even further to fit within each component description as if they were a character in the description. As shown in [FIG. 9], each map indicates each component placement, proximity and priority in the hierarchy as a whole in a special, self-referring way as an "inside-out" view of the topology itself. The same component often has different meanings in different contexts/different topologies. Each component is a record of each topology, each topology is a record of each component. This relationship and history of placement understood through the symbols allows people to trace knowledge and association going in one direction, and helps machines to learn better placements in the future. These self-referring relationships and back and forth between knowledge components (or data) and hierarchies (or data arrangements) are the actions and decisions by people that form mathematical "knowledge patterns".

3.11 It can be such an extraordinary challenge simply understanding certain kinds of data or data arrangements clearly enough to form sensible groups, that placing components in a hierarchy to draw conclusions is something that has to wait regardless of how efficiently this data and data arrangement is described and annotated. Sometimes, very meaningful information that could lead to increased knowledge and understanding is hidden deep inside. Before it is possible for either people or machines to derive new knowledge from this kind of complex data and data arrangements, the conclusions or the proposed boundaries themselves may need more discussion and review to be understood, even if they are completely correct. Therefore, Context Driven Topologies evolve over time to reflect changes in historical comprehension [FIG. 4]. One of their primary uses is to 'fill in the blanks' (1.11) 'bridge the gap' and otherwise help people to streamline (2.2) and compare (4.14) records of what we understand with what we do not understand [FIGS. 8A, 8B]. As explained in paragraph (1.9) the flow, or pace, of these changes directly corresponds to the pace of changes in knowledge and comprehension idea by idea, relationship by relationship. The history of associations captured in the symbols does not change, the multidimensional waveforms described in (Section 4) never change, the only way the topologies change is through steps (3.1 to 3.7) as each description boundary and data arrangement is interpreted over and over again [FIG. 7] by people by making decisions to place, eliminate, and prioritize data in new data arrangements [FIGS. 3 and 4]. Over time, this will help people to understand data and data arrangements that are harder to configure or draw conclusions from.

3.12 Relationships between the character-like symbols form a shared memory (Section 7) by storing image data, text data, mathematical data, audio data etc. along with the associated data processes (Section 9) that have been generated or put together in a context and hierarchy for any reason. As introduced in (3.7) (3.10) each component description, and likewise each Context Driven Topology, contains a traceable history of this process through the following steps:

3.12a Using the example of the painting in (2.3) (2.12) again, suppose the group 123 4567 89 42 66.2751
http://Hirshhorn.si.edu/collection/Artist=Franz+Kline&Title=Delaware+Gap
5789034 B1910 D1962 18701
1524.5693 78.25 × 106.125 99508
A1966
is captured in a topology represented as #
and the group
1524.5693
78.25 × 106.125
is captured in a topology represented as +

3.12b The symbol for the first group is embedded directly into each component description 123 4567 89# 42# 66.2751#
http://Hirshhorn.si.edu/collection/Artist=Franz+Kline&Title=Delaware+Gap#
5789034# B1910# D1962# 18701#
1524.5693# 78.25 × 106.125# 99508#
A1966#

Because some of the components in the second group have been in a captured another context before they already have an embedded symbol, and are assigned another symbol with each new association

---
1524.5693#+
78.25 × 106.125#+

---

3.12c The next time a user goes back to the original group they may notice a change to two components:

---
123 4567 89# 42# 66.2751#
http://Hirshhorn.si.edu/collection/Artist=Franz+Kline&Title=Delaware+Gap#
5789034# B1910# D1962# 18701#
1524.5693#+ 78.25 × 106.125#+ 99508#
A1966#

---

A machine will definitely notice.

3.12d Associations and symbols that have occurred precisely the same way in the past are not duplicated. It is imperative for associations, symbols, components and topologies that are "the same" as defined by the user, to be eliminated on every level of the shared memory 103 (Section 7). This streamlining will help to search and identify data and data relationships more clearly and accurately.

3.13 The example above (3.12) shows only one transaction; one can quickly imagine the number and speed of data transactions that regularly occur and the length/depth the descriptions will grow. As more conclusions are drawn and more symbols added, it does not take many transactions, or even physical time as it relates to our experience, before the component descriptions with all of their symbols and histories become more accessible to machines. Therefore, people using the systems and methods described herein will need to communicate to their machines through Context Driven Topologies, or the forms, and automatic language (Section 7) instead.

3.14 In nearly every case, the user does not interpret the component descriptions with their endless associated symbols. Users are viewing the particular encoded information contained as an "object" inside particular hierarchies or group. The group above is the image "DELAWARE GAP" by Franz Kline. But this picture is not really contained within this group, as introduced in paragraph (2.6) a placeholder is. What is supposedly inside this group is fixed, taller than a person, black and white only, and very wide. If the user wants to access the one object contained in this group of twelve descriptions, they need to go to the second floor of a round museum in Washington D.C. The other group in (3.12) contains hundreds of paintings in hundreds of locations. They are not 'in' the data any more than astronomy data holds stars.

3.15 The systems and methods described herein raise a very important question about representation. It is easy to see how one painting can be identified, located and described through twelve characteristics, easy to imagine hundreds of paintings being alike because they share two characteristics, oil on canvas at a certain two dimensions. Mapping between these groups is very similar to high dimension statistics corresponding to a bar graph. But the nature of certain kinds of information makes it very difficult to distinguish between the 'information inside' and the 'description outside' when the information itself is also code. These situations need to be handled case by case on a hand modified basis, the same as now. These marks and captured scenarios will be very helpful for machines (9.15).

3.16 Regardless of the number of descriptions, all objects, groups of objects, and topologies that are 'the same' as defined by the user, appear to be the same 'size' to machines so they, and therefore we, are able to see them in fields. Like the boundaries and underlying shapes, these scaling modifications to force perhaps non-matching components into groups in a way that can only be done virtually. The purpose for 'seeing' this way is similar to blood cells in a blood stream. They just need to be able to move.

3.17 Context Driven Topologies vary in density to correspond to the 'size' they need to be perceived to be to become arranged in new information groups and topologies.

3.18 Whether the 'information inside' a data group is terabytes of code wrapped and described by one simple string, or the 'description outside' is constructed over the years into a complex, multilayered combination of codes and symbols in infinite dimensions all to describe a simple common object— it is the same. There is a boundary. These boundaries become the symbols, patterns, history and meaning surrounding each object. As introduced in (1.23) (3.9) and explained further in (7.39), the more associations each object accumulates, the more this changes the edges, or texture, of each of the-multidimensional boundaries [FIG. 4]. A boundary with massive amounts of information inside yet a small description outside looks ready to burst, a symbol with infinite complicated and overlapping descriptions for simple information inside is wrinkled, from far away they look the same [FIG. 7]. The 'distance away' is completely dependent on how the viewer is arranging their information [FIGS. 3, 4, 7, 8A and 8B]. One person's far is another one's close, that is why context is the measurement used in the time dependent topologies. Because every thing in a machine is only virtual, objects do not have a 'real size', objects of any size can appear to compress or expand to be placed, or fit, in any location in any configuration. The mathematical descriptions appear to expand and/or become extremely compacted depending on how each boundary and object is placed. The boundaries are always compact, or the simplest, in storage. See (Section 4) for details about scale and the stateless storage space.

3.19 The boundary that already exists between people and machines is not abstract, we regularly negotiate this boundary all the time. Machines see code, we see images; machines read code, we read stories; machines record or hear code, we sing or hear a song. The systems and methods described herein introduce a new layer of coding and decoding for machines, and a new layer of image/story/song for us.

3.20 There are many self-referring similarities and patterns that begin to develop on their own between the character-like symbols in the descriptions and the interrelated ways that people develop the underlying connective shapes. As illustrated in [FIGS. 10A-10E], the essential feature of the systems and methods described herein that lets these patterns be identified and compared regardless of their state or use is the fact that each Context Driven Topology is mathematically unique and stays precisely the same regardless of which state, or degree of compactness or expansion, it is perceived to be in. The patterned space around each object is always part of each object. Variations in interpretation of data and data arrangements over time are what generate these forms and boundaries. Each topology is able to be recognized at any point in time because the mathematical relationships never change regardless of how data descriptions have needed to stretch and squeeze to fit in new or unique contexts over the years.

3.21 A Context Driven Topology that is updated and transformed with new or revised interpretations is a new and revised topology. It may have the history of previous versions inside, but it is unique or it is automatically streamlined and eliminated in the shared memory 103 explained in (Section 8). The older and more changed interpretations become over time, the earlier versions are compressed, pushed into the background and rarely transformed into other states for other uses. It doesn't matter if older means 780 years or less than half a nanosecond later, it is just before or after the specified point in time and going in one direction. The back and forth process [FIGS. 8A, 8B], or map, that Context Driven Topologies form between the versions that are before and version that are after is what generates the knowledge and display patterns in (Section 7).

3.22 Context Driven Topologies bind together information at any levels people are able to understand a group of data together, even if these processing steps would not be able to occur across machine programs or systems. As shown in [FIG. 4], each topology contains the programming features needed to read the content it has captured (9.4) (9.12). Over time, people will understand new reasons why groups of information make sense together which will prompt specific reasons to develop new content, new programs, new systems and new networks. These records are able to be read by any computational machine because they "read themselves" over a network, the presentation depends on the environment and the equipment.

3.23 Context Driven Topologies connect source code in high dimensional visualizations to simple text as easily as they connect images to other images, matrix to list, French to English, C++ to C# etc. People are able to find images using similar images because machines can be queried with images described by symbols showing previous associations that were important for temporal reasons, yet measurable by machines because each pattern is so precise. The display patterns and automatic language in (Section 7) provide the techniques and tools for mapping between languages and presentation modes.

3.24 Only data descriptions and interpreted results have embedded symbols. The objects and 'originals' are left unmarked in a placeholder (2.6) position where descriptions and interpretations enclose it (3.18). There are different gateways and shortcuts to reach the original. Portions of raw results may be extracted to use as data components, which means they are being described and interpreted and therefore no longer a complete, untouched original. The interpretations begin to accumulate indelible marks and associations in their symbols. Eventually similar descriptions and interpretations overlap and consolidate. Incorrect descriptions are disputed and eliminated through the development of new, more streamlined and correct topologies. All of these actions affect the patterning and mapping of all of the topologies.

3.25 Context Driven Topologies cause data and data arrangements to characterize. When topologies share components, histories and other topologies symbols in their descriptions, they tend to cluster.

3.26 The interactive process of choosing and arranging the best data components and relationships through Context Driven Topologies begins by users providing machines with information or by showing and describing the type of components they have in mind. Machines begin to compile and consolidate the topologies embedded as symbols in each description as pathways into data stores to propose an outline for the new structure, and begin to bring in components for review. The more precise the descriptions are, the more complete and relevant the retrieved information will be. Drawings, images, waveforms, sequences, flow and mathematical relationships can be input as easily as text.

3.27 Special commands enable the machine to interpret certain kinds of information, and certain portions of information itself, rather than interpreting the descriptions when this is more useful for the user or easier for machines. For example, if the machine is searching architectural drawings, proportions and spatial relationships illustrated in a CAD file may be more useful than the drawing title, however, as any person who has worked with CAD knows, drawings that are presented in packages under a title are a particular view with very few layers in the drawing files 'turned on'. The same drawing file may contain different views and different layers for each drawing present in a file. This fine-tuning and control over what is searched, identified and presented for a particular arrangement of information is directly tied to the users preference and quality assurance needs.

3.27a 'Paper space' in AutoCAD is similar to the display patterns in (Section 7), AutoCAD model space which is always 1:1 is similar to stateless space where scale is manipulated by users. Context Driven Topologies have both always related to each other (as they are in AutoCAD) but both are 'searchable' unlike AutoCAD which cannot search for or associate measurements.

3.28 Users tell machines where to pay more attention to certain groups of information. Information that is correct, preferred, or meets a specific quality assurance is assigned more space, resolution, depth and visibility in the new configuration according to its priority (Section 6) in the new arrangement.

3.29 When machines retrieve too many choices for users to review, more descriptions are added. In most cases these descriptions will have previous associations but sometimes they will not, which causes a completely new description to be created. The users and machines go through a decision process of narrowing down, making choices about what type of components are too similar to sort through, creating and describing new components until eventually, the arrangement is determined by the user to be complete and captured into a topology with new bridges and maps to the past, to begin the cycle all over again.

3.30 Where existing components are not available—which is usually the case—new components are created by users either in collaboration with machines or independently to input as appropriate. New words and sequences are written, an exhibition is visited and a curator identifies an artist they like, a ten year study involving hundreds of people is initiated. There is a purpose behind creating new materials to fill in these gaps, reasons why existing information does not answer the question, address the same issues, or addresses them in the wrong way to satisfy the new purpose. Marking these new introductions and changes in course is one of the best long term uses of the systems and methods described herein.

3.31 As stated in paragraphs (1.4) and (3.12), no components or descriptions are ever duplicated, two or more locations are simply indicated through the symbol. The degree to which components are considered to be "the same" is directed by the user. Superimposing or comparing two or more topologies that share components does not duplicate matching components either. Whether a network/machine is compiling in an even parallel across all levels of the descriptions, or a person/research group is assigning priorities to illustrate new conclusions, the topologies where people and machines meet in the middle twist and rotate for redundant components to align and cancel each other both in peoples perception of the information, and in the machines data compilation. These shapes, actions and relationships can be studied through algebraic topology, knot theory and other mathematical techniques.

3.32 The connective shapes (and therefore symbols) are constantly being fine-tuned, created and modified but are still recognizable as meaningful arrangements like letters in different styles of fancy fonts. The symbols as their own group form the longest alphabet ever, it is constantly expanding. They become their own language composed of all the natural and machine languages being used [FIGS. 6A-6C] (1.15) (1.20) (1.21) (2.1) (2.3) (3.13) (3.22) (3.24) (4.18) (7.2) (7.5) (7.6) (7.12) (7.16) (8.17) (10.2).

3.33 As introduced in (3.9), the symbols and shapes have selectively controlled edges and an inside or outside as characters do but people will need to get used to them because they are not exactly like characters. They are of much deeper dimensions and varying densities, there is related background information stacked underneath, compressed arcs that we wish could be extended toward the future, histories inside histories inside descriptions yet these shapes always appear to be one solid.

3.34 Each topology has a strict inside/outside boundary, each topology is only one continuous form with a patterned space around it. Generally, machines understand the outside, the mathematical boundaries, and people understand the information that is captured inside. Context Driven Topologies are evolving records to draw a picture and measure how the boundaries change over time.

3.35 Multiple topologies are able to merge into one, individual topologies are able to break down and separate. To eliminate redundancy (1.4), when topologies merge, shared components overlap to cancel extra copies so only one copy of the component is included inside the topology. When topologies break apart, all of the components from the prior arrangement may or may not be transferred into the new arrangements.

3.36 Better shapes have better proportions; components of different degrees of association have different textures. Close inspection reveals histories people understand like thumbnail sketches or maps. These are recognizable features all people are familiar with and do not require special training to understand.

3.37 If people have been able to do this much with music symbols—the placement of ellipses and lines on other lines using very few symbols—or record and illustrate an endless variety of ideas through 26 English letters or 4,000 Chinese characters, what could be composed through a limitless, self-contextualizing, non redundant system provided there was a gradual way of developing and understanding its logic?

3.38 Machines process the disclosed symbolic characters and 'understand' their function using techniques, software, programs and systems expressed herein, partially disclosed herein, and investigated and developed further through an upcoming project [FIGS. 6A-6C].

4. Evolving Mathematical Knowledge Patterns Converted into Multidimensional Wave Forms 4.1. When Context Driven Topologies are distributed to be shared as knowledge to be interpreted by others, the arcs inside appear to 'stretch out' or 'expand' and transform into continuous multidimensional waveforms to be distributed and compared in purer form. As illustrated in [FIG. 10E] and (3.3), the compacted topologies 'unfold' to become a continuous irregular series of waves. Each arc is connected to the next arc by changing orientation from the end of one arc to the beginning of the next (4.2).

4.2 The process of this transformation does not place or arrange the arcs, and therefore high dimensional waveforms, in a flat plane. The rotations vary according to both the direct relationship between adjacent arcs, and as a series of periodicities down the continuous length. Variations represent dimensions, time, density, frequency and other factors.

4.3 The continuous series of arcs in a multi-dimensional waveform may be open or closed in a loop, but each Context Driven Topology is one continuous whole. The topologies are typically more effective and recognizable if they are closed to allow a circular path through the entire topology rather than starting or stopping at a beginning or end.

4.4 When a Context Driven Topology is in the form of a spiral or seashell (3.4), it is more convenient to make the transformations between the connective shape, symbol and waveform.

4.5 Context Driven Topologies in the waveform state are measured (4.11) using Fourier analysis and other mathematical techniques to identify and compare overarching, underlying, direct and indirect temporal connections determined by people between data and data relationships of any type, at any scale, at any time.

4.6 As introduced in (2.2) (3.3) (3.8), portions of waveforms can be overlapped and combined by machines before the original information is retrieved and interpreted by people. For example, if only tight connections are acceptable, only this specific radius or range is recognized. Data relationships in the topology as a whole are also specified and recognized by their rotation. Therefore, when topologies begin to become interrelated and refer to each other, these radii and rotations will eventually begin to streamline and standardize the same way the descriptions do.

4.7 The waveforms reside in a stateless space in boundless abstract cloud [FIG. 1] [FIG. 2] that is not maintained or interpreted by any one organization.

4.8 Because Context Driven Topologies reside in a stateless space, they are always remotely located.

4.9 Context Driven Topologies are user defined pathways in and out of the stateless space or boundless abstract cloud [FIG. 1] [FIG. 2] that are given by mathematical relationships between the symbol/map use, the connective/changeable state, and the simpler/expanded waveform state. Neither the stateless space nor an unformed topology have any "scale" until this is determined by users through the act of interpreting information, drawing conclusions and creating a topology.

4.10 Comparing, optimizing and streamlining the pathways themselves independently from each other is at a level that people are not capable of comprehending without advanced networks of machines. Managing shared knowledge, information and data arrangements at this level is one of the many ways the systems and methods described herein will be useful in the future.

4.11 Synchronizing Context Driven Topologies in the waveform state with machines and other display devices is a machine based calibration using groups of the mathematical patterns, or Context Driven Topologies, themselves. The information contained within each topology is eventually simplified and transformed (Section 9) to be presented through light and sound (Section 7). The measurement and calibration techniques most often used are similar to current optical and acoustical frequency techniques with added variables for density and other customized features (4.5) (9.11).

4.12 Context Driven Topologies, including the history and knowledge they contain, are distinguished from each other in a dialogue and decision process between people and advanced networks of machines over time. These distinctions are directly related to the nature and interpretation of the information itself, the way the user is looking, the similar examples each user or research group provides, knowledge describing the information, the era which the information originated and the era the knowledge is being re-interpreted. For example, a teenager downloading music may input slang words that disappear over time; a mathematician may input very precise equations that have not been examined for 142 years and also unexpectedly retrieve all the arguments from the original era as well; a mechanical engineer inputs a flow sequence and accidentally retrieves similar flow sequences that illustrate about shopping trends. Through a knowledge based interactive process where people provide machines with similar examples, in similar dimensions, with similar pacing or evolution, non-relevant information is eventually weeded out. It is 'cleanest' or 'easiest' for machines to search, identify, compare and retrieve groups of Context Driven Topologies with each other when they are in the multi-dimensional wave form state in the abstract data cloud because this is when the topologies are most pure and machines are able to rearrange them in ways we may not understand. The operations are transparent to users, the more knowledge they have to specify the information they seek, the more direct the connection is to the original objects and ideas (7.22).

4.13 Because Context Driven Topologies automatically overlap and conceal like components whether they are text, simulations, mathematical relationships or any other type of encoded material; search and retrieval will be more efficient and precise than keyword and key code searching is today.

4.14 Unrelated data arrangements with similar data relationships are able to be compared to see new ways to form relationships that are hard to understand. People are able to arrange and to identify data relationships up until the point where they no longer understand, then send this "topology sketch" into the stateless cloud and limitless collection of shared memory and shared knowledge where the early form, proportions, and densities could be compared and possibly corrected or given a better direction to continue developing the idea. For example, if a field ecologist is documenting the habits of unfamiliar birds in an unfamiliar environment, the ecologist may only feel comfortable gathering a minimum amount of data that is the only data, and data collection method they are sure is accurate. It may be far less data than is typically gathered. The basic structure is sent out to the stateless space to be compared in a very raw, early state. When similar relationships are retrieved by machines, there may be something unquantifiable the ecologist knows that makes some of the unrelated results appear to be appropriate. When this is the case, the coded data is extracted to see what it is and it could be anything—movements in a dance, algebras from a high school text book, etc. any type of information in any form which the future user may or may not understand. However, where an extensive body of data and data relationships exists for the other, unrelated data, the "better" topologies may provide direction for the completion of ideas in early stages, saving time and focusing the efforts to a pattern of relationships known to be simple and effective. Data arrangements that are developed through Context Driven Topologies are able to be built-upon, refined and developed further over time, as long as each step along the way is accurate, the evolving topologies are a more valuable use of shared knowledge resources (7.18) (9.1).

4.15 Redundancy (1.4), noise (9.10) and crosstalk are eliminated through the process of looking very precisely for very precise, mathematical arrangements. What is not there is equally, if not more, important than what is there.

4.16 Context Driven Topologies are graceful and continuous like music.

4.17 Context Driven Topologies exist only in a virtual world, they are able to twist, fold, transform, align and associate waveforms [FIG. 10E], components, structures and symbols that may only able to be captured in our imagination, before these same relationships are able to be realized through art, science, machines and advanced networks.

4.18 Machines decode, encode, convert and calibrate waveforms and relationships between waveforms using mathematical patterns, imagery, sounds, techniques, software and programs prototyped in an upcoming project [FIGS. 6A-6C] and future technologies listed. The same way that people seek, retrieve and associate similar concepts in their heads, topologies in the stateless space begin to streamline and organize themselves by sharing component descriptions, knowledge objects, algorithms and measuring techniques, backgrounds and histories. Together the topologies and the patterned spaces around them form knowledge patterns moving in a multidimensional abstract "stream" that is difficult for people to understand until it is transformed into the evolving automatic audio and visual language and display patterns disclosed in (Section 7).

5. Metaphors 5.1 A Context Driven Topology is like a person; each one is unique, born and was not here before. Even if each individual shares preferences and characteristics with other people, they have their own age and circumstances, even twins sharing practically the same lifetime, and most circumstances rarely behave the exact same predictable way. A Context Driven Topology has a life and interacts with or influences others even if they never meet. When you want to understand more about a person, you can see how his friends, family or culture has influenced him. These factors may be invisible to the person himself, an outsider may identify influences more clearly but they may be incorrect. If you want to know why this person has blonde hair, the topology is like DNA efficiently mapping out everything about his ancestors in an accepted, proven structure. If you want to know why the person has dyed his blonde hair black, the set of descriptions contained within the topology are pathways that lead to images of the popular culture of that time, pictures with this person's friends who have also dyed their hair, the person's online diary. The person himself may not understand or care why he made this decision. Therefore this person's reasoning is not accurately measurable using an accepted structure such as DNA and can only be inferred through patterns such as trends in popular culture. Some day the person will die; it is not fair when he is taken away too early or lingers too long. He will be remembered by people who knew him, people he influenced; he may have children and grandchildren. There are unique traces that are not the person and at some point even these traces will be gone. A Context Driven Topology is not like a person because it can be specifically tailored to keep and use only certain aspects of its personality.

5.2 A Context Driven Topology is like a song; sometimes there is only one clear note you remember.

5.3 Using similarity measures to retrieve Context Driven Topologies is like raking leaves, there are different kinds of rakes with different styles of prongs with varying distances between, different material strengths or flexibilities. When tools are used too often or left unattended in unstable conditions they need to be replaced. Information that is not the right proportion or density passes through or will not be picked up; sometimes foreign objects that do not belong are also retrieved but they are easy to recognize and remove because the first level of separation has occurred. Using similarity measures is not like raking because the leaf pile can be compressed into one piece and easily handled because users can identify one boundary and shrink it, rather than looking at all of the individual boundaries around all of the leaves, and clusters of leaves, scattered around separately.

5.4 Context Driven Topologies put in groups together are like chemical reactions, some simply cannot be together. Other kinds transform, unite and become something else. Context Driven Topologies are not like all chemicals because they are only man made.

5.5 Context Driven Topologies are like water, they can be in different states that have certain thresholds. When they are ice they are different than steam but they can transform from one to the other without becoming something that is not water [FIGS. 10A-10E]. When a Context Driven Topology is captured, it takes the shape of the vessel that carries it, when it is moving it changes the non-water landscape around it. Context Driven Topologies are not like water because they are not real and do not have physical properties that constrain them to certain structures or states to recognize what they are.

5.6 If Context Driven Topologies were a library the levels and information components would be: this library compared to other libraries, a section based on a subject matter, a book, a chapter, a phrase, a word, a letter. When a Context Driven Topology recreates a book it does not have the word "the" in its data stores over and over again, it is a map to each word saved only one time and assembled in the proper sequence even if there are duplications. One level down this is also true for the letters but this particular user is not looking at that level so these maps are hidden. At the level of library to library, there is of course only one book also. Because of the way the book was initiated as information (8.3), the system will automatically and always defer to the original writings of the author. The user can switch 'dimensions' to read a French translation which naturally has different maps because the words are often in different sequences, but at the chapter level, the ideas are cohesive. The identity of the book is a title, a much shorter description than all of the words. The words are used in other books; this is another map that leads to other points of view compared if the user is interested in the concepts conveyed by this word. Context Driven Topologies are not like libraries because there is not a better library with everything in mint condition including a knowledgeable staff to direct you versus an unattended trailer with 28 dog eared books to choose from, most which you have already read— there is only one original book mapped out in a sequence, anyone can get a copy, read it in their language, and it is never checked out.

5.7 There is an old wooden roller coaster at Kennywood Park in Pittsburgh Pa. called the "Jackrabbit" built in 1921. Over time, piece by piece, the wood and tracks and cars have been repaired and replaced yet there was never a time the Jackrabbit wasn't there. As a whole, the ride has not changed. It clacks and shakes and people fly up or hold onto their kids on the double dip the same way their parents held them before. Darts is a game that persists through time because of its geometry—circles of specific diameters, a fixed distance to stand away, endless styles of darts and boards. The popular game "Cricket" includes an efficient scoring system that does not waste time writing down what 'might have been'. Perpetuating and precisely recreating Context Driven Topologies of shared knowledge across advanced networks of machines over time is like this ride and game, the components may be replaced and updated, but through each topology's geometry, and an efficient annotation system, the whole continues to have meaning on its own regardless of the rate the components are replaced, or the number of variations that occur.

6. Monitoring, Controlling, and Influencing Information Placement and Proximity Using Pace, Flow, and Changes to Human Knowledge Over Time 6.1 Every idea has a pace [FIGS. 10A-10E].

6.2 The systems and methods described herein are used to record and monitor information component placement and proximities through a record relative to the pace, or flow, of changes to related component placement and proximity over time. These records, including the pace of changes, help both people and machines to place and prioritize future components in future topologies. The Context Driven Topology placement process is a system of indexing and mapping that is a mathematical process translated into an evolving automatic audio and visual language (Section 7) which places more important concepts in the front and makes them bigger.

6.3 The only control or influence machines have on component placement or proximity is by compiling and consolidating patterns of previous associations contained within each component description, patterns identified within each topologies uses, and groups of optimal paths (6.8) identified by people into and out of a stateless space [FIG. 1] [FIG. 2] that is understood more clearly by machines. Both people and machines will eventually get a feel for components that are often near each other during certain eras.

6.4 Address data is a mathematical identity of placement and priority for both the source and destination as each of these changes over time.

6.5 Addressing within and around Context Driven Topologies is the same as many existing processes for addressing a character. It is a map or graphic memory that also stores image data.

6.6 Configurations that are consistently used to arrange like data components will become like a template or standard over time. As explained in paragraphs (3.10) and (3.26), machines such as computer 101 typically propose the first outline arrangement for new data arrangements based on a convenient arrangement of all the histories/pathways from the shared memory 103 (Section 8) to the current arrangement. Components initially tend to be located (and therefore addressed) in the new arrangements similar to the way they have been located in previous arrangements. However, this is not always true, a new interpretation may have a greater emphasis on certain components that may have been less acknowledged in others and vice versa. That is why it is up to people to decide which arrangements and priorities are best.

6.7 As introduced in (2.3), the registry of new data interpretations is generally assigned by people who create or are responsible for the information. For example, a university that undertakes a large multi-year study will determine how to describe and arrange this data. The agencies that funded the study will apply their own descriptions and categories to it and put these data groups into their own groups, for example, with other studies funded in the same program. Each of the description and arrangement processes that data undergoes during the course of its life will affect its history descriptions, categories and locations—which will in turn affect its initial placement, priorities, and proportions in new configurations. This is a significant improvement because these are people, idea and progress driven arrangements that change this registration over time. If records are not reviewed, or too close to other records, they are eventually compressed and consolidated (Section 8). The greatest danger in large data collections—whether they are modern, complex and dynamic or handwritten on cards—is when stored information is not reviewed (7.37) it is possible these records could imply priorities that did not actually exist and/or certain records may seem more important than they actually were simply because they are old.

6.8 Selecting the optimal path to review large scale records to access targeted information is determined by each user deciding [FIGS. 3 and 4] which components and which era they would like to review. Components may be recombined, re-prioritized and re-addressed in each new arrangement. Components that are regularly used together come together in context. These 'pre-existing' groups [FIGS. 8A, 8B] affect the agility and direction of the optimal path. Some paths are more efficient than others because they have been made 'thicker' to accommodate these pre-existing groups. Over time, something similar to a channel will wear down.

6.9 The address and priority of each component is a reflection of their placement in the hierarchy of each Context Driven Topology and their journeys in and out of the stateless space. Each component, whether a word, or all of the collection records of the British Museum since 1753 will gradually accumulate many addresses and priorities according to the different associations it has had. This starts to "pull" like components and topologies toward each other deep in a background that is difficult to imagine without the use of mathematics. As described in (3.26), when a placement within topologies begins to become typical, or reliable, it is statistically and methodically streamlined by machines to 'gravitate' towards this position in future topologies.

6.10 Machines monitor, propose and record addresses and priorities for data in data arrangements as disclosed using software, programs and systems specified herein, partially disclosed herein and developed into an enhanced prototype through an upcoming project [FIGS. 6A-6C].

7. Use of the Automatic Evolving Audio and Visual Language and Display Patterns 7.1 The systems and methods described herein map between the mathematical description framework, symbols, signs, priorities, data and data arrangements through the use of an automatic audio and visual language that evolves over time. The systems and methods described herein, like many existing inventions, "see" all of the data, data arrangements and boundaries (3.18) as objects. However, unlike most prior art in data processing (as opposed to data display) subject matters, these objects appear to compress and expand so machines can compile and process the objects in groups where they do not typically "belong". The edges (3.9) of these objects are driven by their history of different interpretations and the layers of thickness that result to reflect each object's correctness (1.15) (7.25) (9.22), their status in disputes or challenges [FIG. 4] (7.32) (8.3) (8.6) (8.10), and other processes that gradually push these objects into aggregated generative shapes and streams that evolve over time—these are knowledge patterns. A second kind of pattern, that in many ways is an opposite pattern or the same pattern rotated or otherwise transformed in a different direction, is used to present the knowledge patterns and new ideas in each particular era's machines and display devices—these are display patterns. Together both patterns form the basis for the improved human computer interaction process of the systems and methods described herein.

7.2 The evolution of the interrelated patterns, the Context Driven Topology forms and these streams, or threads of understanding through time, each have defined values reflected in the evolving automatic audio and visual language. The best way to review and interpret information contained in the patterns is visual, conceptual and related to people's natural understanding of objects in spaces. Data and data relationships may also be evaluated by ear or machine acoustic measuring devices, a combination of optics and acoustics, tactilely, in words, or any other mode where the machine has a pathway in a topology to show how this knowledge object has been placed in context and displayed in the past.

7.3 Each of the knowledge and display patterns have unique mathematical identities, recognized primarily by machines, by comparing and measuring the infinite ways historical knowledge and new ideas come together, by separating the pace, or flow, of changes over time. Using the automatic language to compare the knowledge and display patterns with the flow of changes over time leads to deeper insights and predictions people may not be even be aware of until we start using a system like the systems and methods described herein. One of the most useful long and short term benefits of the systems and methods described herein is machine detected errors, interesting details, simplifications and deep background (8.7) patterns detected over longer periods of time than one person, research group, individual machine, or small network of machines normal lifetime.

7.4 The knowledge patterns and multi-dimensional waveforms (Section 4) are translated into the evolving automatic audio and visual language using the both the knowledge patterns themselves, and their related display patterns (7.1), as a new very specific, very temporal technique to search, identify and interpret data and data relationships a new way.

7.5 Referring to FIG. 10E, the general use of the display patterns is to present the knowledge patterns through light and sound even if the knowledge patterns and multidimensional waveforms 1051, 1052, and 1053 themselves do not correspond to light and audio waves people are able to perceive and/or machines such as computer 1020 are able to present. The display patterns and automatic evolving language 'make the waveforms fit' into light or sound, or digital units that are able to be displayed as light or sound, as preferred or specified by the person or research group interpreting the objects in the future. These user defined displays could mean writing in any natural language, images, sounds, music, drawings, flows, complex sequences and any other data arrangement able to be displayed on a backlit screen with speakers similar to current computers; or projected image sequences and high quality 'surround sound' similar to films in current theaters; high dimensional ideas similar to current scientific visualizations; recreated environments similar to current virtual reality caves; layered imagery similar to current holograms; and any other display and interpretation technique people are able to dream up in the future and present through machines connected to a network.

7.6 The evolving automatic audio and visual language of the topologies themselves is disclosed in the remainder of this section; the language of the data components, groups and arrangements is introduced in (Sections 2 and 3); machine interpretation of the language is disclosed throughout the remainder of this specification.

7.7 As introduced in (Section 6) knowledge, data components, groups, arrangements are given audio or visual intensity, prominence, deferral or other priority addressing based on their user defined placement and proximity in a Context Driven Topology. This is automatically reflected by their placement and priority in each corresponding display pattern.

7.8 There is something important (Section 1) that happens in data visualization, the act of summarization and the creative process "before" an annotation system (Section 2) (7.37), context, or frame of reference (Section 3) can be introduced. Translating and mapping ideas that originate in this place into data and data arrangements is where the systems and methods described herein are intended to work best. It is also a place where other inventions do not exist to search, interpret, compare, streamline, preserve, share, translate and map knowledge at all levels over long periods of time.

7.9 Variations between knowledge patterns, display patterns and the two related sets of patterns, may be detected infinite ways according to the way each stream of topologies is identified (2.3), extracted [FIGS. 8A, 8B] (3.25) (4.14) and presented. In the systems and methods described herein the frame of reference is not only the original context of the topology, it is also the users' choice of presentation (7.4). In other words, the identity of knowledge as it is being evaluated by another person either remotely or at a future point in time, even a fraction of a second later, takes on both of these addresses, placements and priorities as they are interpreted by both the original and new users. This fine tuning and calibration is first accomplished through the display patterns, and second through their opposite or rotated knowledge pattern. Of course feedback loops between these patterns can continue into infinity but through the use of the systems and methods described herein, will eventually delete far more information than it adds. The number of objects is intended to stay the same because these are what is actually important and needs to be preserved.

7.10 The same objects can be represented many different ways to many different people over time, therefore it is at the sole discretion of future users to decide and specify (Section 9) if they would prefer for the knowledge to remain in its original state, or if they would like to 'dissolve' portions of the topology to change the natural or machine language (3.32) to be compatible with the languages they and their machines understand most clearly. The topologies and their associated patterns can also map into new modes [FIGS. 6A-6C] (3.24) (7.10) (7.16). Like existing internet searches, the more context maps that are created the more effective this mapping process will be. See above for plans to introduce the mapping process to potential future users.

7.11 Certain areas of each Context Driven Topology and its associated patterns will be more complex than others. See [FIGS. 10A-10] for an illustration using the content of these specifications to show the complex subject matter of unique identity as it is disclosed in paragraph (8.3). Explaining the use of this concept requires the use of many overlaps, circles, loops and references within the same paragraph. This is one illustration, other more complex concepts better expressed or investigated through epistemological circles, references, and feedback loops leave marks on data and data arrangements in their histories (Section 3). These marks, cycles and multiple interpretations exist in the knowledge patterns, are filtered through the display patterns, and illustrated through the evolving automatic audio and visual language.

7.12 The evolving automatic audio and visual language easily maps between audio, visual, both, text, images, mathematics, tables, clusters of data and data arrangements, or whatever hierarchy (3.1), context, configuration, placement and proximity (Section 6), and mode of presentation the person or research group either prefers, is obligated to use, or is a standard procedure to understand this type of knowledge. As previously stated, when knowledge is not evaluated or used, it gradually disappears. Gradually in this sense is over 1,000 years. Current methods of knowledge preservation, such as books are typically between 200 and 500 years, and although few people like to admit it, the lifespan of most current digital information is far less than a persons lifetime (1.16) (Section 9).

7.13 Mapping back and forth between the knowledge and display patterns is initiated and directed by people [FIGS. 8A, 8B], then recorded and presented by machines.

7.14 Machines do not automatically "know" how to map between modes, for example from an image to words that describe this image, except by following the pathways captured within Context Driven Topologies. Networks of machines are able to follow these pathways to trace a history of reasons why this image and these words have been associated in the past. Retrieved objects are typically presented in the same mode which they were created (i.e. text for text, drawing for drawing, image for image) however, sometimes it is more useful for the person interpreting the objects to see them a new way. If this is a completely new image, as most images often are, it can only be interpreted into words by a person because the machine has no associations to create outside of marking the particular source and time when the new image was created. As introduced in (Section 2) and further explained in paragraph (8.3) it is at the discretion of the author to describe, identify and associate data and data relationships used within the holistic system of the systems and methods described herein. The description of a new image, or any other knowledge object, will be much easier for the machine to compile and consolidate into the patterns if users provide associations, such as words, that already have many of their own maps, connections and interpretations available to advanced networks of machines.

7.15 It is possible in that not one detail about a particular new image's dimensions is important, or, maybe the new image is an architectural drawing and the dimensions, proportions and references to other documents is more important than what the image 'looks like'. In the case of an architectural drawing, specific spatial relationships and proportions need to be conveyed without ambiguity; on the other hand an image, cultural artifact or sequence of words in a story may raise many questions. Either of these can be documented and measured (10.6) because each object and their placement within Context Driven Topologies and their associated knowledge and display patterns, is unique. When the mathematical and display patterns are used to analyze objects that require both quantifiable and unquantifiable descriptions and interpretations (7.12), the new bridges (1.13) (3.2) (3.29) (7.42) (8.3) (8.12) (8.19) that are built, and the resulting changes this may lead to in both knowledge and display technology, is the purpose of the systems and methods described herein (1.18) (1.23) (7.9) (7.12) (7.21) (7.26) (7.37) (Section 10).

7.16 The variation between images, or any other type of knowledge object or information component as defined by a user given boundary (3.18), is assigned a value and prominence in the Context Driven Topology system by: the person who creates the information; the people who evaluate and interpret the objects in the future; and any histories of previous associations for each component as reflected in the Context Driven Topology and the knowledge and display patterns generated by the topologies interpretation and use. These values are mathematically based and mapped into the display patterns. The use and evolution of the display patterns will improve the mathematical framework and mapping procedure over time.

7.16a Definition: For the sake of simplicity, the word "image" is used, however, any encoded information component of any type, such as text, a matrix, one sound, recordings of a symphony over the years, a data array and any combination of any modes to portray an object from any number of interpretations over any period of time, may be substituted for the word "image" for the steps and procedures in the remainder of this section.

7.17 The systems and methods described herein allow digital information about knowledge to create its own metadata and describe itself. This takes place through the process of creating, using and reusing the mathematical descriptions (Sections 1 to 3), and the perceptual process which includes the "appearance" of these boundaries, information groups, and data arrangements as they are expressed through the evolving automatic audio and visual language.

7.18 Each created or existing image has information that has meaning to the person who creates, understands, or is trying to comprehend this image. When there is an image that is also a measurement (7.14) yet still only partially described, for example space imaging, these descriptions need to be able to accumulate together over time so that machines can help us to derive more associations, meaning and new, more complete or streamlined knowledge from shared data stores. Shared stores will be more useful if they are inherently dynamic, can be fixed into specific views and reliable mathematical configurations of knowledge patterns, and mechanisms such as the display patterns of the systems and methods described herein, to streamline and weed out incorrect, temporary, or misleading information.

7.19 Two scientists arguing over a measurement are having a different argument than two curators arguing over a painting, however, they may both saying that the other is "looking at it the wrong way". This dispute has value reflected through a display pattern.

7.20 The systems and methods described herein will help people who create and interpret complex information to share their resources. It is a reliable place and a shared language to consolidate related studies, particularly studies that are accomplished in phases and depend on federal or other funding to be accomplished step by step over time. There may be occasions when investigators are "almost there" but their program is canceled on a larger level that individual investigators or program officers are unable change. The slightly incomplete knowledge, information and data that are generated by partial studies still has value reflected through a display pattern.

7.21 One problem in current shared data stores is an overdependence on natural language to describe objects. There are some objects, such as art, that require either long or short descriptions that cannot easily 'fit' within the linguistic constraints imposed by many current shared knowledge systems. Specific terminology, such as chemical names, work well with both existing shared data systems and natural languages because specific terms are typically not translated. The question is, how extensively are shared knowledge systems intended to be shared? If it is across domains and across natural languages, as they should be, neither specific terminology nor constrained natural language will be able to describe images in the future as well as the images themselves can. See paragraph (2.6) for a more detailed explanation of the placeholder concept and its essential role in long term data curation and digital knowledge preservation.

7.22 As historical comprehension changes, so will information about the images people and their machines are trying to comprehend. This discussion takes place and is recorded back and forth between the knowledge and display patterns over time [FIGS. 8A, 8B], and is reflected in the new topologies and new patterns that emerge.

7.23 The more streamlined the topology is, the more true it is, the more entangled it is may mean it is more interesting. It all depends on the information captured within the object, the viewer's knowledge, and the way the viewer is looking. The aim of the systems and methods described herein is to enable viewers, and people who guide viewers, to make connections to objects as direct as possible.

7.24 Description layers and knowledge patterns of any complexity, and the effect this has on the display patterns, is able to be identified, selected and controlled by each user or research group THROUGH the patterns themselves. As explained in (Section 2) an object in one sense could be one painting, in another it is all paintings, all art, all things made by peoples hands, painting number 12345 held in the collection of the 6789 museum—the boundaries are only set by users to explain their ideas. The patterns, or behaviors, of these boundaries and the pace they change have values that are reflected in the presentation of the systems and methods described herein of information retrieved from shared data stores by creating a display pattern.

7.25 Unquantifiable, non-machine based factors influence changes to the mathematical and perceptual structures of Context Driven Topologies over time because this is necessary to understand what people think about and invent over time on many different levels. People need their cultures as a way of understanding certain kinds of information regardless of which machines or networks they are currently using. The systems and methods described herein convert these cultural and group understandings into an overall pattern, or filter, between networked cultures and multi-cultural shared data stores as a value that is reflected in the presentation of the systems and methods described herein of information retrieved from shared data stores through the display patterns.

7.26 By most definitions, what most users generally want from information is for it to be correct. But when the "correctness" can vary because the information is related to, for example a series of high dimensional theories or humanities content, the purpose of the systems and methods described herein is to allow these conflicting and concurrent interpretations to gradually "push" or "guide" the patterns towards more documented, higher density, long term, evaluated, deeper, denser channels—which therefore are automatically given a higher resolution in the display patterns. Use of the systems and methods described herein will also make unusual occurrences or rapid changes in direction more obvious because the display patterns provide more ways to "jump to a new view", go to the overall [FIGS. 8A, 8B] and jump back and forth between what is and is not there by comparing the knowledge and display patterns in quantifiable and non-quantifiable ways. These quantifiable and non-quantifiable scenarios would be captured mathematically, as patterns that are measurable by machines, which is new.

7.27 Currently, most shared knowledge systems are geared toward fixed metadata (2.3) with linguistic constraints to ensure data and data arrangements are in equal regular packets for machines. Therefore, high dimensional complex evolving content is being force fit into systems that do not express the complexity inherent to this kind of data and data arrangements. The purpose of the systems and methods described herein is to provide new ways to see these patterns without constraints imposed for machines but of little benefit to people. Context Driven Topologies, including the languages and patterns they generate, exist only in the virtual world, they do not need to "work" in real machines. These visualizations begin with, and are only formed by, people's imagination. Context Driven Topologies, including the languages and patterns they generate, are used to get this dialogue and knowledge about what we are looking at into machines using the display patterns.

7.28 The mechanisms of the systems and methods described herein of abstracting and simplifying complex high dimension knowledge enables overall patterns between the knowledge and display patterns to be "colored" by a history of interpretation. Naturally components that share these same "colors" will blend, and components that disagree will contrast. Until a Context Driven Topology is fused into one cohesive whole, it appears to be the colored individual components in their current context and hierarchy—dots. When knowledge or ideas are fused into a topology they are made continuous and blend (9.3). There are countless variations of intensity, saturation, density and hue that are able to be controlled to fine tune these distinctions.

7.29 Certain components, interactions and histories are assigned colors both as components and in fields. People generally understand colors and fields without special training, therefore, this blending and contrast will make sense of the patterns on levels where the detailed information itself may not be fully understood. All color assignments and other classifications are arbitrary and intellectually assigned; for whatever reason, some people making these kinds of assignments choose only vibrant colors. The palette of the systems and methods described herein relies on neutrals and colors that correspond to unlearned responses. For example in nature, the color yellow is observed in temporary phases such as a baby chick, dandelion or sunrise. Therefore, yellow is ideal for data and data arrangements that are known to be subject to change. Reading these colors, topologies, textures and surfaces is conceptually very similar to reading maps. Interpreting these maps may be confusing at first but people, like they always have, will adapt and learn to understand.

7.30 When looking at information on the deeply detailed and meta-levels where the systems and methods described herein are most useful, it is clearly recognizable where, and when, each object originated and each point of view was generated. A simple way to see this is by looking at the arcs (3.3) (3.4) (3.6) (3.33) (4.1) (4.2) (4.3) (7.30) and [FIG. 4]. Analyzing why these creation points and concurrent and conflicting views cross back and forth, or come and go [FIG. 3], is an area where people have much better understanding than machines because these are OUR human dynamics, displayed at a scale or level of detail we are not able to see without machines [FIGS. 8A, 8B]. The systems and methods described herein are used to negotiate new boundaries for human understanding, machine understanding and our interactions with each other. These human/computer interactions are currently being redefined on a very short time scale that could affect a very long time scale. For example, the people of Saudi Arabia have been looking at the stars very carefully, and keeping records, for a very long time and therefore have unique detailed knowledge. It is dangerous to think that today's large scale digitization projects and shared knowledge stores will ever actually digitize all of the most important human knowledge and observations. In the long term, broader, more permanent view it will become increasingly important in our connected digital age to clearly understand where shared knowledge originates in time, culture, domain, or other area of background knowledge. We have handed down knowledge and kept records as long as we have been handing down knowledge and keeping records. Existing ways have all changed with the advent of computational machines and advanced networks, therefore, our methods for handing down knowledge and keeping records must also change. It is critical at this stage that these methods and record keeping styles change in a way that is geared for people because we have the better imagination and ability to see and interpret what these patterns mean.

7.31 All boundaries imagined by people are scale free to a machine or network of machines. Each boundary is "stretched or squeezed" (3.16) (3.18) (4.1) (9.11) to fit on various levels of the hierarchies perceived by users until context is assigned and a conclusion is drawn in the form of a new Context Driven Topology. During the time users are manipulating, controlling and selecting context for objects and the patterned space around them, machines never "see" these objects as people do—in a hierarchy with foreground and background—machines always process all of the data in the current arrangement in parallel. The machine uses mathematical processes to order these arrangements as a reflection of the user's hierarchical structures but machines only "see" groups, not hierarchies.

7.32 Sets and subsets of data components, groups, arrangements, objects and topologies that are viewed together in groups together tend to "drift", "gravitate" and "snap" towards each when they share common backgrounds or features such as a measurable scale, or key words etc. See (Section 10) for examples. The histories contained as symbols (Sections 2 and 3) within each components description are drawn together because machines are always processing the whole set of component descriptions in parallel, as duplicative components are gradually consolidated this shifting and moving within the components acts as if it is "pulling" components that share aspects of their histories together. This is caused deep in the background unseen by most users except how these actions affect the display.

7.33 Each group as a whole is treated as one object because it is "held together" or "wrapped" inside one description boundary. Ultimately, the reason a Context Driven Topology is formed is so this set of information groups and objects can share one new boundary as one new whole. The perceived appearance and mathematical configuration of a completed topology is markedly, and obviously, different than a collection of components that have not become "set" in their context. This whole is more than a sum of the parts. The behavior of these boundaries, and patterns that may be recorded about boundaries as they are initiated from different points of view, has value that is reflected in the presentation of the systems and methods described herein of information retrieved from shared data stores through the display patterns.

7.34 Generally, these configurations, histories and patterns are treated as objects in spaces where both the object and the space around it have meaning (1.1). There are ideal objects, spaces, proportions, densities and other measurements used by the systems and methods described herein that are able to be regularly observed by all people when they observe nature, art, music, design and mathematics.

7.35 Some patterns and sets of information may share so many components in common, it is up to the viewer to decide what the best way is to view and arrange like or repetitive components in the background or to pull information of priority to the front (Section 6). When these locations and proximities are set and the arrangement is captured in a Context Driven Topology, the priority addresses and locations are marked within the symbols as shown in [FIG. 9]. Each component and each topology has its own story presented through the display patterns.

7.36 When it is decided by a person or research group that the boundaries, proportions, density and hierarchy of the information is in its preferred embodiment, the edges (3.9) or texture (1.23), of the topological form reflects only the final decisions regardless of how many variations, reconfigurations and changes to the components there were along the way (5.7). Only the final group and final arrangement is captured.

7.37 Topologies that are merged together eliminate duplicative components. Eventually, the intention is to streamline down to only one very high quality original for each component and each topology, changing our dynamic shared data stored in memory 103 into an unlimited quantity of high quality maps instead of duplicative components (5.6). This will permit enormous quantities of unnecessary background information from being duplicated or displayed as a result of searches and other tasks (1.15). It will also ensure the information in dynamic shared data stores is of higher quality, the maps themselves are reviewed (6.7) and will greatly simplify the data arrangements that are preserved. These simplifications and improvements to quality are the purpose of the systems and methods described herein.

7.38 One way to see these simplifications is by looking at and comparing the edges and overall proportions of the various topological forms at an abstract level that is "before" the information itself (7.8). This becomes a new kind of object in a new kind of collection. Moving through the objects uses these edges, and has a palette (7.29), that is similar to walking through nature.

7.39 Each hierarchical configuration, symbol, and waveform will reflect details in the object boundaries, or edges, as textures across the entire form. For example, information that is used over and over again will have a texture like sand on a busy beach, information that is rarely used has a texture like fresh snow. No people need special training to understand these textures and machines can be easily trained in this automatic language. These edges, proportions and textures are the first identification that makes this particular one whole group of objects distinguishable from similar objects. Details in the edges are measured by a machine or group of machines mathematically, people may only be able to understand the automatic language (colors, textures, and forms) because the forms and edges themselves may be so complex it will take people some time to learn how to understand them, know where to zoom and how to best negotiate the relationship between the knowledge patterns, Context Driven Topologies, and display patterns. The automatic audio and visual language itself evolves over time to reflect these new relationships.

7.40 As introduced in (3.18) a boundary with massive amounts of information inside yet a small description outside looks ready to burst, a symbol with infinite complicated and overlapping descriptions with simple information inside is wrinkled, from far away both look the same. Whether each component is "far away" or "close up" depends on how this component is typically used in other configurations, people can usually only see this through the automatic language. The boundaries and details themselves are far more detailed then most people will ever review up close. The boundaries are made of vectors to scale without pixilation, they are continuous and never break down. This enables user to interpret information of different scales through the topologies directly (3.5) rather than through the original information itself. The boundaries have no scale because they are every scale. The boundaries have no inherent thickness, they are built layer by layer or initially connected arc by arc. The tools and controls for drawing the boundaries are related to computer graphics processing, operator interface processing, and selective visual display; the causes and effects of these changing boundaries are related to data processing.

7.41 As introduced in paragraph (1.4), no components or descriptions are ever duplicated. Two or more locations are simply indicated as multiple locations as a map of the context (5.6). If a user is not ready to choose one component over another yet, only the preferred component is shown on top, the similar choices are indicated either as a stack waiting behind the preferred component, or as a transparent component that gradually steps back in resolution as the similar objects recede in priority until the user decides to cancel the redundant and similar background elements. The user may define a limit on the number of levels and layers to be presented, compiled, or retrieved at any one time turning layers of information on and off using special controls. When the final Context Driven Topology is captured, all of the layers that are turned off or options that were not chosen are eliminated completely.

7.42 The last way a topology is viewed is also always the first way it is viewed by a subsequent viewer. When subsequent users wish to examine the information more closely, add or subtract components, the topology structure is dissolved and the components become individual objects again. The subsequent interpretation is then made into a subsequent topology which may be very closely related to the original topology. These small variations can be recognized mathematically and perceptually using the automatic audio and visual language and display patterns.

7.43 The knowledge and display patterns are controlled through techniques that twist and rotate in higher dimensions than people experience in daily life. These shapes and relationships can be studied through algebraic topology, knot theory topology and other mathematical techniques and are portrayed through an evolving language of colors, textures, forms and spatial relationships.

7.44 The special commands and visualization techniques of the systems and methods described herein enable people and machines to evaluate complex information at a simplified, more abstract level. The connection of these visualization techniques, or display patterns, to the mathematical framework, or knowledge patterns, allows redundant information to be machine deleted without a person or research group expending resources to review it. The thresholds and tolerances for these controls vary by user and research group. The indelible recognizable marks provided by the infinitely detailed topologies will enable a greater trust to let machines decide and consolidate redundant information on their own. Certain standards will become typical across certain fields. For example, an organization such as the American Institute of Architects (AIA) could create their own pattern of drawing standards, up to date building codes in each state etc. This pattern would be meticulous, detailed, current and shared. This group initiates their own pattern, is responsible for it, and maintains it over time, they can be the only ones able to change it in a way that it remains in this particular pattern (8.3). However, the methods of architects could be useful to other fields and used to begin another template, architects could borrow templates from engineers to incorporate into their owns etc.

7.45 The pattern uses and activities will begin to define where information patterns will tend to settle in the stateless space [FIG. 2]. Shared components, shared histories and shared patterns will "pull" similar topologies together to begin to self-organize because this is the way they are accessed in and out of the cloud.

7.46 A Context Driven Topology is a memory store that is also a multidimensional image store. Look up generally begins by providing the machine with related information or a set of specifications.

7.47 Images and other encoded data are recognized by machines and people in different ways, people see the manifestation of the information itself, for example, by reading or writing text. A computer only sees mathematical descriptions in mathematical arrangements. Detecting structure, design and variation is a very detailed human computer interaction process using the systems and methods described herein in between. Persistent or "true" information has a different appearance and characteristics than information that is in development or dispute.

7.48 As introduced in (Section 6), components are addressed as a bit map or graphic memory with priority based on their location(s) in each hierarchy. One output of these knowledge patterns is image data. These locations, adjacencies and circuitry are a combination of the data processing and display. It is in a sense, optical addressing, however the true locations are known mathematically and may be presented through any mode. The reasons behind the registry of most information components within a topology are described throughout (Section 2).

7.49 Machines affect the arrangement, grouping and processing of data and data arrangements by drawing and displaying virtual boundaries that twist, rotate, scale and impose hierarchy on knowledge objects to fit these objects into user defined configurations using new combinations of improved data processing techniques with Computer Aided Design (CAD) and scalable, non-pixilated continuous tone imaging techniques for bounded mathematically defined forms using techniques and processes partially disclosed throughout these specifications, further documented and developed through an upcoming project [FIGS. 6A-6C], including, but not limited to, the USPTO and corresponding International classifications listed below:

USPTO Class 326 Digital Logic Circuitry
USPTO Class 327 Nonlinear Devices, Circuits and Systems
USPTO Class 341 Coded Data Generation and Conversion
USPTO Class 345 Computer Graphics Processing, Operator Interface Processing and Selective Visual Display Systems including Subclass 77 brightness or intensity controls and others
USPTO Class 347 Incremental Printing of Symbolic Information
USPTO Class 356 Optics: Measuring and Testing
USPTO Class 360 Dynamic Information Storage and Retrieval
USPTO Class 367 Communications: Acoustic Wave Systems
USPTO Class 368 Horology: Time Measuring Systems
USPTO Class 369 Dynamic Information Storage and Retrieval
USPTO Class 380 Cryptography (also see Section 8 Shared Memory)
USPTO Class 382 Image Analysis, including procedures for analyzing and categorizing patterns
USPTO Class 385 Optical Waveguides
USPTO Class 434 Education and Demonstration
USPTO Class 700 Data Processing: Generic Control Systems or Specific Applications
USPTO Class 702 Data Processing: Measuring Calibrating or Testing
USPTO Class 703 Data Processing: Structural Design, Modeling, Simulation and Emulation
USPTO Class 704 Data Processing: Linguistics and Translating
USPTO Class 705 Data Processing: Specific to Business
USPTO Class 706 Data Processing: Artificial Intelligence
USPTO Class 707 Data Processing: Database and File Management and Data Structures
USPTO Class 708 Data Processing: Arithmetic Processing and Calculating
USPTO Class 709 Data Processing: Multicomputer Data Transferring
USPTO Class 710 Data Processing: Input/Output
USPTO Class 715 Data Processing: Presentation Processing of Document Templates and standards for many of the colors, textures and other characteristics described above are available for review separately from this document and will be further documented and investigated through an upcoming project [FIGS. 6A-6C].

7.50 The systems and methods described herein will raise questions about aesthetics. The new dialogue with machines may change people's aesthetics in ways we are not familiar with. The process of using the systems and methods described herein will give people new ways to recognize patterns, reasoning, classifications, hierarchies, purposes, designs and aesthetics we do not already know.

8. Shared Memory 8.1 Context Driven Topologies reside in a stateless space as interlocked threads of knowledge woven together by people over time to be simplified and streamlined by machines through the use of a shared memory.

8.2 As introduced in [FIGS. 6A-6C] (1.2) (1.7) (1.20) (2.5) (2.10) (3.21) (3.25) (6.7) (7.1) (7.11) (7.14) (7.15) (7.16) (7.26), different interpretations of the same information may lead to different conclusions and therefore variations in each Context Driven Topology's identity, form, boundary structure, perceived appearance, mathematical properties and other unique characteristics and defining features. The decision whether or not to create a permanent context driven identity for a data component, group, arrangement or topology is a process (Section 2) by the author, whether the author is an individual, institution or research group. Machine generated identities, although they are also unique, are only patterns. Machines are not able to define components, groups, arrangements and the conclusions represented in topologies, only streamline what we have defined.

8.3 The process of creating and identifying Context Driven Topologies is defined below and further disclosed in (Section 9). When information is proprietary, sensitive, private or should not be interpreted out of context, the protection of that context and identity follows any necessary combination of the steps below:

8.3a.1 When there is a dispute about data authorship or originality, two or more different topologies are precisely compared by machines and interpreted by more people than the original author and challenger(s), through the use of a shared memory.

8.3a.2 The first topology has already been produced and made into a fixed form by the author including the marks (3.15) (3.24) (7.11) (7.44) (8.10) (8.16) (8.23) (9.15), history [FIGS. 5A-5D] [FIGS. 6A-6C] [FIGS. 10A-10D] (1.4) (2.4) (3.10) (3.11) (3.18) (3.21) (4.12) (6.7)

(7.1) (7.14) (7.28) (8.3) and arrangements that show a "background" [FIGS. 5A-5D] where the idea originated [FIGS. 6A-6C] (1.22) (4.12) (7.30); subsequent topologies are the challenge(s) posed by the person, or group of people questioning the validity of the author's claims, originality, conclusions, work methods, conceptual processes, knowledge, or any other aspect of original work that may be challenged.

8.3a.3 The original topology created by the author naturally includes obvious indications of new connections that did not exist before. New bridges were created (1.13) (3.2) (3.29) (7.15) (8.12) (8.19), new techniques were created, the algorithms streamlined and encapsulated (9.4), non-essential components and techniques are eliminated, and all of the background information consolidated into a patterned space. Each topology's content is unique; each background is unique. Two topologies created at the same time that share the same components and same context are considered to be the same topology regardless of the fact that, theoretically, it would be possible for two precisely matching topologies to exist. The systems and methods described herein comprise a form of record keeping; it serves no purpose to keep exact duplications, only unique variations. Therefore, two authors cannot create the same topology, they each have their own version and one would be first, even if they were at the same time, it would not be possible or worthwhile (using this system) to also be in the same place, or have the same content and context, without being automatically consolidated into the same topology.

8.3a.4 The proper placement and definition of new data components, groups or arrangements is therefore the most difficult aspect of introducing new ideas because each arrangement does actually need to be unique, even if it is simply "before" or "after".

8.3a.5 Each Context Driven Topology is formed to convey the author's idea most clearly by being described and arranged to reflect the author's reasoning and meet the author's technical specifications and aesthetic preferences. This unique configuration and identity is introduced to the stateless space and automatically gravitates toward a certain zone because of 'threads' and 'connections' to related patterns, placements, histories, and configuration types.

8.3a.6 If an author has drawn new conclusions they wish to publish, the author may try to place their ideas into the shared memory without review by claiming the ideas have certain characteristics. However, the author's own arrangement may not have as much meaning, or be as recognizable, without the additional marks and connections provided by reviewers, publishers and peers that understand this complex information. Each of these connections adds 'weight' 'density' and definition to the ways each topology is prioritized and placed (Section 6). Typical users of Context Driven Topologies and the shared memory upon which they depend generally aim to provide their peers with access to new ideas and new knowledge because they would like to receive credit for these ideas, defend their ideas [FIG. 4], and be able to continue the discussion.

8.3a.7 The author uses special language, develops techniques, and other knowledge related skills to arrange their configurations to be recognizable and unique because there is no reason to create a new one that is too similar to another version. Advanced networks of machines and the shared memory area in the stateless space automatically merge matching versions in a very cold hearted, automatic way. If the author did not 'make' this arrangement it is obvious. Whether the arrangement is 'true' or 'accurate' or 'the best' arrangement or technique is up for discussion. This procedure is no different than conventions for introducing or sharing knowledge that already exist. However, it is very different than the easy introduction and lack of review that exists for unmapped data and information proliferating on the internet today.

8.3a.8 If the future person, or people, challenging the ideas captured within a topology wish to file a dispute, they "pose their question" using another topology going straight to the essence of why they feel the data or the data arrangement is either incorrect or a "set up". The challenging topology may be either more simple or more complex than the author's topology because it is constructed for a different reason and therefore has a different set of marks, arrangements and histories—it may be a very simple question that could resolved or corrected by the author in an amended version, or it could be a detailed point by point argument that requires multiple proofs and citations to explain. Neither the original nor the questioning topologies is automatically 'shorter' or 'longer' than the other or in any specific order (2.3). Machines always analyze all of the descriptions together in one group. The original and the challenge(s) may be considered as: separate wholes; these wholes as they compare to each other; these wholes against limitless others introduced to decipher whether or not this group of data and data arrangements is unique, accurate, or any other knowledge based question. Using a combination of the knowledge patterns, display patterns and the shared memory, there is a point that is eventually reached, and determined to be the correct point according to the users and challengers knowledge, where the issue at hand is able to be isolated and accepted or rejected.

8.3a.9 Data authenticity and error or fault detection generally begins with both people and machines interacting to investigate where conceptual leaps (1.25) and connections have occurred. It is a mathematical statistical process for machines to compile the histories and pathways contained within the symbols (Section 3), and a judgment process for people to evaluate the placement of these bridges, and the logic of these connections, to discover if the conclusions are new, true, or already concluded by someone else (7.12). This comparison is only possible because the conclusions are able to be compared on many levels in their entirety against a background of existing historical knowledge [FIGS. 8A, 8B].

8.3b.1 When information takes on completely different meanings out of context, one of two things can happen, either this data arrangement and patterned space around it cannot be broken therefore all of the components automatically come into new topologies as group permanently locked together, or through a very detailed and time consuming process, individual components can be reassembled one by one up to a certain point defined by the author. Just as in real life today, some people may spend this time to fake a 'real thing' but using the systems and methods described herein, especially the shared memory feature, question by question, challenge by challenge, either this 'fake thing' will persist or it will not. Blending in without disrupting the flow does not enable a topology to persist either. This time consuming and tedious process to construct a 'copy' 'forgery' or 'fake' would leave bridges and marks easily identified and exposed by both people and machines, it is usually not worth the effort.

8.3b.2 Due to the history of each components prior context and uses, and in certain highly specified future cases, once a certain threshold of components, defined by the author, begins to be arranged or grouped together by another user, either the entire group of them is automatically retrieved and shown in context which would naturally include the authors marks, or the components repel each other (5.4) and will not stay in the same group unless new, out of context, bridges and components are also included to hold them together.

8.3b.3 Time in this system is one way for most purposes. The context and specifications to define each topology are able to be established so the form collapses or cannot be seen when it is accessed from the future in the wrong way. Privacy specifications are typically only applied to the display patterns. As it is today, if someone invents a new way to hide, another person will invent a new way to detect and vice versa. This back and forth dance is part of the human experience.

8.3b.4 If, for example the possible forgery in (2.5) or the court records in [FIG. 4] ever show the indelible mark of a falsified identity related to this person or object, this information is permanently and engraved into this set of components. It is not possible to put these same components together in the future without also, automatically, bringing this permanent indelible mark.

8.3b.5 The systems and methods described herein comprise a new way for more people to include their interpretations about ideas that have a more wide reaching affect on more people than some of our older methods are able to handle.

8.3c.1 When information is private, for example a person's identity, these components are specified by the author to have edge conditions (3.9) that are not able to be bound within other arrangements. Each specific attempted use is transmitted to the author via the shared memory. If the use of the information occurs after the author's life time, or if the author is not paying attention, it is a special matter to be handled case by case using people's judgment about machine derived histories.

8.3c.2 Context Driven Topologies and the shared memory space will allow for both broader and narrower interpretation at both deeper and shallower levels. The component based system (Section 3) of the systems and methods described herein will permit certain PORTIONS of data, for example a person's identity, to be protected and removed from other, less invasive or sensitive, legitimate arrangements, such as a scientific study of peoples travel habits and expenses, where an individuals personal identity is not important except in the most extreme cases, for example monitoring travelers that are a known security risk.

8.3c.3 If, for example the detective in [FIGS. 5A-5D] or the possible forgery in (2.5) involves interpreting information where the author wishes to conceal or otherwise mislead others on their identity, or the identity of the objects, or histories; as indicated in (8.3b) above, this is a construction that advanced networks of machines, peoples awareness, and the shared memory space will detect through patterns such as excess challenges, irregular challenges and lack of challenges in the histories; or specific tracking, specific similar arrangements, and specific new questions established in a new topologies and new patterned spaces until eventually these constructed, as opposed to evolving, patterns will be stripped away and revealed by the process of not moving ahead, not changing or otherwise not matching infinite other patterns that have been created over long periods of time for legitimate reasons that are far too intricate and detailed to be falsified within one person or machines lifetime.

8.4 Context Driven Topologies can be viewed from every angle, taken apart, put back together until the ideas wear out and we get tired of them. When we do not need or want to look at them anymore they do not clog the top levels of the shared memory space. Ideas that have fallen out of fashion, or proved to be incorrect and are abandoned, are compressed in the background and occasionally retrieved in the future when someone has the knowledge to abstract, describe, and extract the essence of the idea i.e. the object (Sections 1 and 2) by cutting through the existing descriptions in a way that could not happen without advanced networks of machines and a shared memory. Naturally, these shortcuts would bring the older information to the front and the quicker path to the object in the context of current knowledge, is the new description.

8.4a If it is an incorrect idea from the past, it would be dragged into the future along with the reasons why it was abandoned. There may be new knowledge and new machines to interpret previous ideas a new way, however it is very important to know WHY the idea was dropped (4.12).

8.5 Information in the shared memory space is subject to intense scrutiny (8.3). Information that cannot withstand such scrutiny has difficulty becoming attached to other objects and will eventually be forgotten without clogging up shared data collections or being recognized in specific searches. Most areas of the shared memory are too deep to be "accidentally" retrieved (1.22) (9.1).

8.6 As knowledge evolves, is gradually accumulated and streamlined into in the shared memory, over time it will become more obvious which information belongs together versus which information is difficult to force into the same arrangement (8.3). It will also allow people in groups, with specific knowledge, techniques and machines to decide which complex shared information is not important or worth keeping.

8.7 The disputes, bumps, and irregular edges (3.9) on a Context Driven Topology are its characteristics and defining features. As knowledge and ideas become more accepted, even old, the edges eventually wear down over the course of time. Ideas that have inherent deep textures, or histories, that have become worn down are more easily streamlined with other ideas because the deep background textures are always compiled by machines, as all topologies always are, in an entire group many levels beyond the levels where people are evaluating or understanding the data arrangements and the histories they contain.

8.8 The priorities (Section 6), characteristics and features that people identify, create and extract through use of the systems and methods described herein extend many levels beyond the era or knowledge domains where the data was created (8.7).

8.9 If a future query originating at any point in time from any knowledge domain is able to describe if the essence of knowledge or data arrangements using any technique that captures this essence—the knowledge, its objects, relationships and histories will all be recognized and retrieved. Each subsequent retrieval and interpretation leads to the preservation and clearer understanding of this knowledge. Faster, more direct pathways to each object are permanently bound to each object and recognized by machines in future searches. The new pathways are, in a sense, a machine created identity for the object that may not have been initiated in the past or within the domain where the objects are normally preserved. Nevertheless, machines do not "know" how to create a new topology, nor is it to people's advantage to show them. Deriving new relationships and patterns, streamlining knowledge in dimensions we cannot perceive, and recording our knowledge over time is the only role machines serve in the systems and methods described herein.

8.10 Searching the shared memory space typically begins by providing similar versions, outlining or sketching arrangements, running tests (4.14) and other user defined techniques to define features, irregularities and precise variations of the information being searched, retrieved and extracted by feature.

8.11 The marks and histories embedded in each Context Driven Topology in the shared memory space show that the data arrangement has faced challenges and persisted. Likewise, data arrangements without these marks does not persist in dynamic shared data stores [FIGS. 6A-6C] (1.1) (1.6) (5.7) (7.47) (8.3) (8.20). Therefore, the data and data arrangements maintained in the shared memory will be higher quality and the storage space itself will have mechanisms to self-organize as data components, groups, arrangements and whole topologies move in and out of the stateless space over time as initiated and sent back into storage, driven by human questions and interpretations from backgrounds of varying knowledge and understanding. Simplifications and streamlining between ideas, having a record and being able to see how ideas and interpretations change, or are interpreted differently from different points of view are all made possible through the use of the shared memory of the systems and methods described herein [FIGS. 6A-6C] (1.22) (9.2).

8.12 As data components, groups and arrangements are retrieved or created to be used in new topologies, the object's meaning and the processes required to read information about this object is automatically updated and preserved to meet current technical standards and knowledge requirements. Therefore, knowledge and the techniques required to read this knowledge are preserved through evaluation and use.

8.13 Whether a person creates an identity (2.13) (8.3) or a machine generates a pattern (8.9) used in the shared memory space, there always be will non-continuous places and edge conditions that distinguish each identity and pattern from similar versions. The placement of these bridges and the ideas they are bridging, the edge conditions, and the aesthetics of the topology itself will be what is interesting, and of value, in the future.

8.14 The systems and methods described herein, including the shared memory space, are intended for information that has unlimited variables, configurations and essential characteristics that people spend time to discuss, evaluate and argue.

8.15 As historical comprehension changes (3.11) (7.22) so do the topologies.

8.16 Because Context Driven Topologies rely on shared memory to self-organize (7.45) (8.11) and self-perpetuate (9.19), the systems and methods described herein comprise an interaction without a medium.

8.17 Because Context Driven Topologies are evaluated from many points of view over time they rely on shared memory; because this memory is without a medium (8.16), Context Driven Topologies are automatically passed from generation to generation as if they were stories. These cycles and interpretations are an aggregate of all of these descriptions and views over time. Therefore, the systems and methods described herein are independent of specific natural or machine languages because each of these languages would naturally be included within each topology to continue to evolve, and be periodically updated or preserved. Most patterns are detected by advanced networks of machines, and even though each machine or network of machines may or may not be dependent upon electricity now or in the future, Context Driven Topologies and the purpose for them, are passed like songs or stories through time and therefore independent of electricity.

8.18 It is only mathematical patterns and an automatic language that is created and reviewed by machines. A Context Driven Topology is a time capsule of ideas and data processing techniques in a unique configuration that only makes sense in the stream [FIG. 3] (B1.5) (1.1) (1.7) (2.2) (3.7) (3.11 and 3.12) (3.16) (3.21) (3.24) (4.6) (4.10) (4.18) (6.9) (7.1 and 7.2) (7.8) (7.18) (7.23) (7.37) (8.1 to 8.3) (8.6 and 8.7) (8.9) (8.11) (8.29) (9.1) (9.17) or as part of its original collection. The 'real' or original information resides protected, or degrading, in another place. The information used in Context Driven Topologies is copied from the original (2.6), these data arrangements are only virtual and man made, and no one organization is responsible for its accurate interpretation because everyone is responsible for its accurate interpretation. Context Driven Topologies reside in a stateless space that is a media-free shared memory (8.16) (8.17). Context Driven Topologies, especially in the symbol form (Section 3), are used as maps in and out of this one shared memory or dynamic set of interpretations and records. Each map itself is an interpretation. The purpose of the systems and methods described herein is to consolidate and streamline these records, make them available at deeper levels to experts in different domains, and to preserve this information over longer periods of time independent from individual media, machines and electricity (Section 1).

8.19 The registry of information within Context Driven Topologies is determined by the person or research group who authored and engineered each arrangement (2.12) (8.3). This registry, identity and placement are the only ways a machine or network of machines knows how to begin to retrieve and identify information within the abstract data cloud [FIG. 1] [FIG. 2]. Machine created identities are generally patterns not individual identities such as components, groups and topologies (Sections 1 to 3).

8.20 Each person or research group that creates data and data arrangements has control over their data ownership and responsibilities. Generally, the Context Driven Topology system is intended for information where each author assumes full credit and responsibilities for each arrangement (1.14) (8.3). It is for information that is meant to be formally introduced, challenged, argued, examined closely, then determined by the shared memory between the group of users who understand this information (1.7), whether or not it is correct or worth keeping (8.6). The more information is reviewed and used, the longer it persists in the shared data store maintained by people who understand the information in this store. When the same examples keep being used over and over without introducing any thing new, this is able to be perceived through topology itself due to a lack of virtual bridges. If users creating the new topologies wish to have this be viewed as a truly new idea, over used components are able to be limited through the configuration specifications from the beginning.

8.21 Context Driven Topologies are a shared memory combined with a storage means independent of specific display devices because it is assumed these devices will improve over the time each topology exists.

8.22 When the Context Driven Topology system is used to detect or correct errors, these errors are able to be isolated by either working with the space the topologies are perceived to be in, in the topologies themselves, or in a combination back and forth [FIGS. 8A, 8B] between the two until the error has been isolated and corrected to meet the originating author's specifications. The Context Driven Topology system will allow users to compare complex, different, even unrelated, information to get a faster idea about the areas that have become entangled and should be reviewed to be more streamlined and freed of their errors.

8.23 Sharing information by using the systems and methods described herein will lead to a new politics of data description and presentation and, more importantly, a new aesthetic for what is perceived as designed, balanced, or purposeful [FIGS. 6A-6C] (7.49) (8.13).

8.24 Data authenticity is reliably and quickly evaluated through a cooperative agreement between people and machines by an analysis of the indelible marks within each topology. If it has a mark from a certain lab, which cannot be duplicated, this adds to the data's authenticity. If a mark is forged, not only the (false) mark will be there, but the leap or bridge and steps needed to create the mark since it was not already present, will be inseparable from each other in this particular topology, or it will be a new topology because actually, it is a new arrangement, no matter how it is propped up or posed. It is a new unique arrangement or it is drawn into the void (8.3). The systems and methods described herein force accountability upon those who use this system.

8.24a There will always be an implied trust that the people who generated archived information understood what their words, mathematics or images imply, that this information was constructed on purpose and their machines were functioning as intended. If we believe and understand the images, works, claims, stories, proofs and simulations displayed in the future, we can either "save as" the whole arrangement, or the bits and pieces that are relevant or interesting to current modes of thinking.

8.25 Collective data fault and recovery made possible through the shared memory is a process of defining consistencies, specifying constraints on the arrangements themselves and other steps explained throughout this section.

8.26 Machines record and measure human reasoning, evaluation techniques, knowledge based discussions and interpretations as they occur over time using a shared memory that falls within, but is not limited to, the USPTO and corresponding international classifications listed below:

USPTO Class 380 Cryptography/42 data stream/substitution enciphering

USPTO Class 709 Multi-computer Data Transferring

USPTO Class 711 Data Processing: Memory

USPTO Class 712 Data Processing: Processing Architectures

USPTO Class 968 Horology/47 acting in both directions/290 for extremely long running times, using techniques partially disclosed herein, further investigated, documented and developed through an upcoming project [FIGS. 6A-6C].

9. Data Curation and Digital Preservation 9.1 There are different organized areas in the stateless space. The shared memory area where theoretical physicists perpetuate and preserve their ongoing discussion is in a different, deeper place than the area where the latest on web art is displayed, and different than the locations of the best pathways and circuits, or rings, to unique little shops making handbags no one else has. The display patterns and knowledge patterns are different to and from each of these areas. The shared memory is not the 'only' information space, just the areas and objects that are preserved and accessible over extremely long periods of time. The shared memory of continually updating information, for example a product like a computer that will be replaced with an improved version as soon as possible, uses different kinds of patterns to record what is happening overall and position itself in the stateless space. Some aspects of these products and patterns, for example information about what each operating system actually does and the ways this group of computers evolves, will eventually form a long term shared memory with overall patterns. Generally, just like today, this information is private or belongs to the company creating the product and the competitive jockeying for position to stay on top, be the first one seen in all the competing information is all that is displayed to others (8.3). This positioning, history and pace of change is expressed through the automatic language (Section 7), tracked overall using the knowledge patterns, viewed using the display patterns, and interpreted or otherwise brought to new conclusions by constructing new topologies. The mapping between the knowledge patterns and display patterns is accomplished differently by each user which begins to form its own set of patterns and meta-patterns. The patterns on all levels are infinitely connected and detailed. Since the display patterns are an "opposite" or known "twist" to the knowledge patterns, the two are often used in combination. Standards or rules, such as architectural drawing conventions [FIGS. 5A-5D] (3.27) (7.15) (10.3) are easily combined with other patterns to ensure that information is structured and presented as accurately as is known to be possible. Varying presentation through the patterns also applies to preferred natural languages (10.2), cultural interpretations (7.25), new aesthetics (7.50) and any other interpretive reasoning or control features that can be gradually accumulated to form mathematically based patterns illustrating knowledge objects and areas within a stream of patterned spaces.

9.2 The knowledge and display patterns interpreted through the systems and methods described herein reside in boundless abstract cloud, or stateless space that does not exist in a "place". It is a shared problem solving space that is needed for our shared knowledge systems. Context Driven Topologies are not physical or real, through the use of the shared memory space and advanced networks of machines people can 'borrow' both data and data techniques over long periods of time, and individual machines and data processing techniques can continue to advance. For example, if the current machine needs the 2004 Universal RDF Schema Namespace or the user needs to access a German 1639 dictionary, the topology indicates a wider context to borrow tools or purchase access to the broader knowledge.

9.2a Many institutions, such as museums and libraries, do not have the resources to stay current with the changing pace of technology. Only the most essential commercial programs are purchased, otherwise it is generally an open source system.

9.2b There is no place, no reason, or no one organization where the topologies could reside outside of our imagination, reliable non-ambiguous mathematical codes, and a rendering of the form where we communicate in between. They just exist, people make them, find them and monitor their use. There is no benefit in them being made physical or "real" at this, or probably any other, time because if they were someone would just have to take care of them. This individual or institution would start to be the only one who understands the topologies and, in effect, they would no longer be shared or discussed which is their purpose. The topologies need to degrade and eventually be lost (5.1), just not at the rapid pace that current technology degrades or is lost (1.15).

9.2c If there was a material that could be used to capture the topologies as a fixed sculptural form, this material is not known but presents intriguing possibilities; this may be pursued. Generally, topologies people look at or are next to are 'made of', light and sound (4.11) (7.5) (7.20) that naturally need to be presented through machines. Many existing techniques and conventions can be married together as will be prototyped, introduced and distributed through an upcoming project [FIGS. 6A-6C].

9.2d There are efforts underway (for example at IBM, Aprilis, InPhase Technologies and research universities) to develop holographic data storage which may prove useful for representing and archiving Context Driven Topologies if a media was determined to be necessary in the future. However, many of these techniques like all machines and media, face technical difficulties, for example image distortion and ghosting, but more importantly most do not allow new information to change the image/memory on the media, or any change violates the authenticity of this record. Nevertheless, the implications for "shortcuts", "overlapping" and higher dimensions of data access or storage using holograms may have possibilities and may be briefly investigated [FIGS. 6A-6C].

9.3 When an idea is captured or a conclusion is drawn—science, art, language, image, human understanding and machines all cooperate and intersect being formed into a Context Driven Topology. The unique user interpretations and techniques are in an arrangement of only essential components. This particular group of components is squeezed together so hard that it is fused into a continuous form, the only extra space is on the outside, this space and the time which the topology was created is also patterned. The outside description is composed of mathematical patterns with cycles that never exactly repeat. Machines only understand the outside. This shape becomes the Context Driven Topology that is converted into symbols as "pathways" into multidimensional waveforms to be distributed. The content inside is merged, one component of the idea seamlessly leads to another, people only understand the inside. The boundary in between is the shared identity of this idea for the future, it can be simple, complex or anywhere in between.

9.4 When a Context Driven Topology is formed, advanced networks of machines automatically "vacuum up" the techniques and algorithms needed to read the users content from the ORIGINAL data stores, for example the lab that created the work, a writers desktop, a museum's high quality digital images from several views bound together with a scale icon [FIGS. 6A-6C] curators descriptions about context, and any other combination of ideas and techniques used to create, interpret and represent knowledge. Redundancies are purged between the techniques and algorithms the same as the shared components and shared descriptions are streamlined and combined. Simplifying these algorithms and techniques will be a useful, purposeful way for machines to help us organize and structure the shared information space using straightforward methods people may not be able to recognize or understand because we have a different relationship with data arrangements. The Context Driven Topology of arcs, data, sequences and arrangements contains only specific components scaled to fit this exact user defined configuration. The process of compressing and compacting ideas and techniques into a topology does not save the whole dictionary of the French language, only this set of words in context; there is no space allocated for every image processing technique available in Photoshop Version 6 on Windows XP Version 5.1 Build 2600.xpsp2.030422-1633: Service Pack 1, only what is needed to see this image, with these words in this order, arrangement and context where the author has them placed [FIGS. 2 to 4]. The systems and methods described herein treat original ideas and the techniques employed to express them like something real that is only truly accessed from the original source, like borrowing a painting for an exhibit, when it is stamped in context, in a topology and made into a perfect, readable, copy for the future.

9.5 During the interactive data curation process, people can ask for objects and measurements to be automatically aligned, proportional, stacked or displayed in a preferred or known order. The underlying structures themselves are never automatically "aligned" or "placed" [FIG. 2] without the users knowledge because this is where the adjustments occur to make each configuration unique. As retrieved and placed information gets more attention from the viewer, it is automatically allocated more space and higher resolution by the machine. The display patterns and automatic language results in a new type of collage that is the easiest for the user to read [FIGS. 8A, 8B], the actions, transformations, techniques and controls rely on the patterns themselves.

9.6 The topology boundary is a continuous edge (3.9) that is displayed as smooth curves at any scale (7.40). Sometimes adjacent and distant curves are so overlapped and tangled it does not look like one continuous boundary but it is always is, otherwise it would not be one topology. Mathematically, this is similar to knot theory topology (1.1); in people's imagination it is a drawing of a hard problem that has not been unraveled. Distinguishing between and describing the properties, relationships and rationale that define each boundary and therefore each topology is an interactive, high dimensional time dependent process between people and machines over such long periods of time that both the people and machines will come and go over the course of one topologies simplification, or unraveling process. Generally, machines are able to 'understand' complicated boundaries and larger groups of bounded objects easier than people except in this system where each topology has been constructed, and each boundary is defined, for people to figure out a new idea, decipher and put together a new picture, or show existing ideas a new way using new techniques. Each data component, group and topology boundary has been carefully placed [FIGS. 3, 4, 9, 10A-10E] by a person for a reason. Boundaries are always composed of curves without corners [FIGS. 6A-6C, 7, 8A, 8B] (2.10) (3.3) (3.18) (3.27) (4.5) (4.9) (7.30 to 7.32). Each topology is an evolving continuous whole in a stream of patterned spaces. Each configuration can be viewed from every angle until this set is dissolved to use as individual components and smaller groups in new topologies (8.3). There are important areas around these bounded evolving memory forms where there is "nothing". These empty spaces have as much or more meaning than the areas where a boundary and form is perceived [FIG. 2] [FIG. 3] (3.17) (3.20) (7.5) (7.31) (7.33) (8.2) (8.9) (8.20) (8.22 and 8.23) (9.11) (9.13).

9.7 When using the archives in the shared memory space, people begin the interactive process by asking machines to see through an infinite field of unrelated data [FIG. 1] to systematically recognize previously unpredictable or temporal alignments a new, more predictable way using detailed mapping, filtering and patterning techniques. There is not one centralized source or starting point to begin looking through the archives in the stateless space except that each view always originates in the middle. Placing the view, defining the edges and boundaries is accomplished step by step using the knowledge patterns, mapping, organizing and display techniques of the systems and methods described herein. The information captured in a topology is initially seen as if it were a photograph, the last way it was arranged and recorded (7.42). However, unlike a photograph, future viewers can turn the image new ways to see and create new views.

9.8 If the retrieved information is not quite what the future viewer had in mind, the group of topologies in symbol form within the descriptions are consolidated into pathways leading to the original data collections which are certain to be broader, more complete, and more up to date than the knowledge and techniques captured within any one topology. It is very likely that similar, potentially better information will be in the original sources. Or it may be backwards and there is an area that is very important in the new arrangement and no existing components have enough clarity or depth to expand into the "space" that should be filled; in that case the new person needs to build bridges, fill in gaps, make or otherwise complete what is missing.

9.9 As introduced in (Section 1) it is not possible, theoretically or practically, to predict what may be interesting or we will want to look at in the future. People need to identify, preserve and be able to accurately search problems and ideas that may require further contemplation, or better machines, to figure out later.

9.10 Using Context Driven Topologies is like writing down, recording and playing music. Mapping between the knowledge and display patterns eliminates noise and fine tunes the music to the kind you like or the composer had in mind. Noise in this sense could also mean more abstract noise in scientific data.

9.11 All boundaries are scale free to machines. Each boundary is "stretched or squeezed" (7.31) to fit in hierarchies and levels constructed by people until a meaningful context is assigned and a conclusion is drawn [FIG. 2] [FIG. 4] [FIGS. 6A-6C] (3.7) (3.13) (7.31) (7.32) (8.3). During the time people are manipulating, selecting and determining the priorities and adjacencies of data components and groups in the new configuration, machines never "see" these arrangements as people do—in a hierarchy where portions of the background are completely blocked by the foreground—machines always process the whole group of techniques in the current arrangement as if they were one technique by borrowing from the background, updating with current techniques on the network, and folding this set of techniques over to consolidate, mix, simplify and weed out algorithm by algorithm until machines can establish their own pattern defining simpler ways to do the calculations and simplifications that eventually gets this group of techniques to work together. The only way people can check this work is to see how it compares to other calculations and simplifications that are known to be correct. The vast majority of topologies use the same technique throughout and it is not an issue. Machines keep techniques separated and just 'pretend' to run them together at the same time to temporarily show the images, words, drawings and ideas people are would like to see together at the same time for reasons machines can't understand and people are not able to describe yet. Diverse, potentially incompatible techniques only appear to be combined when they are compressed and captured together in a topology. Each data compression and technique consolidation may need to leave sets of techniques separated until they can be simplified, streamlined and consolidated over longer periods of time. These separations could be compared to natural languages and cultures, people can still communicate and share common interests even if we do not speak one shared natural language, each culture's ideas and personality is expressed best in their own language, the same might be true for machines, how would people know?

Advanced networks of machines use mathematical processes to help us understand, maintain, organize and simplify dynamic shared data stores by translating their actions, groups and relationships into an automatic language (7.1 to 7.50) that is a new application for Graph Theory; Knot Theory Topology; Algebra, Group Theory, Combinatorics, Fourier Analysis, and various interrelationships between these fields that is most clearly captured through mathematics but understood through words, sounds, and images and other modes.

9.12 Each topology will be easily identified by either people or machines because the overall description has been vastly reduced from the expanded descriptions of each object and group inside. Each theme has been established for a reason and the algorithms have been arranged and consolidated in a way that was logical to at least one machine at one time. Therefore, this compacted united knowledge object can be recognized using both object itself (peoples understanding) and the patterned space around it (machines understanding) to recognize the object either by its form, or the mathematical descriptions that pattern the space around it.

9.13 The complexity of these patterns and forms will require a higher level of sensitivity than people usually have; each one is a challenge to measure. There are too many topologies, objects and spaces to choose from; the details blend; people are impatient, get distracted and are not able to perceive enough depth to see all of these configurations, symbols and forms as if they were a collection or group like we are used. But together with machines, we can collect and analyze these new kinds of activated objects as if they were fingerprints that could point to the persons current location, fossils that come alive again, or sculptures that could be tried in different materials under different lighting in different sizes and different places. Noticing or creating relationships between these objects, patterns and new collections can be initiated by people or machines, but people are the only ones who set the pace by deciding where to mark and place new boundaries over time.

9.14 Of course data privacy, security and authenticity will become even more critical as remote or unverifiable information continues to grow and connect. As introduced in (8.3), the display patterns can be used to cause data arrangements to utterly collapse, disappear or present only as permitted by making certain components and combinations "one-way". Deciding what the most reliable techniques are to block and filter portions of knowledge and objects in the stream will be developed, documented and investigated further.

9.15 The histories, evolution and changes contained within groups of Context Driven Topologies over time are not only helpful for people, they are also helpful for networks of machines (9.11). The group of techniques captured and simplified as much as possible into one group in each topology and each set of pathways can be packed with countless instructions and difficult, carefully reviewed scenarios engineers have worked through, thought about and discussed with other engineers to get this set of techniques to work together in the past. Networked machines using the systems and methods described herein could access and try some of these more creative, innovative algorithms and calculations to see how they work to simplify this group. Because machines generally improve as time goes by, it is very possible that new machines will be able to show us simpler ways to organize data and data arrangements IN THE ENCODED VIEW faster than people will ever be able to see from "inside" each topology (9.3). Through this continued back and forth dialogue [FIGS. 8A, 8B] at the changing boundary between what people understand and machines can show us will eventually lead to sets of data arrangements and techniques that are difficult to get to work together and therefore kept separately (9.11) will start to be compressed into tiny little records tucked inside more simplified arrangements that DO work. All of these embedded, small slightly incorrect records and techniques can be evaluated by machines together over time, there may be details that appear insignificant to us but in fact, are what the problem was, therefore, the systems and methods described herein will also help simplify the topology and techniques of advanced networks of machines.

9.16 The new logic of the systems and methods described herein must be developed in collusion with machines, because it is constantly updating and being fine tuned.

9.17 Data collections that exist in the same physical location in the future are loaded into a compiler/broadcaster that continually simplifies and streamlines this one collection individually. The simplifications feedback into the shared memory as specified by each user, research group or institution that creates or is responsible for this information.

9.18 Regardless of how compressed and "pushed into the background" each Context Driven Topology becomes, it never affects the shape and pattern recognition. Searches are still initiated by people sketching out, describing and trying to define and "see" either this form or the space around it (3.8).

9.19 The systems and methods described herein comprise an automatic knowledge distribution system to store, organize, perpetuate, and retrieve dynamic information without a medium (8.16).

9.20 Interface and conversion between diverse techniques, languages, systems, and formats is handled through the mathematical patterns (7.1 to 7.4), the automatic language (7.1 to 7.50) and the maps in related Context Driven Topologies.

9.21 By most definitions, what most users generally want from information is for it to be correct. But when the "correctness" can vary because the information is related to, for example high dimensional humanities content, the purpose of the systems and methods described herein is to allow varying interpretations to gradually "push" or "guide" the knowledge patterns towards more documented, long term, evaluated beliefs rather than rash or judgmental short-term beliefs. Use of the systems and methods described herein as a record keeping system for ideas will be able to pinpoint locations of unusual occurrences or rapid changes in direction. This will help us to identify other kinds of unusual occurrences or changes in direction. These scenarios are captured mathematically, interpreted as a pattern, transformed and evaluated through the presentation mode preferred by the user.

9.22 All data curation and digital preservations actions are accomplished through the human decision and evaluation process (9.1) (9.5 to 9.7) (9.11). All data processing is done with machines using the techniques partially disclosed herein, investigated and documented further through an upcoming project and [FIGS. 6A-6C] as specified in (1.25) (2.13) (3.38) (4.18) (6.10) (7.49) (8.26).

10. Specific Embodiments and Applications 10.1 Specific embodiments and applications for the systems and methods described herein include but are not limited to: large scale museum and library digitization; online publishing; object, pattern, shape and sequence generation, identification and recognition; priority addressing and mapping; network and machine topology; identifying current locations of genuine objects, events or living beings; measurement; evaluation, testing, authentication, calibration, analysis, interpretation, exploration, vision, creation, conversion, translation, transformation, logic, purification, error and consistency detection, tuning, classification, registry, harmonization, composition, consolidation, masking, precise similarity measures and better redundancy elimination techniques, visualization, design, imaging and modeling, simulation, games, drawing, recording, processing, compiling, compression/decompression, distribution, cryptography, navigation, multiplex and global communications, transmission, signaling, and other research, educational, entertainment or business products and practices.

10.2 The systems and methods described herein can also be used to improve machine translation of natural languages. Words in natural languages are an intricate web of associations. The patterns of the systems and methods described herein will show each word, phrase, concept and story surrounded by the layers of interpretation and meaning each word has had over time. In most languages, the word usage is strongly related to its association within a particular phrase or other context. Identifying subtle context, such as word meaning, is one purpose of the systems and methods described herein. Also, because the systems and methods described herein are primarily presented through (light and) audio using measurements like intensity, inflection and particular emphasis which is so critical to the correct interpretation of most natural languages. In the upcoming project [FIGS. 6A-6C], Chinese Mandarin (and nine other languages) will be recorded and used in combination with Chinese characters in a model showing relationships between word usage, symbol and inflection using the real words in context that are generated by this project as a "set". Natural languages are translated by turning and manipulating and realigning [FIGS. 8A, 8B] each word, phrase and concept meaning using the patterns until this group of objects presents in the natural language preferred by each culture, research group or user. The more widely the systems and methods described herein are used, the more complex, dense and correct the web of word associations will become. The better, more meaningful, story telling machine translations enabled by the systems and methods described herein are more useful for international research than the linguistic constraints imposed by current metadata methods. Over time, the systems and methods described herein will gradually be able to quantify unquantifiable factors such as expression and other differences that exist between natural languages and computational machines.

10.3 The systems and methods described herein are perfect for games and amusements.

10.4 The systems and methods described herein will present art as intended by the artist, science as intended by the scientist, and other creative fields where people struggle to define work that is often not measured by words. The systems and methods described herein permanently place the originator's instructions as the first, closest definition around each object. The knowledge patterns form themselves through the concurrent and conflicting insights, opinions and knowledge continually developing about and around each object over time. Therefore, the systems and methods described herein provide machines with something to measure that is closer to the way people think.

10.5 The systems and methods described herein are a better way to measure people's ideas and activities across cultures and knowledge domains over time. The systems and methods described herein comprise a new mechanism to track, measure and compare ideas and activities expressed through natural languages, images, sounds, events and other evolving patterns that allow for each culture, or knowledge domain, to define itself (2.5).

10.6 The systems and methods described herein are able to combine data and data arrangements that are created and maintained separately. For example, information about a museum's case interiors is typically constructed from the following:

10.6a Drawings of the museum architecture, typically in AutoCAD as an external reference shared with the architect and all of their subcontractors such as engineers.

10.6b An artifact schedule, sometimes maintained by the curator and sometimes developed back and forth with the owner of the objects, is usually never finalized until the museum opens.

10.6c If the objects are photographed for the artifact schedule, these are typically digital images that are not distributed digitally, rather these images are pasted in matching boxes in the schedule program, for example page maker, that is not able to indicate the scale of these objects with each other as the drawings or the objects themselves do. Images of the objects may not be isolated from their backgrounds to distinguish their unique profile and proportions. This group of images that matches dimensions that are not required to match while ignoring more important relationships is then photocopied as if the object and background were continuous and all of the objects were the same size. The first black and white generation of colored dimensional objects, and definitely subsequent generations, means these (once digital, scaled, colorful) images are no longer useful.

10.6d There is a scope of work, materials, and object/architectural area numbering matrix in Excel, which often is maintained by the curator and sometimes back and forth with the owner, but more typically is a deliverable to the owner.

10.6e There are graphics using their own images, text developed with a writer in another program, sometimes back and forth, sometimes as a deliverable. Fitting the objects, labels and mounts into a case is something that can only be done as a mock-up, or detailed drawings using several views.

10.6f There are new CAD drawings of the objects, the drawings are very time consuming because each object is unique, the exact proportions and dimensions are very specific. It is not possible to find these drawings in a library however, it would be possible to have each object only drawn once and shared regardless of which case, museum, or other location where the object travels to in the future. The systems and methods described herein permanently bind this digital drawing to the object as part of its description.

10.6 g There is usually a plan drawing, at least a front elevation, sometimes sections and other CAD drawings of the case with the objects, graphics, mounts, lighting, materials, construction details, access, security, environmental controls and other items generally received from others that need to fit within the case without interfering with the visual presentation and didactic understanding of the objects and labels.

10.6h Sometimes, all of the cases throughout each museum have the same lighting fixtures and equipment, glass, security and other requirements. Other times, each case or group of cases is unique. Lighting fixtures and other equipment are generally available in CAD from the manufacturers, but these files rarely match the design drawings. Manufacturers top priority is their product, therefore their drawings are typically too detailed and in "blocks" which, if "exploded" to remove information or change the line weights, adds many, many layers to a drawing that is trying to manage layers as a useful technique to see relationships within the case. The 'real' lighting itself can only be adjusted at the final installation, outside of very obvious exceptions such as a very large object that should go towards the bottom of a case instead of the top, it is unlikely to be able to prevent shadows and other lighting conflicts until the case and the objects are installed.

10.6i If the number of objects simply cannot be narrowed down any further, they will not fit in the case and the case dimensions need to change, this will affect the dimensions of the walls, the architects and electrical engineers drawings, the contractor with tools and materials in his hands ready to build the case at the old size, and other factors that need to go through the cycle again starting at 10.6a.

Therefore, especially because all that results from each of these drawings, images, schedules etc above is ONE case in ONE museum, it may be desirable to consolidate these programs, drawings, images, knowledge, skills and expertise into one place, even if it is only temporary [FIGS. 8A, 8B] similar to an AutoCAD external reference. Because most museum owners do not know how to use CAD and other programs, the deliverables are usually blueprints and photocopies that anyone can keep or read but do not take advantage of the imaging and detail that is available in (expensive, constantly updating) design programs. Because the owner usually does not have office space for all these paper and ink packages and people new to the museum may not understand how these packages are organized, the best way to see the most recent condition of each object and space is by going to see, measure and evaluate it in person rather looking through all of the complicated, detailed design packages only to retrieve a detail that changed after the design was delivered. The example above is a typical scenario that prompted the systems and methods described herein being realized through machines and networks. The systems and methods described herein are for the long term sharing of knowledge, ideas, objects, drawings, images, processes and spaces.

10.7 Future 'temporary' combinations of detailed drawings, images, measurements, lists, etc. have applications to many fields. For example, there is astronomy and physics where the arguments are passionate, mathematics is the language, time itself and dynamic processes are measured, and most importantly there are specifically new and different views that are able to be shared and seen together which therefore requires a new form of drawing, imaging, description, data curation and digital preservation. Like the cultural objects above, if new objects/ideas in astronomy and physics could be superimposed onto known "patterns" or "signatures" these objects/ideas might or might not correspond to, this could lead to the objects/ideas gravitating and snapping into their time or location as introduced in [FIG. 2] (7.32) (10.7). Being able to see and discuss where something "belongs" would be useful in astronomy, physics and other fields where imagery, drawings and measurements are carefully constructed, analyzed and discussed over long periods of time and from different points of view (1.22) (2.6) (3.14) (7.30) (10.7).

10.8 Because of the systems and methods described herein, we will understand more about how 'things' react to each other, become mixed and separate; therefore, there are also applications to theoretical and applied chemistry. Similarly, because of the inherent time and sequencing characteristics and overall patterns that are made measurable in the records of the systems and methods described herein, there are also uses for theoretical and applied biology, geology and other natural sciences. The best scientific and humanities use for the systems and methods described herein is for building theories over time. Any of these pursuits that involve mathematics, can take advantage of the 'placeholder' concept (2.6), rely on visualization and other detailed imagery to draw conclusions, are in line with the purposes of the systems and methods described herein.

10.9 Because of the examples illustrated above, the systems and methods described herein also have uses for Education and Demonstration.

10.10 Because the mathematical processes of the systems and methods described herein are actually a form of counting or statistics that are able to reflect preferences, the systems and methods described herein will also be useful for business practices and value determination.

10.11 The systems and methods described herein are a better method for both search and organization because it combines mathematical and temporal relationships.

10.12 Because of the privacy features specified in (8.3); and the type of detailed and shared records, images, trends, patterns, characteristics and behaviors the systems and methods described herein are able to efficiently update and organize; and the recognition techniques for data features that could easily be applied to physical features (for example faces and fingerprints); tracking of current locations; and reflections of cultural characteristics (10.5) or other theoretical and observable real patterns, there are timely applications for security and law enforcement.

10.13 Use of the systems and methods described herein with research or other efforts that are supported by an agency, such as the US federal government, could easily add a requirement to save the "raw results" "drawings in progress" "knowledgeable observations" and other high quality data and data arrangements created through these funded efforts to be delivered in a way that is compatible with the shared memory system in (Section 8).

10.14 Our unique age holds many opportunities to integrate processes such as those described above to inform and learn from each other in new ways because we all understand art, science, mathematics and music the same way, and now have the added benefit of being connected through shared networks. Sharing carefully evaluated knowledge and preserving it for the future so we may increase our understanding of each other and the natural world around us is the most important use of the systems and methods described herein.

11. Location Index 11.1 The methods and systems described herein use mathematical patterns, aesthetics, varying views, and a new system of scale, pacing and edges similar to walking in nature to draw the geometry of knowledge as it changes over time. These drawings have no straight lines, only arcs. There are no corners, only transitions and rotations in specific places on irregular high-dimensional waveforms threading their way through time. Each pattern and each memory form is a unique continuous whole perceived as objects in spaces where both the object and space around it have meaning. When data and data relationships preserved in Context Driven Topologies are interpreted in the future, each whole is broken into components, reinterpreted, recreated, fixed into a new pattern and memory form and reintroduced into the stream. Each component in every topology carries a history of its priority and placement. Very efficient, accurate searches recognize continuous wholes using these histories. Shared context draws data and data arrangements together deep in the background to "gravitate" and "snap" relative proportions, measurements and historical relationships into groups. The creation of new patterns, new memory forms, and the shared memory space will simplify and streamline these geometries over time which will improve the quality of dynamic shared data stores. The intention is to change the communication mode between people and machines and to develop more precise records over longer periods of time.

11.2 The methods and systems described herein define a new human computer interaction process comprising the following steps and procedures: new techniques to organize and use data histories (3.34) to place data in context [FIGS. 1 to 10E] (1.1) (1.23) (2.3) (3.1) (33) (3.6 and 3.7) (3.10) (3.12 and 3.13) (3.18) (3.20) (3.37) (6.8) (7.2) (7.8 to 7.12) (7.28) (7.31) (7.33) (7.41) (8.2 and 8.3) (8.18) (9.2) (9.4) (9.11) (10.2), which provides a new form for data arrangements [FIGS. 2 to 10E] (1.12) (1.24) (2.1) (2.7) (3.3 and 3.4) (3.9) (3.12) (4.5 and 4.6) (4.14) (7.2) (7.4) (7.14), and a new format for data descriptions (2.2) (2.8) (3.20) (3.24) used in shared dynamic time dependent complex data collections (1.9) (3.7) (6.7) (8.5) (9.8) (9.17). The methods and systems described herein are used to draw the geometry of knowledge as it changes over time [FIG. 3]. The pace and record of these changes are represented by mathematical configurations, or "knots of information". When the space around these knots changes, so does the interpretation of the information itself (1.2), likewise, when the interpretation changes the patterned "space around" will be changed. Mapping this back and forth process [FIGS. 6A-6C, 7, 8A and 8B] over time [FIGS. 2, 3 and 4] is one way the methods and systems described herein are used to interpret, manage and selectively preserve records of human knowledge. Data and data collections are mapped, organized, searched and interpreted using sets of "knowledge patterns" also called "filters" and "templates" [FIGS. 10A-10E] (2.3) (3.35) (7.40). A second "opposite" and "related" set of "display patterns" (3.21) (3.23) (3.27) (7.1 to 7.50) (8.3) (9.1 and 9.2) (9.5) (9.10) (9.21) are used to subsequently transform and simplify each data arrangement even further to be displayed through an evolving automatic language of light and sound (7.5) (9.2) (10.2), textures [FIG. 7] (1.23), colors (7.28 and 7.29) (7.39) (7.43) (7.48) and forms [FIGS. 6A-6C] [FIGS. 10A-10E] (1.24) (2.1) (3.4) (3.9) (3.11) (3.13) (3.20) (7.2) (7.38 and 7.39) (7.43) (9.6) (9.13 and 9.14) that continually update and evolve into new generations of knowledge and display patterns. People's knowledge [FIGS. 1 to 10E] (7.1 to 7.49), awareness, abilities to perceive, measure and question meaning in data and data arrangements is used to change and develop these mathematical patterns over time. The methods and systems described herein apply mathematical topology, algebra and new pattern generation and recognition techniques to digital information context to see how ideas and concurrent or conflicting views become entangled, can be separated from their background, recognized differently from different points of view, interrelated, and influenced over time (1.1). The methods and systems described herein are used to discuss new versus old ideas, draw new conclusions (7.1) (7.30) (7.47) (8.16), create new mathematical relationships and new conceptual associations (1.4) perceived and used in the following states: as scale free configurations connecting and placing data components in data arrangements [FIGS. 6A-6C, 7, 8A, 8B, and 10A-10E] (1.2) (3.18) (3.28) (6.6 and 6.7) (7.12) (7.18) (7.33 and 7.34) (7.36) (7.39 and 7.40) (8.3) (8.14) (8.18) (8.20) (9.4 and 9.5) (9.15); as symbols that map the history of hierarchy placements within each component's mathematical description [FIGS. 10A-10E] (2.1 and 2.2) (3.7) (3.10 to 3.14) (3.18) (3.20) (3.23 to 3.26) (3.31 to 3.33) (3.37 and 3.38) (4.4) (4.9) (4.17) (7.1) (7.32) (735) (7.39 and 7.40) (8.3) (8.18) (9.3) (10.2); and as multidimensional waveforms used to distribute, streamline and consolidate these patterns and forms over time [FIGS. 10A-10E] (1.24) (3.11) (3.26) (4.1 to 4.18) (7.4 and 7.5)

(7.39) (9.3). Context Driven Topologies remain mathematically the same and recognizable regardless of whether they are being used in the configuration, symbol or waveform state. Context Driven Topologies in the symbol state (Section 3) are used to trace [FIGS. 6A-6C] (1.4) (3.7) (3.10) (3.12) (3.26) (5.1) (7.14) histories of previous context and associations originating deep in the background (1.5) (7.32) to gently "push" (7.1) (7.26) (9.21), precisely align [FIGS. 8A, 8B] (1.23) (33) (3.7) (3.31) (4.17) (9.5) (9.7) (10.2) and lock the relative proportion [FIGS. 2, 6A-6C, 7] (3.8) (3.27) (3.36) (4.14) (53) (6.7) (7.15) (7.34) (7.36) of data and data arrangements into groups. Context Driven Topologies form a new kind of data collection composed of a new kind of objects and spaces used to map and understand complex data and data collections in both smaller groups [FIGS. 8A, 8B] (1.4) (1.23) (2.3) (2.4 and 2.5) (2.7) (2.9 to 2.12) (3.2) (3.11) (3.15 to 3.17) (3.22) (3.28) (4.11 and 4.12) (5.4) (6.3) (6.7 and 6.8) (7.1) (7.6 and 7.7) (7.17) (731 to 7.33) (8.2 and 8.3) (8.6) (8.11 and 8.12) (8.19) (9.6) (9.11) and larger overalls (1.10 and 1.11) (23) (7.25 and 7.26) (7.28) (7.38) (9.1) (9.12) than are currently available. Current data relationships, network topologies and data stores (even dynamic data stores) are typically in even arrangements with equal, practically interchangeable components geared for machine processing rather than the fluid, variable human imagination and investigation process. This is caused by an overdependence on electrical pulses. The mathematical memory patterns are more suited to continuous patterned waveforms, similar to existing radio or cell phone technology, rather than electrical pulses. The methods and systems described herein are intended to be independent of electricity and electrical pulses (1.24) (Section 4). Existing technology does not allow data or data relationships to vary, characterize over time, or appear as one whole [FIGS. 3, 4, and 5A-5D] (1.3) (3.5) (3.10) (4.3) (4.6) (5.7) (7.28) (7.32 and 7.33) (7.39) (8.3) (8.11) 8.24) (9.6). The methods and systems described herein measure changes in mathematical patterns constructed for temporal reasons where aesthetics [FIGS. 6A-6C] (7.50) (8.13) (9.1), proportion (7.38) (9.5) (10.6), "pace" or flow [FIG. 2] (1.21) (3.11) (3.26) (4.12) (Section 6) (7.3) (7.5) (8.3), proximity [FIGS. 6A-6C] (3.10) (6.2) (6.3) (7.7) (7.12) and density (1.24) become typical, comparable measurements. Context Driven Topologies reside in a boundless abstract cloud, also called a "stateless space" [FIG. 1] (3.27) (4.7 to 4.9) (4.14) (4.18) 63) (6.9) (7.45) (8.1) (8.3) (8.11) (8.18) (9.1 and 9.2) accessible to any number of users. Mathematically perfect copies (9.4) are handed down from generation to generation.

11.3 Because of the steps and processes throughout these drawings and specifications, Context Driven Topologies will initially be "powered" by use, similar to passing stories and songs across generations or propagating information across the internet (1.21) (3.19) (8.17) (8.24); therefore, the methods and systems described herein and the purpose of the methods and systems described herein, is independent of electricity (1.24). The mathematical patterns, processes and uses of the methods and systems described herein for long term data curation and digital preservation (9.1 to 9.22) will also allow this organized and preserved knowledge to be independent of unstable media (1.1 to 1.25) and changing natural and machine languages (3.32). The intended life span of the knowledge and display patterns interpreted and managed using the invented process is no less than 1,000 years (7.12). The methods and systems described herein include the human decision, evaluation and review process over time to selectively delete data and data arrangements that are not cohesive (2.10) (3.9) (5.6) (7.28), valuable [FIGS. 5A-5D] (1.15) (2.6) (4.14) (7.2) (7.16) (7.19 and 7.20) (7.24 and 7.25) (7.33) (8.13) (10.10), true (1.6 and 1.7) (2.4 to 2.6) (7.23) (7.47) (8.3), interesting (1.5) (1.18) (7.3) (7.23) (8.13) (8.24) (9.9), attached to or sharing significant histories [FIGS. 6A-6C] (1.5) (1.21) (3.13) (3.25) (3.33) (4.18) (6.6) (7.11) (7.16) (7.32) (7.45) (83) (8.7) (8.9) (8.11) (9.15) with other data and data arrangements. Non-relevant, non-valuable, potentially misleading, out of date and incorrect information is removed from dynamic shared data stores through a shared continuous discussion and interpretation forum that uses a shared memory (8.1 to 8.26) area within the stateless space. These actions and this process will streamline (1.7) complex data collections, automatically organize shared data stores (1.7) (9.1) and make complex collections easier for people to look through. Existing machine protocols and languages (3.32), unstable media [FIGS. 6A-6C] (1.15 and 1.16) (2.5) (8.18) (9.2) and the parade of machines currently accepted as an unfortunate, but irreconcilable, part of the information age (1.25) are unnecessarily divisive and detrimental to long term digital preservation and international research and communications across cultures and domains (1.1 to 1.25). The year 2004 is the dawn of a new connected age (10.14) with incredible potential (1.22) where communications should not be hampered by electricity (1.24) (8.17 and 8.18), media, changing machines (7.3) (7.12) (8.3) and different natural and machine languages (3.32). The kind of data and data arrangements understood through Context Driven Topologies involve imagination, visualization [FIGS. 6A-6C] (1.21) (3.2) (3.23) (7.5) (7.8) (7.27) (7.44) (10.1) (10.8), and patterns that constructed in a place (7.8) where natural language is no longer useful, media is immaterial, and machine languages may be able to be changed to understand the expressions, reasons and investigations captured by the methods and systems described herein over time through the following steps (1.25) (2.13) (3.38) (4.18) (6.10) (7.49) (8.26) (9.22) (10.1 to 10.14).

11.4 Because of the steps and processes described herein, the methods and systems described herein will typically transform (1.21) (3.21) (4.1 and 4.2) (4.4) (4.11) (4.17 and 4.18) (5.4 and 5.5) (7.1) (9.5) (9.21) (10.1) and present knowledge and knowledge objects differently than it was originally captured and recorded. The methods and systems described herein are a consistent method (1.6) (2.9 and 2.10) (6.9) (7.12) (7.30) (7.44) (8.3) (9.4) (10.2) (10.11) for an unlimited (7.37) (8.14), changing [FIGS. 6A-6C] (1.12) (1.20) (3.9) (4.1) (7.37) (7.40) (8.3) (9.2) (9.15) series of users, media and machines to automatically [FIGS. 6A-6C] [FIGS. 8A, 8B] (1.4) (1.17) (2.1) (3.21) (4.13) (5.6) (7.7) (7.14) (7.26) (8.3) 98.12) (8.17) (9.4 and 9.5) and always defer to higher quality [FIGS. 6A-6C] (1.6) (1.11) (1.18) (3.27 and 3.28) (7.5) (7.37) (8.11) (9.4) (10.13), denser (3.2) (7.26), more original [FIGS. 6A-6C] (1.19) (1.22) (2.3) (2.6 and 2.7) (2.10) (3.12) (3.24) (4.6) 4.12) (5.6) (7.9 and 7.10)) (7.37) (7.40) (7.42) (8.3) (8.18) (9.4) (9.8), authentic (2.2) (8.3) (8.24) (9.2) (9.14) (10.1) original information held in a placeholder position (2.6) (2.10) (3.14) (3.26) (7.21) (10.8) accessed through the steps indicated in (1.25) (2.13) (3.38) (4.18) (6.10) (7.49) (8.26) (9.22) (10.1 to 10.14). The methods and systems described herein include priority addressing (6.1 to 6.10) (7.7) (10.1) and mapping to master recordings (10.4); high resolution still and moving imagery (7.5); partially interpreted [FIGS. 6A-6C] (1.23) (3.1) (7.18) or raw results (2.6) (3.24) (10.13); current locations (9.13) (10.1) (10.6) (10.12) of genuine events, objects and living beings; purely mathematical relationships and other ideas that can be represented, described, associated and derived with machines using the invented processes (1.25) (2.13) (3.38) (4.18) (6.10) (7.49) (8.26) (9.22) (10.1 to 10.14) to evaluate, maintain and preserve dynamic complex data collections over longer periods of time than a person, research group, entire field of study, or machine's lifetime. Definition: The word "Machine" as it is used herein is intended to mean a computer with a life expectancy of five to ten years—including an operating system or platform (ex. Mac or PC) that may be incompatible with other systems or platforms, various shared and specialized software with a life expectancy of one to three years, and an internet connection equal to current DSL or Broadband. The word "Machines" as it is used in these specifications is intended to mean advanced networks of machines that change and improve over one person, research group, or entire field of study's lifetime.

11.5 The methods and systems described herein will eliminate redundant (1.4) (3.12) (3.31) (4.15) (10.1), out of date, misleading and incorrect data and data arrangement from dynamic shared data stores by isolating and identifying non-original copies and non-meaningful variations within datasets using user defined similarity measures, also described throughout these specifications as "the same" [FIGS. 6A-6C] [FIGS. 10A-10E] (1.4) (1.9) (2.3) (2.12) (3.3) (3.10) (3.12) (3.16) (3.18) (3.20) (3.30 and 3.31) (4.6) (4.18) (5.1 to 5.7) (7.1 and 7.2) (7.40) (8.2 and 8.3) (8.20) (9.4) (9.11) (10.1) (10.6) (10.14) to automatically mask, eliminate and conceal excess information using these related patterns to map back and forth [FIGS. 8A, 8B] (3.10) (3.21) (7.13) (7.22) (7.26) (7.30) (8.3) (8.22) (9.15) (10.6) until the redundant, misleading or incorrect information, ideas and techniques (9.1 to 9.22) are exposed and removed in both the users current data arrangement and across more levels over longer periods of time (1.1 to 4.18) and (7.1 to 7.50). These templates, also called the "knowledge and display patterns" (7.1 to 7.4), act as known "opposite" or "rotated" topologies to expose and combat specifically redundant, false or misleading information (1.7) (1.15) (2.5) (7.18) as defined by people who understand and use this information by realistically accommodating concurrent and conflicting interpretations (1.7) (2.5) (7.30) (10.4) and getting these data descriptions and data components to influence and eventually cancel each other over time. People who create and interpret complex data and data arrangements understand this knowledge and these knowledge objects the most clearly and therefore should be the ones who decide and define which data and data arrangements are interesting, correct, unique and worth preserving for further contemplation using new knowledge and new machines in the future. These steps and processes are also referred to throughout these specifications as "streamlining" (1.4) (1.7) (10.6). The methods and systems described herein will cause data and data relationships to characterize (B3.2) (3.25), automatically become more organized, cluster (3.25) (5.3) (7.12) in dynamic shared data stores and generally become more authenticated as it is evaluated from more points of view over longer periods of time. For readers familiar with problems of redundant, misleading, out of date or incorrect information, the implications of the methods and systems described herein are obvious.

11.6 Because of the steps, processes and applications outlined herein, the methods and systems described herein have a real world value (1.25) (10.1 to 10.14) by clarifying the roles of human creative and conceptual abilities versus the computational skills of machines as summarized in (1.25) (2.13) (338) (4.18) (6.10) (7.49) (8.26) (9.22). The methods and systems described herein will help us (1.23) (7.18) (9.4) (9.11) (9.21), as individuals and a global society to decide (2.8) (3.1) (6.6) (7.10) (7.35 and 7.36) (7.41) (7.44) (8.6) which data and data arrangements are important, accurate and worth keeping (3.12) (8.6) (8.20). New and conceptual associations are made by people and advanced networks of machines over time using Context Driven Topologies and the virtual "bridges" constructed following the steps in FIG. 1 to FIG. 10E. (1.1) (1.5) (1.10 and 1.11) (1.19 to 1.23) (2.2 and 23) (2.7) (3.5) (3.7) (3.11 and 3.12) (3.19 to 3.22) (3.24) (3.26) (3.28 to 3.31) (3.35) 94.14) (6.6 to 6.8) (7.1) (7.3 and 7.4) (7.9 and 7.10) (7.14 and 7.15) (7.18) (7.22) (7.26 and 7.27) (7.30 and 7.31) (7.33) (7.38 and 7.39) (7.49 and 7.50) (8.3 and 8.4) (8.9) (8.12) (8.20) (8.23 and 8.24) (9.1 and 9.2) (9.5 to 10.8) (9.11) (9.13) (9.15 and 9.16) (10.5 and 10.6) (10.14). These new bridges and the affect of the concurrent and conflicting viewpoints lead to a portrait of new ideas and changes to historical comprehension over time so people using the methods and systems described herein can also use these historical ideas and changes to decipher, comprehend, unravel and solve new kinds of problems. The primary use for the methods and systems described herein today is to organize and interpret museum and library digitization (1.6) (10.1); data generated by automated scientific experiments (1.6) (10.4) (10.7 and 10.8); security (8.3) (9.14) (10.6) (10.12); and to promote a clearer (8.9), more meaningful understanding of each other, our environment, the natural world around us (10.14), American (2.5), global and future societies, and to stay current with the status of our individual and shared knowledge (4.10) (4.14) (5.7) (7.21) (7.27) (7.30) (9.2).

11.7 The steps and processes summarized and enumerated in (1.25) (2.13) (3.38) (4.18) (6.10) (7.49) (8.26) (9.12) will show users of the methods and systems described herein new kinds of objects that exhibit new kinds of associations, expressed through a new kind of mathematics [FIGS. 6A-6C] [FIGS. 10A-10E] (2.1) (3.31) (6.9) (7.12) (7.34) (8.24) (9.11) (10.7 and 10.8) (10.14), a new language of sounds and images (7.1 to 7.50) and other techniques. The way that data and data arrangements are configured, described, identified, derived and extracted from dynamic shared data stores [FIG. 1] [FIG. 2] is dependent on the users knowledge, the era which they live in, the machines and networks they are using and they way each user or group of users is looking at this data and data arrangements [FIGS. 6A-6C] (1.6) (1.20) (3.2) (4.12) (4.15) (5.3) (5.6) (7.19) (7.23) (7.27) (7.30) (7.38) (9.7) (10.6). The methods and systems described herein are not an abstract idea or mere arrangement of data, because of the methods and systems described herein, we will understand more about fluidity, shapes, objects and spaces [FIGS. 5A-5D] (9.13), we will also understand more, and be forced into new ways to draw, different elements becoming mixed or separated (10.8). By comparing shapes, objects, spaces, arrangements, sequences, theories and ideas we do not understand (3.11) with ideas and knowledge we do understand, the methods and systems described herein will allow users to draw some parallels and achieve clarification (3.15) (6.9) (8.5) and increased understanding that is currently not possible without the methods and systems described herein. Further, because of this increased understanding, Context Driven Topologies generated by the methods and systems described herein and perpetuated through people's investigations will become like objects (3.12) people will form attachments to (B3.7) (2.8) and begin to prefer certain patterns and forms over others which will affect human perception [FIGS. 10A-10E] (3.31), aesthetics (7.23) (7.34) (7.50), and performance requirements for our media and machines particularly as enumerated in Sections 6 to 10.

11.8 Because of the better organization, better descriptions and more realistic annotation system disclosed throughout these specifications, the methods and systems described herein are a better, more continuous (1.24) (3.2) (3.4) (3.34) (4.1 to 4.3) (4.16) (7.28) (7.40) (7.49) (8.13) (9.3) (9.6), fluid form (1.24) (10.7 and 10.8) of metadata (2.3) (2.9) (7.17) (7.27) (10.2) and mapping comprised of the steps summarized in [FIGS. 6A-6C] (1.25) (2.13) (3.38) (4.18) (6.10) (7.49) (8.26) (9.22) (10.1 to 10.14). Current metadata methods rely too heavily on text without providing mechanisms for translation [FIGS. 6A-6C] (5.6) (10.1) (10.2), cultural interpretation (1.20) (7.25) (9.1), or change and variation in word meaning (10.2) over time. The methods and systems described herein are a more reliable (1.18) (2.5) (6.9) (7.18) (7.20) (9.2) (9.14), accurate (1.18) (2.2) (2.4) (2.6) (3.12) (4.14) (5.1) (8.3) (8.18) (9.1) (9.9) and subtle [FIGS. 6A-6C] (10.2) method to communicate [FIG. 7] (2.1) (3.13) (9.2) (9.11) at concrete and abstract (3.5) (3.8) (3.19) (4.18) (7.28) (7.38) (7.44) (8.4) (9.10) levels which will enable our shared designs, mathematics, studies, investigations, stories and curiosities to advance and be expressed in ways we could not have imagined before.

11.9 The methods and systems described herein will give machines something to measure that is closer to the way people think, imagine and work. These measurements are comprised of the techniques, process and steps specified in (FIGS. 6A-6C) (1.1) (1.19) (1.23) (2.2) (2.6) (2.9 and 2.10) (3.6) (3.13) (3.15) (3.27) (6.9) (7.1) (7.8) (7.16) (7.21) (7.26 and 7.27) (7.30 and 7.31) (7.44) (8.3) (8.23 and 8.24) (9.2) (9.4) (9.11) (9.15) (10.4) (10.6).

11.10 All of the systems and methods described herein are interdependent and related. Each of the following claims is directly related to mathematical operation steps of a process as disclosed in [FIG. 3] [FIGS. 6A-6C] [FIG. 7] [FIGS. 8A, 8B] [FIGS. 10A-10E] (1.1) (1.4 and 1.5) (1.17) (1.20 and 1.21) (1.24) (2.1 to 2.3) (2.13) (3.2) (3.7) (3.10 and 3.11) (3.18) (3.20) (3.26) (3.31) (3.34) (4.5) (4.9) (4.11 to 4.13) (4.15) (4.18) (6.2) (6.4) (6.9) (7.1) (7.3) (7.12) (7.15 to 7.18) (7.25 and 7.26) (7.31) (7.33 and 7.34) (7.39) (7.42 to 7.44) (7.47 to 7.49) (8.2 and 8.3) (8.18) (8.24) (9.1 to 93) (9.6) (9.11 and 9.12) (9.20 and 9.21) (10.7 and 10.8) (10.10 and 10.11) (10.14).

11.11 The methods and systems described herein are a better form of search, organization and identification for data, data arrangements, advanced networks of machines and for people. The methods and systems described herein will be useful to investigate, create, and manipulate new and old ideas and map knowledge and historical comprehension over time across cultures and domains. Not only for the practical applications indicated in (10.1 to 10.4), but also the methods and systems described herein in their current embodiment will prompt, inspire and enable additional techniques and future technologies to distribute, implement and expand the usefulness of the methods and systems described herein through additional practical applications. Tools, systems, and methods that may have been prompted by the methods and systems described herein, their implementation and usefulness follow a mathematical and perceptual process summarized in (1.25) (2.13) (338) (4.18) (6.10) (7.49) (8.26) (9.22) that includes but is not limited to: measurement, evaluation, testing, authentication, calibration, analysis, interpretation, exploration, vision, generation, conversion, translation, transformation, logic, purification, error and consistency detection, tuning, classification, registry, identification, recognition, composition, consolidation, masking, similarity measures, redundancy elimination, error detection and correction, visualization, design, imaging, modeling, simulation, drawing, recording, processing, compression, decompression, distribution, cryptography, navigation, communications, transmission, signaling, preservation, and other research, educational, entertainment or business products and practices that use techniques discovered using the methods and systems described herein.

11.12 Especially because the forms and patterns generated, perpetuated and interpreted through the methods and systems described herein reside in a stateless, constantly updating space without electricity or a capturing media—it is possible existing and new inventions originally served a different purpose, or the existing subject matters and methods and systems described herein within these classifications were conceived of and made for reasons that may initially seem unrelated, but in fact, are related because the methods and systems described herein will give us new ways to understand, new ways to look, measure, connect, break apart, demonstrate and control data and data arrangements using virtual forms and patterns that people may not have found ways to control using 'real' patterns, forms, languages and processes.

The invention claimed is:

1. A method of analyzing and developing information comprising:
    (a) using one or more networks of machines to create consolidated representations of groups of data that change over time, comprising:
        associating the groups of data that change over time with fixed context information to create representations of the groups of data that change over time,
            the fixed context information comprising information about relationships between the groups of data that change over time, and a pace of change associated with information included within the groups of data that change over time, and
        the associating comprising embedding the fixed context information as symbols in descriptions of at least some of the groups of data that change over time, with the symbols for use in mapping differences in hierarchical relationships between the groups of data that change over time; and
        consolidating the representations having commonalities to form consolidated representations of the groups of data that change over time;
    (b) compressing the consolidated representations to form compressed representations;
    (c) using one or more networks of machines to create at least one data network structure, the at least one data network structure comprising a hierarchical architecture and having network components comprising at least one consolidated group of data that changes over time, at least one compressed representation of the consolidated data, or at least one consolidated representation, wherein the hierarchical architecture organizes and streamlines the context-driven representations of relationships between the points in the data network structure;
    (d) using one or more networks of machines to analyze the data network structure, further comprising using mathematical techniques to review the fixed context information associated with the network components to identify out of date data or assign new connections between data within the data network structure;
    (e) periodically reviewing the groups of data that change over time or the fixed context information associated with the groups of data that change over time;
    (f) creating new data or updating at least one of the data network structures, the network components, or the connections between the data in the data network structure based on results from the periodic review of the groups of data that change over time or the context information; and (g) storing the network information for retrieval by a plurality of users.

2. The method of claim 1, further comprising preserving only compressed maps of the groups of data that change over time using only the fixed context information associated therewith.

3. The method of claim 2, wherein creating new data further comprises using one or more networks of machines for changing an interpretation of the groups of data that change over time based on the comparing, with changing the interpretation further comprising at least one of the following:
   developing the new data,
   developing an update of at least one of the consolidated representations,
   developing an update of the data network structure,
   developing a new data network structure,
   developing an update of at least one of the symbols, or
   developing an update of the display based on the analyzing.

4. The method of claim 3, wherein changing the interpretation comprises changing the interpretation based on a pace of change in the groups of data that change over time.

5. The method of claim 1, wherein creating the new data further comprises identifying and eliminating, from the at least one computer data store, at least one of the following:
   redundant or out-of-date data;
   data without connections;
   redundant or out-of-date consolidated representations;
   redundant or out-of-date data network structures; or
   redundant or out-of-date symbols.

6. The method of claim 1, wherein the fixed context information further comprises at least one of the following:
   information about data processing techniques used within a particular group;
   a comparison of multiple interpretations of one or more groups of data that change over time;
   information about the time and place that the groups of data that change over time were created; or
   information about the time that the fixed context information was created.

7. The method of claim 1, wherein the context information is fixed into symbols and maps a history of the hierarchical relationships changing over time.

8. The method of claim 1, wherein consolidating further comprises at least one of the following:
   grouping the representations;
   using user-defined similarity measures to identify redundant, out-of-date, misleading or incorrect data or representations from the grouped representations; or
   eliminating the redundant, out of date, potentially misleading or incorrect data or representations.

9. The method of claim 1, wherein creating the data network structure further comprises:
   creating an outline for a new data network structure based on the consolidated representations and based on similar representations in previous data network structures;
   defining a set of desired network components and desired links for the data network structure;
   using the fixed context information to access the at least one computer data store, locate component candidates in the at least one computer data store, and retrieve the component candidates from the at least one computer data store;
   selecting the desired network components from the component candidates based on placement of the component candidates in previous data network structures; and
   positioning the selected desired network components at locations in groups or the data network structure, based on the fixed context information.

10. The method of claim 9, wherein selecting the desired network components further comprises, if the component candidates do not meet a criterion for incorporation into the data network structure, creating a new bridging representation and marking the new representation with an indicator of creation for incorporation into the structure and location of the new representation within the data network structure.

11. The method of claim 9, wherein creating the data network structure further comprises locating at least one of the selected desired network components at a location in the data network structure, wherein the location is based on a previous location of the at least one of the selected desired network components in another data network structure.

12. The method of claim 1, wherein creating the data network structure further comprises:
   locating a first network component in the data network structure based on prior interpretations of the first network component; and
   marking the first network component with an indicator of incorporation into the data network structure and an indicator of the location of the first network component within the data network structure.

13. The method of claim 1, further comprising indicating, in the display, a first network component according to its priority in the data network structure,
   wherein the priority is based on prior interpretations of the first network component, with higher priority given to context representations repeatedly interpreted in the same manner, and
   wherein the indicating comprises allocating larger, more prominent art extent of space, resolution, depth, clarity or visibility in the display.

14. The method of claim 1,
   wherein the display comprises a plurality of waveforms of light or sound representing the representations, the waveforms showing a change status of the data network structure;
   wherein consolidating the representations comprises identifying waveforms having common characteristics;
   wherein waveforms are continuously broadcast.

15. The method of claim 1, wherein analyzing the display further comprises twisting and rotating elements of the display in order to align elements representing consolidated representations having common characteristics and existing connections.

16. The method of claim 1, wherein creating the data network structure further comprises:
   identifying common characteristics between at least one older version of the data network structure and the data network structure; and
   creating the new information or identifying new fixed context information based on the common characteristics.

17. The method of claim 1, wherein creating the display further comprises representing the data structure network with arcs linking at least two selected network components, with a selected arc having a radius that reflects an extent of relationship between the at least two selected network components.

18. The method of claim 17, wherein creating the display further comprises displaying the data structure network with a spiral shape comprising:
   inner arcs toward the center of the spiral shape, the inner arcs linking network component pairs, the inner arcs having shorter radii that represent stronger or more direct relationships between the network component pairs; and outer arcs toward the outside of the spiral shape, the outer arcs linking other network component pairs, the outer arcs having longer radii that represent weaker or less direct relationships between the other network component pairs.

19. The method of claim 17, wherein creating the display further comprises displaying the data structure network with shorter arcs linking network component pairs having stronger relationships; and longer arcs linking network component pairs having weaker relationships.

20. The method of claim 1, further comprising at least one of:

retrieving the groups of data that change over time based on the fixed context information;

creating the data network structure based on the fixed context information;

creating the display based on the fixed context information; or analyzing the display based on the fixed context information without retrieving or storing the data the connections are based upon, leaving these data in their original stores.

21. The method of claim 1, further comprising:

locating component candidates for the data network structure using the symbols; and locating data in computer data stores using the symbols.

22. The method of claim 1, further comprising tracing a history of the groups of data that change over time using the symbols.

* * * * *

UNITED STATES PATENT AND TRADEMARK OFFICE
CERTIFICATE OF CORRECTION

| | | |
|---|---|---|
| PATENT NO. | : 8,543,573 B2 | Page 1 of 1 |
| APPLICATION NO. | : 12/146821 | |
| DATED | : September 24, 2013 | |
| INVENTOR(S) | : Deborah L. MacPherson | |

It is certified that error appears in the above-identified patent and that said Letters Patent is hereby corrected as shown below:

In the Claims

In claim 14, column 74, line 43, after "waveforms having common characteristics;" insert --and--.

Signed and Sealed this
Twenty-sixth Day of November, 2013

Margaret A. Focarino
*Commissioner for Patents of the United States Patent and Trademark Office*